United States Patent [19]
Aoshima

[11] Patent Number: 5,742,858
[45] Date of Patent: Apr. 21, 1998

[54] CAMERA HAVING MAGNETIC HEAD

[75] Inventor: Chikara Aoshima, Zama, Japan

[73] Assignee: Canon Kabushiki Kaisha, Tokyo, Japan

[21] Appl. No.: 227,994

[22] Filed: Apr. 15, 1994

Related U.S. Application Data

[63] Continuation of Ser. No. 781,887, Oct. 24, 1991, abandoned.

[30] Foreign Application Priority Data

| Oct. 25, 1990 | [JP] | Japan | 2-285956 |
| Oct. 25, 1990 | [JP] | Japan | 2-285957 |
| Nov. 14, 1990 | [JP] | Japan | 2-306000 |
| Nov. 14, 1990 | [JP] | Japan | 2-306001 |

[51] Int. Cl.$^6$ ............................................. G03B 17/24
[52] U.S. Cl. .............................. 396/320; 396/319
[58] Field of Search ........................ 354/105, 106; 396/310, 311, 319, 320

[56] References Cited

U.S. PATENT DOCUMENTS

| 4,834,306 | 5/1989 | Robertson et al. | 242/71 |
| 4,864,445 | 9/1989 | Tezuka | 360/105 |
| 4,933,780 | 6/1990 | Wash et al. | 354/106 X |
| 4,947,196 | 8/1990 | Wash et al. | 354/106 X |
| 4,977,419 | 12/1990 | Wash et al. | 354/76 |
| 5,005,031 | 4/1991 | Kelbe | 354/106 |
| 5,016,030 | 5/1991 | Dwyer et al. | 354/106 X |
| 5,028,940 | 7/1991 | Pearson | 354/105 X |
| 5,272,498 | 12/1993 | Wakabayashi | 354/105 |

FOREIGN PATENT DOCUMENTS

| 0433019 | 6/1991 | European Pat. Off. . |
| 0435277 | 7/1991 | European Pat. Off. . |
| 63-220049 | 9/1988 | Japan . |
| 267535 | 3/1990 | Japan . |
| 267536 | 3/1990 | Japan . |
| 3202830 | 9/1991 | Japan . |
| WO9004203 | 4/1990 | WIPO . |

*Primary Examiner*—Safet Metjahic
*Assistant Examiner*—Nicholas J. Tuccillo
*Attorney, Agent, or Firm*—Fitzpatrick, Cella, Harper & Scinto

[57] ABSTRACT

A camera has a closable rear lid, and an information processing unit for performing at least one of (i) writing information to a recording medium provided in a film, and (ii) reading information from the recording medium. The camera includes a movable member movable between a first position and a second position. At the first position, the information processing unit is separated from the film. At the second position, the movable member urges the film against the information processing unit. A drive source applies a drive force to the movable member to move the movable member from the first position to the second position. A holding device applies a holding force to hold the movable member at the first position. In response to the closing of the rear lid of the camera, an allowing device to allow the movable member to be released to move to the second position.

59 Claims, 38 Drawing Sheets

CAMERA HAVING MAGNETIC HEAD

This application is a continuation of prior application Ser. No. 07/781,887 filed Oct. 24, 1991, now abandoned.

BACKGROUND OF THE INVENTION

1. Field of the Invention

The present invention relates to an improvement of a camera, using a film having a magnetic storage portion, comprising a magnetic head for writing information to the magnetic storage portion of the film and/or reading it therefrom, and a press member for bringing the magnetic head into contact with the magnetic storage portion of the film.

2. Description of the Related Art

In a conventional camera film feed apparatus, the leading end portion (i.e., a so-called a leader portion) extending from a film cartridge is engaged with a film sprocket or a take-up spool, and the sprocket or the take-up spool is driven to load the film. In such a camera film feed apparatus, a user must set the leading end of the film which results in a cumbersome operation. In addition, when the leading end of the film is set at a wrong position, the film is not properly loaded. A user may erroneously pull out the leading end of the film to expose the film, thus wasting the film.

In order to prevent these erroneous operations, in recent years, a new film cartridge is proposed in U.S. Pat. No. 4,834,306.

FIGS. 13 to 15 show such a film cartridge, in which FIG. 13 is a longitudinal sectional view thereof, FIG. 14 is a cross-sectional view thereof, and FIG. 15 is a side view showing the main part thereof.

This film cartridge comprises a film passing slit 37; a film 34 which has one end fixed to a recessed portion 38a of a film spool 38 and is wound around the film spool 38; a press member 39 coaxially by located with the film spool 38, is for causing a regulation portion 39a to prevent outward radial movement of an outermost film surface of the film 34 and to prevent the outermost surface of the film 34 from being brought into contact with an inner wall 35a of a film cartridge 35; a release member 40 for partially deforming the press member 39 to continuously release the outermost surface of the film from radial regulation performed by the press member 39; and a guide member 41, integrally formed with the release member 40, for guiding to the film passing slit 37 a portion of the film 34 which is released from the radial regulation. In accordance with the arrangement, the outward radial movement of the outermost surface of the film caused by loosening of the film 34 upon rotation of the film spool 38 in a film feed direction brings the outermost surface into contact with the press member 39 to apply a force to the film 34 in a feed direction. Therefore, the film 34 can be fed out from the film cartridge 35.

When the film cartridge 35 of this type (called a thrust type) is used, after it is loaded in a camera, the film spool 38 of the film cartridge 35 is rotated by a fork to feed out the film 34 so that the film 34 is kept fed out until it is wound around the film spool of the camera, and then the film 34 is fed by the film spool of the camera. Thus, the user need not touch the leading end of the film 34, which eliminates the conventional drawbacks described above.

U.S. Pat. No. 4,977,419 recently proposes a camera in which a film having a magnetic storage portion is used, in which pieces of photographic information such as shutter speed, an aperture value, the date, and a title can be recorded by a magnetic head, and these pieces of photographic information are read out as needed.

WO 90/04203 (PCT/US89/04343) discloses a camera in which a magnetic head writes information in a magnetic storage portion during film winding to the next frame upon completion of film exposure.

When information is to be written in or read out of the film having the magnetic storage portion, as described above, in order to perform an accurate read/write operation, a structure is required to urge the magnetic head and the magnetic storage portion of the film at a predetermined pressure so as to bring the magnetic head into proper contact with the magnetic storage portion. For this purpose, a film press means such as a press pad must be provided to urge the film at a position opposite to the magnetic head. When the film having such a magnetic storage portion is used in the thrust type film cartridge described above, the following problems are posed.

1) When the film press means is in tight contact with the magnetic head by an elastic member such as a spring in advance, the leading end of the film is caught by the film press means or the magnetic head to disable the subsequent film feed operation although the film feed operation is forcibly performed.

2) When the film press means or the magnetic head is set movable in the direction of the thickness of the film by a motor and the like, and the film press means or the magnetic head is retracted in the direction of the thickness of the film until the leading end of the film passes through the magnetic head and the film press member by the film feed operation, a special drive source such as the film press means motor or the magnetic head motor is required which results in high cost. In addition, a contact timing of the film on the magnetic head becomes difficult to control, so that a complex electrical circuit is required.

In addition, the magnetic storage portion is formed at a predetermined position in a direction parallel to the longitudinal direction of the film. When the volume of write/read information is increased, the magnetic head must be aligned at the predetermined position of the film with high precision.

In order to satisfy this requirement, the present applicant proposed Japanese Patent Application No. 1-344801. This patent application proposes the following structure. A magnetic head is fixed while a film platen has a guide portion movable in a direction perpendicular to a travel direction of the film and pivotal about a plane parallel to the film surface to regulate the position of the film in the widthwise direction of the film. The guide portion of the press plate is urged against a film edge in the widthwise direction by an elastic member such as a spring, and the magnetic head is highly precisely aligned with the magnetic storage portion of the film.

The guide structure described above poses the following problems in the camera using the thrust type cartridge.

That is, when a film feed operation is performed, the leading end of the film moves the guide member downwardly against a biasing force of the elastic member such as a spring, and the guide member is brought into contact with the end face of the film. The film is bent or caught by a load during movement of the guide member against the biasing force of the elastic member. As a result, a further film feed operation may not be performed.

SUMMARY OF THE INVENTION

One aspect of the application is to provide a camera having a magnetic head. The camera comprises means for allowing the magnetic head to be brought into press contact with the film and/or allowing the magnetic head to be brought into press contact with a guide member which defines the relative position of the magnetic head to the film, upon closing of a rear lid or upon loading of a film cartridge in a cartridge chamber.

Another aspect of the application, on the basis of the above object, is to provide a camera for releasing a holding operation of a first holding means which strongly holds the head or guide member at a contact position with respect to the film when the film catridge is loaded in the cartridge chamber, and for further releasing a holding operation of a second holding means which weakly holds the magnetic head or the guide member at the non press contact position after the film has passed through the head position.

The above and other objects, features, and advantages of the present invention will be apparent from the detailed description of the preferred embodiments in conjunction with the accompanying drawings.

DETAILED DESCRIPTION OF THE PREFERRED EMBODIMENTS

Figure 1:
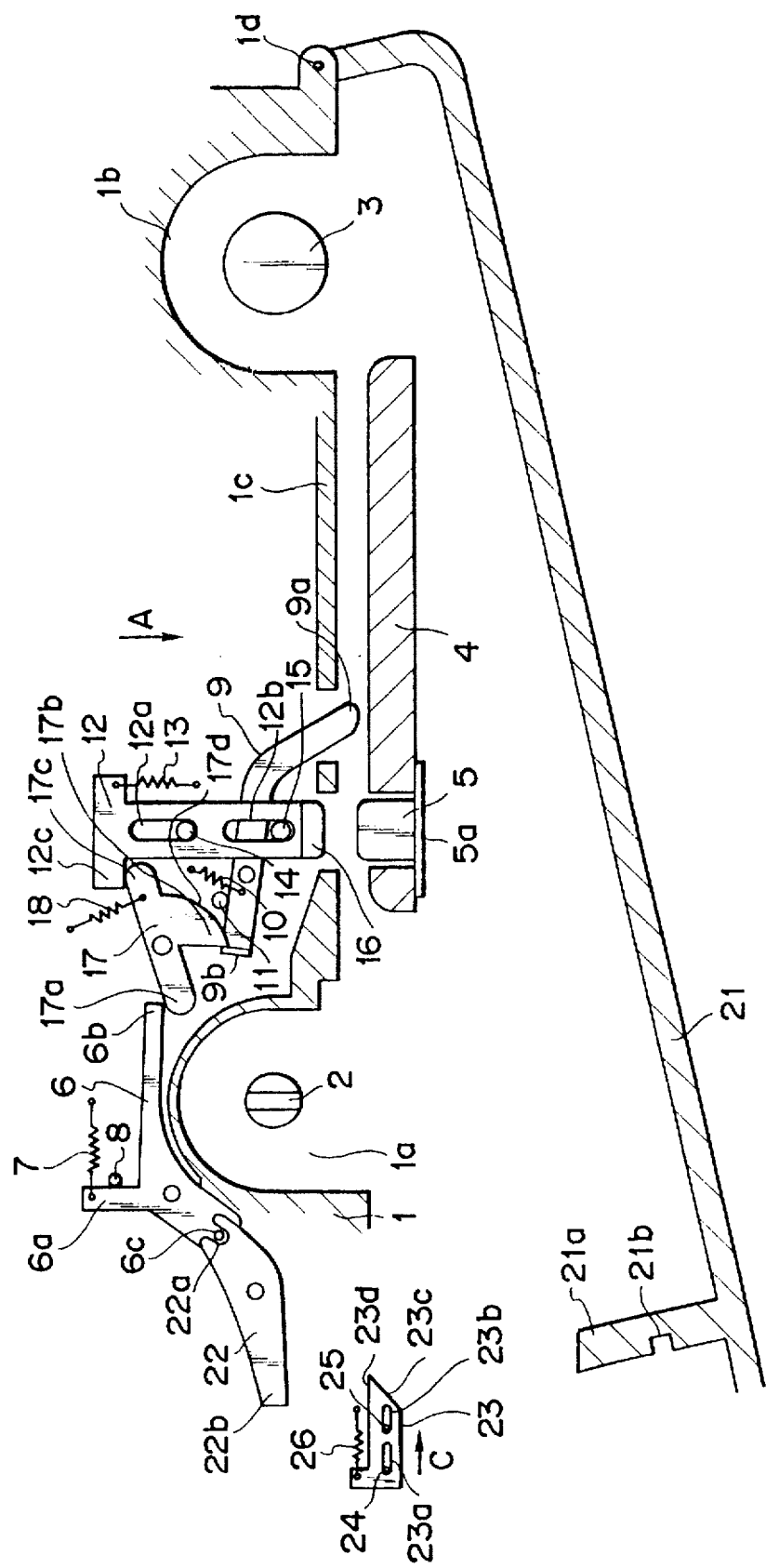
FIG. 1 is a cross-sectional view of a camera in a state wherein a rear lid is not closed according to the first embodiment of the present invention.
Figure 2:
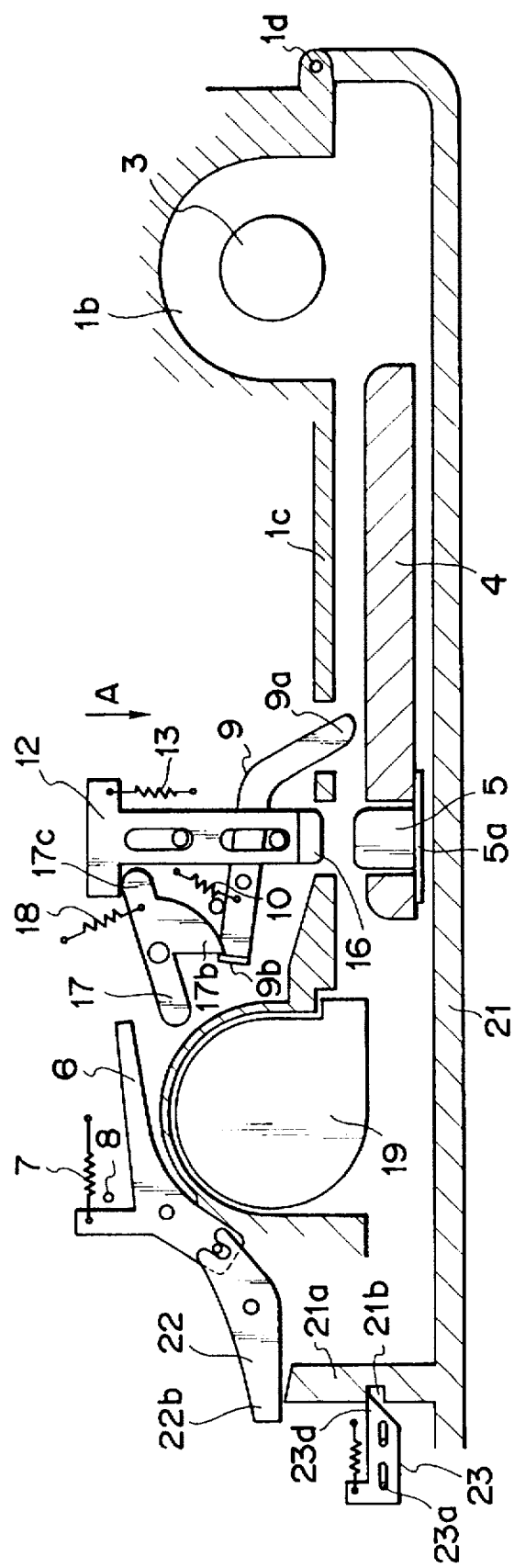
FIG. 2 is a cross-sectional view of the camera in a state wherein a film cartridge is loaded and the rear lid is kept closed.
Figure 3:
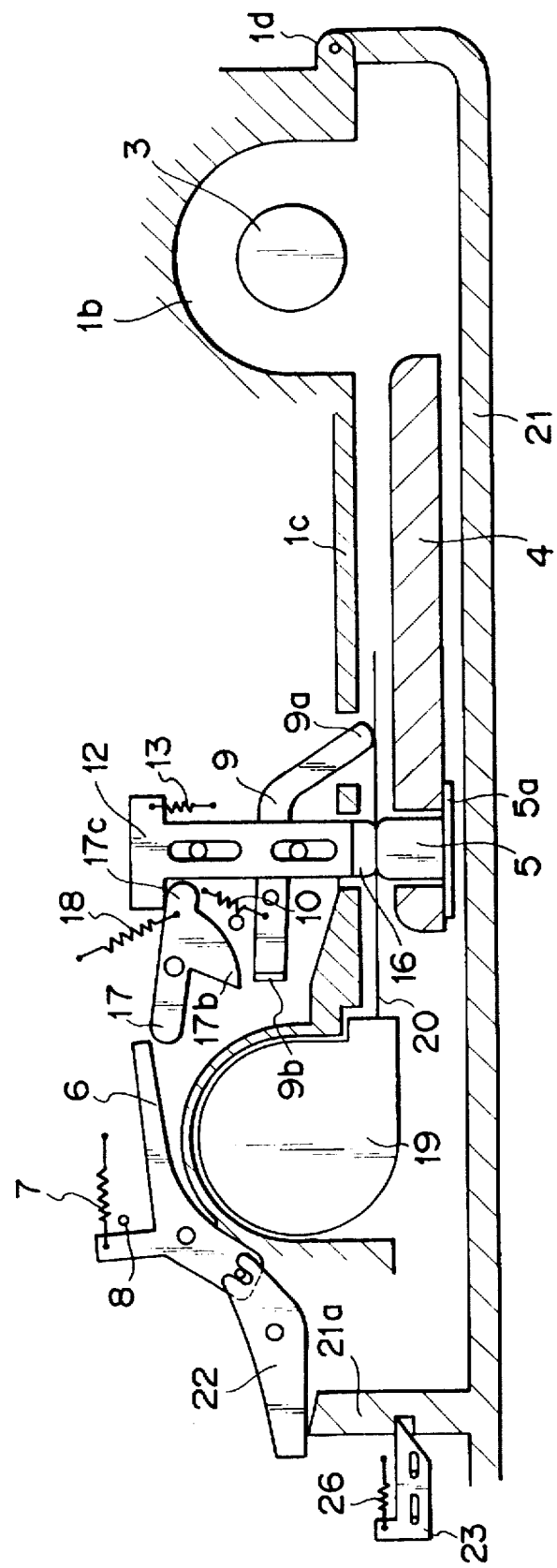
FIG. 3 is a cross-sectional view of the camera in a state wherein the film is fed out from the film cartridge and auto-loading is started.
Figure 4:
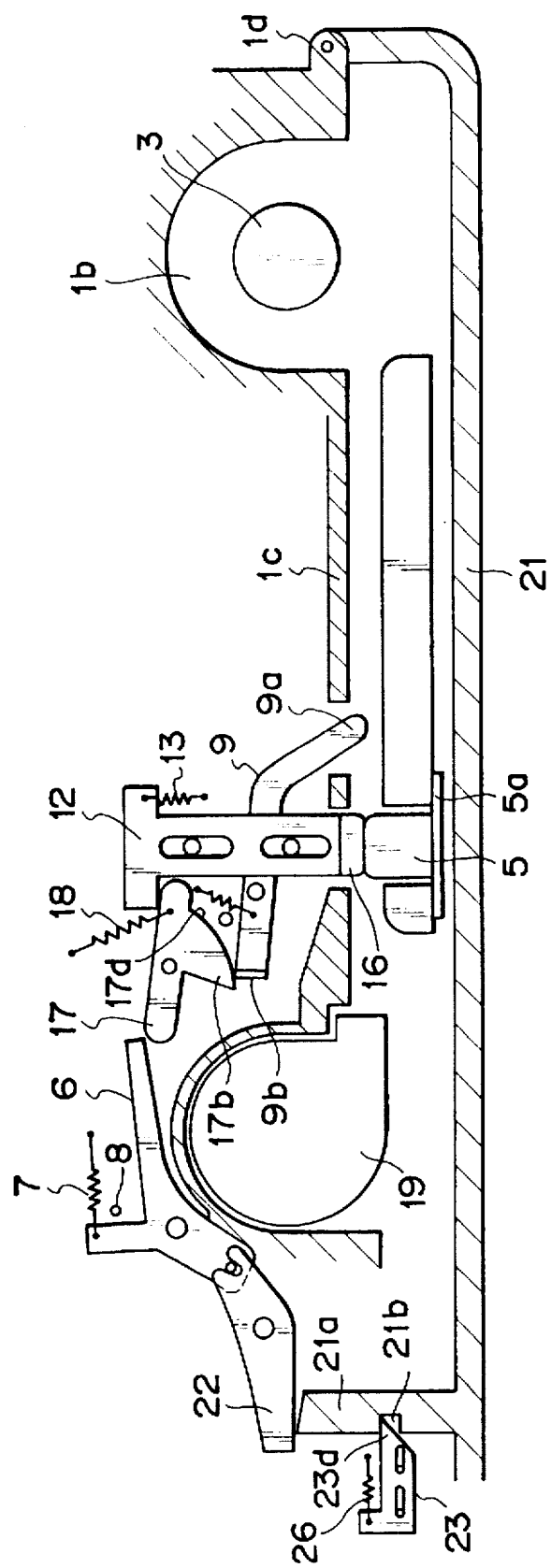
FIG. 4 is a cross-sectional view of the camera in a state wherein the film is rewound in the film cartridge upon completion of a photographic operation.

FIGS. 1 to 4 show the first embodiment of the present invention, in which FIG. 1 is a sectional view of a camera in a state wherein a rear lid is not closed, FIG. 2 is a sectional view of the camera in a state in which a film cartridge is loaded in the camera and the rear lid is closed, FIG. 3 is a sectional view of the camera in a state wherein the film is fed out from the film cartridge and auto-loading is started, and FIG. 4 is a sectional view of the camera in a state wherein the film is rewound in the film cartridge upon completion of a photographic operation.

Referring to FIGS. 1 to 4, a camera body 1 has a cartridge chamber 1a and a film take-up spool chamber 1b. A fork 2 is engaged with a film spool (not shown) of a film cartridge 19 to drive it. A film take-up spool 3 and the fork 2 are operated by a known film feed mechanism disclosed in Japanese Laid-Open Patent Application Nos. 2-67535 and 2-67536. A film platen 4 is mounted on the camera body 1 while maintaining a predetermined distance with a film rail 1c to cause a film 20 in the camera body 1 to pass therethrough. A magnetic head 5 writes information in a magnetic storage portion (not shown) of the film 20 or reads it therefrom. The magnetic head 5 is fixed on the film platen 4 by a mounting plate 5a. A rear lid detection lever 6 is pivotally mounted on the camera body 1. One end of a spring 7 for the rear lid detection lever 6 is mounted on an arm portion 6a of the rear lid detection lever 6. The other end of the spring 7 is mounted on the camera body 1. The spring 7 applies a clockwise biasing force to the rear lid detection lever 6. A stopper 8 is mounted on the camera body 1 to define the clockwise limit position of the rear lid detection lever 6.

A film detection lever 9 is pivotally mounted on the camera body 1 so that the arm portion 9a can enter into or can be retracted from a path, i.e., a traveling path of the film 20, between the film press plate 4 and the film rail surface 1c. One end of a spring 10 for the film detection lever 9 is mounted on the camera body 1, and the other end of the spring 10 is mounted on the film detection lever 9. The spring 10 applies a clockwise biasing force to the film detection lever 9. A stopper 11 defines a clockwise limit position of the film detection lever 9. Shafts 14 and 15 extending on the camera body 1 are slidably fitted in elongated holes 12a and 12b of a press lever 12, so that the press lever 12 can be moved in a direction indicated by an arrow A or in an opposite direction. One end of a spring 13 for the press lever 12 is mounted on the press lever 12, and the other end of the spring 13 is mounted on the camera body 1. The spring 13 biases the press lever 12 in the direction indicated by the arrow A. A pad 16 is mounted on the press lever 12 to urge the film 20 to bring the magnetic storage portion of the film 20 into contact with the magnetic head 5 at a second position. A release lever 17 is pivotally mounted on the camera body 1. One end of a spring 18 for the release lever 17 is mounted on the release lever 17, and the other end of the spring 18 is mounted on the camera body 1. The spring 18 applies a counterclockwise biasing force to the release lever 17.

A rear lid 21 is pivotally mounted on a protruding portion 1d of the camera body 1. A projecting portion 21a of the rear lid 21 is brought into contact with an arm 22b of a rear lid detection interlocking lever 22 (to be described in detail later) when the rear lid 21 is closed, so that the rear lid detection interlocking lever 22 can be rotated clockwise. The rear lid detection interlocking lever 22 is pivotally mounted on the camera body 1, and its groove portion 22a is slidably fitted on a pin 6c of the rear lid detection lever 6 and is interlocked with the rear lid detection lever 6. Pins 24 and 25 of the camera body 1 are respectively slidably fitted in elongated holes 23a and 23b of a rear lid lock ratchet 23. One end of a spring 26 for the rear lid lock ratchet 23 is fixed to the main body 1, and the other end of the spring 26 is fixed to the rear lid lock ratchet 23. The spring 26 applies a biasing force to the rear lid lock ratchet 23 in a direction indicated by an arrow C.

With the above structure, the rear lid 21 is rotated clockwise to be closed. The projecting portion 21a of the rear lid 21 abuts against an inclined surface 23c of the rear lid lock ratchet 23. The rear lid lock ratchet 23 is moved against the biasing force of the spring 26 in a direction opposite to that indicated by the arrow C. A ratchet portion 23d of the rear lid lock ratchet 23 is fitted in a recessed portion 21b by the biasing force of the spring 26, thereby locking the rear lid 21 in a closed state. In order to open the rear lid 21, the rear lid lock ratchet 23 is manually moved against the biasing force of the spring 26 in a direction opposite to that indicated by the arrow C. The recessed portion 21b is disengaged from the ratchet portion 23d, thereby opening the rear lid 21.

When the rear lid is kept open (FIG. 1), an arm portion 6b of the rear lid detection lever 6 is kept in contact with an arm portion 17a of the release lever 17. An arm portion 17b of the release lever 17 is kept engaged with a bent portion 9b of the film detection lever 9. The arm portion 17c is kept in contact with an arm portion 12c of the press lever 12.

In this positional relationship, when a force of the spring 7 acting on the release lever 17, a force of the spring 18 acting on the release lever 17, and a force of the spring 13 acting on the release lever 17 are defined as F1, F2, and F3, respectively, the biasing forces of the springs are determined to satisfy the following conditions:

$$F1+F2>F3$$

and $$F2<F3$$

According to this relationship among the biasing forces, when the rear lid 21 is not kept closed, the pad 16 is to a first position away from a travel path of the film.

When a film cartridge 19 is loaded in the cartridge chamber 1a and the rear lid 21 is closed, the projecting portion 21a of the rear lid 21 abuts against the arm portion 22b of the rear lid detection interlocking lever 22, as shown in FIG. 2. The rear lid detection interlocking lever 22 and the rear lid detection lever 6 are rotated clockwise and counterclockwise, respectively, against the biasing force of the spring 7. Additionally, in accordance with the condition "F2<F3", the press lever 12 tends to rotate in the direction of the arrow A against the biasing force of the spring 18 by means of the biasing force of the spring 13, and the release lever 17 tends to rotate clockwise. However, since the arm portion 17b of the release lever 17 is engaged with the bent portion 9b of the film detection lever 9, the press lever 12 and the release lever 17 are kept stopped. Therefore, the pad 16 does not enter into the travel path of the film 20.

The film 20 is gradually fed out from the film cartridge 19 by the mechanism described in Japanese Laid-Open Patent Application Nos. 2-67535 and 2-67536. However, since the pad 16 is located at the first position outside the film travel path, as described above, the leading end of the film is not caught by the pad, and the film can be smoothly fed.

When the leading end of the film 20 passes by the position of the magnetic head 5, the leading end is brought into contact with the arm portion 9a of the film detection lever 9, as shown in FIG. 3. The spring 10 for the film detection lever 9 is arranged to maintain engagement between the arm portion 17b of the release lever 17 and the bent portion 9b of the film detection lever 9. The biasing force of the spring 10 which acts on the film detection lever 9 is very weak. For this reason, the leading end of the film 20 can easily rotate the film detection lever 9 counterclockwise against the biasing force of the spring 10. In this manner, when the film detection lever 9 is rotated counterclockwise, the arm portion 17b is disengaged from the bent portion 9b. The press lever 12 rotates the release lever 17 clockwise against the biasing force of the spring 18 by means of the biasing force of the spring 13. At the same time, the press lever 12 is moved in the direction of the arrow A from the first position to the second position. The film 20 is urged against the magnetic head 5 by the pad 16 mounted at the distal end of the press lever 12, so that stable information read/write access can be performed. Thereafter, the film 20 is further fed and is wound around the film take-up spool 3 by a known means such as a rubber roller or a gripper, and a normal operation such as photography is performed.

Upon completion of the photographic operation, when the film 20 is stored in the film cartridge 19, the bent portion 9b of the film detection lever 9 is brought into contact with a circumferential portion 17d of the release lever 17, as shown in FIG. 4. When the rear lid 21 is opened and the projecting portion 21a is released from the rear lid detection interlocking lever 22, the initial state shown in FIG. 1 is restored.

In the first embodiment described above, the pad 16 is retracted to the first position outside the feed path of the film 20 or moved to the second position to bring the film 20 into tight contact with the magnetic head 5. However, the pad 16 may be fixed, and the magnetic head 5 may be moved instead of the pad 16, thereby obtaining the same effect as described above, as shown in FIGS. 5 to 8, which illustrates the second embodiment of the present invention.

Figure 5:
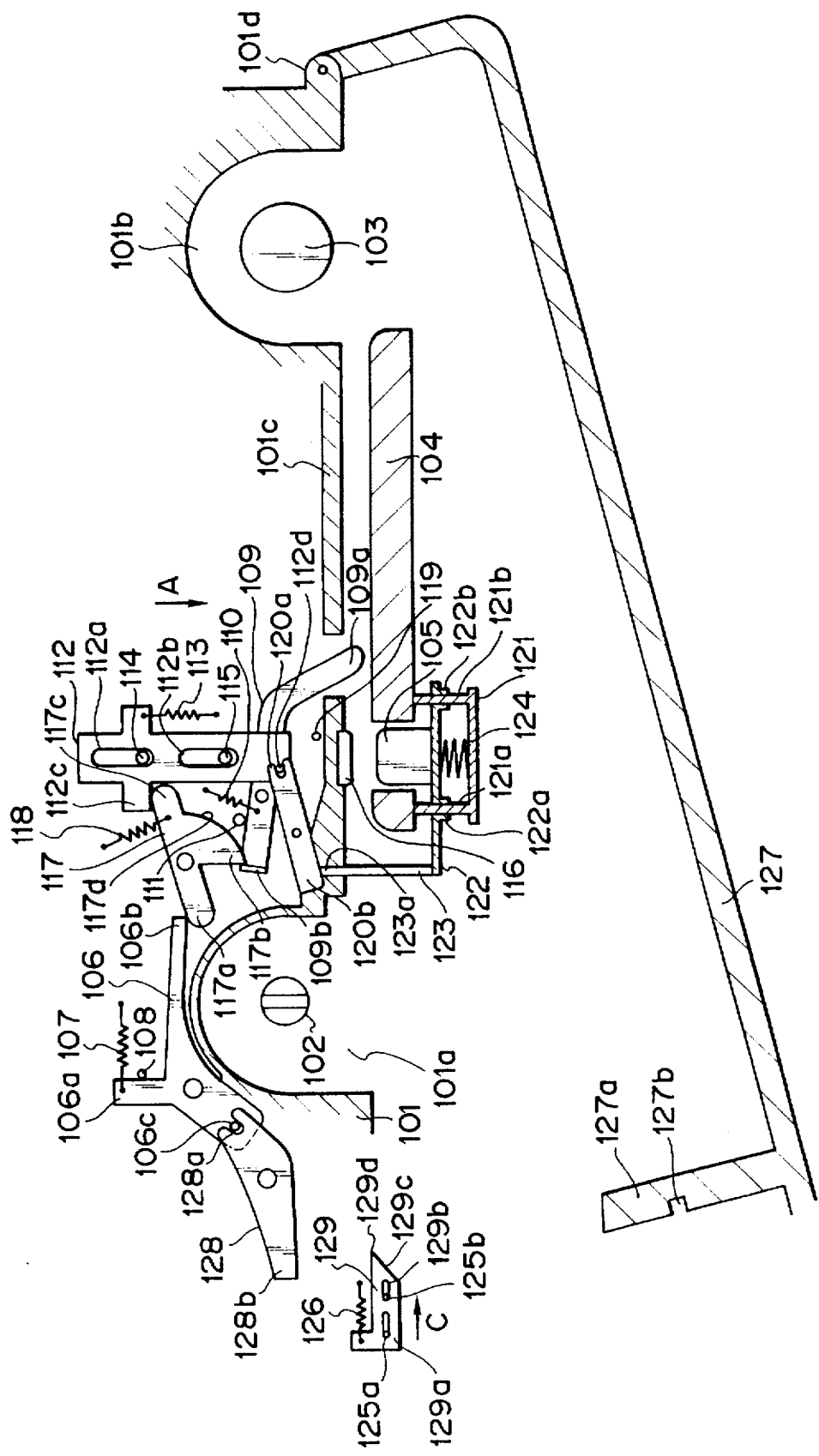
FIG. 5 is a cross-sectional view of the camera in a state wherein a film cartridge is loaded and a rear lid is not closed according to the second embodiment of the present invention.
Figure 6:
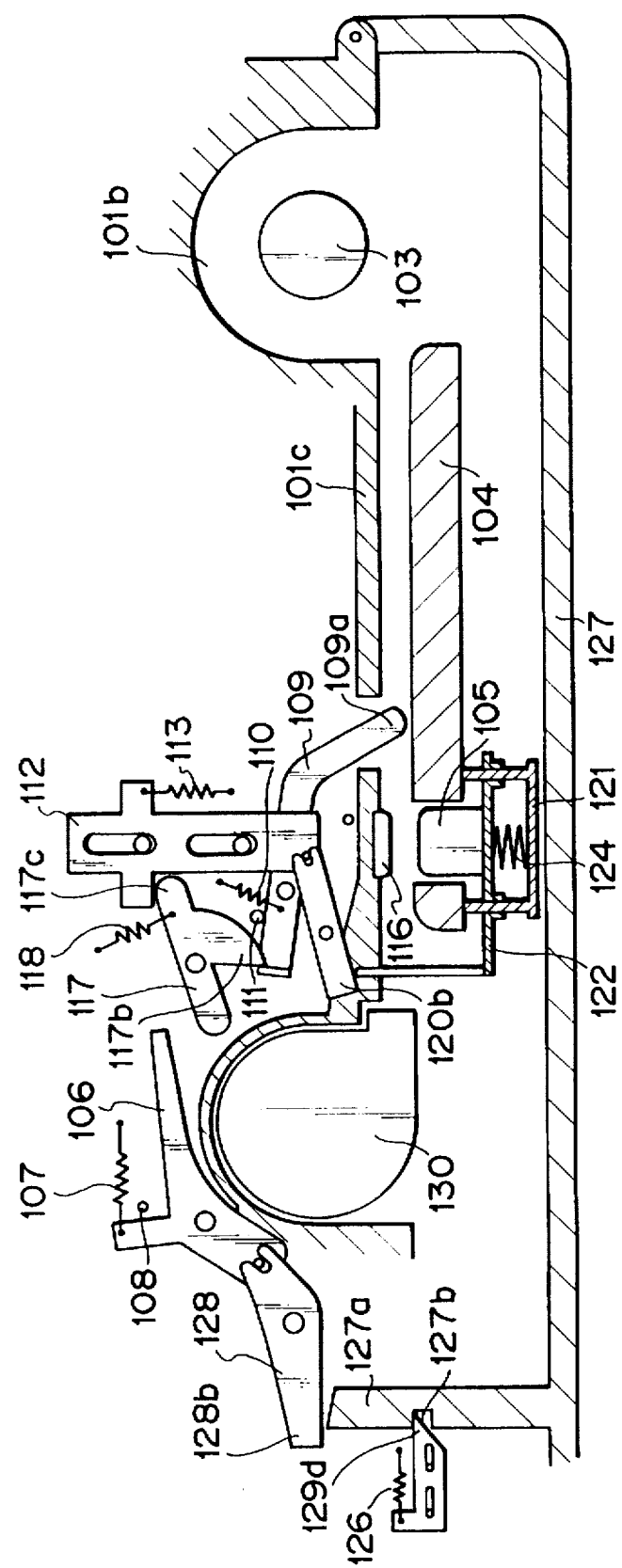
FIG. 6 is a cross-sectional view of the camera in a state wherein the film cartridge is loaded and the rear lid is closed according to the second embodiment of the present invention.
Figure 7:
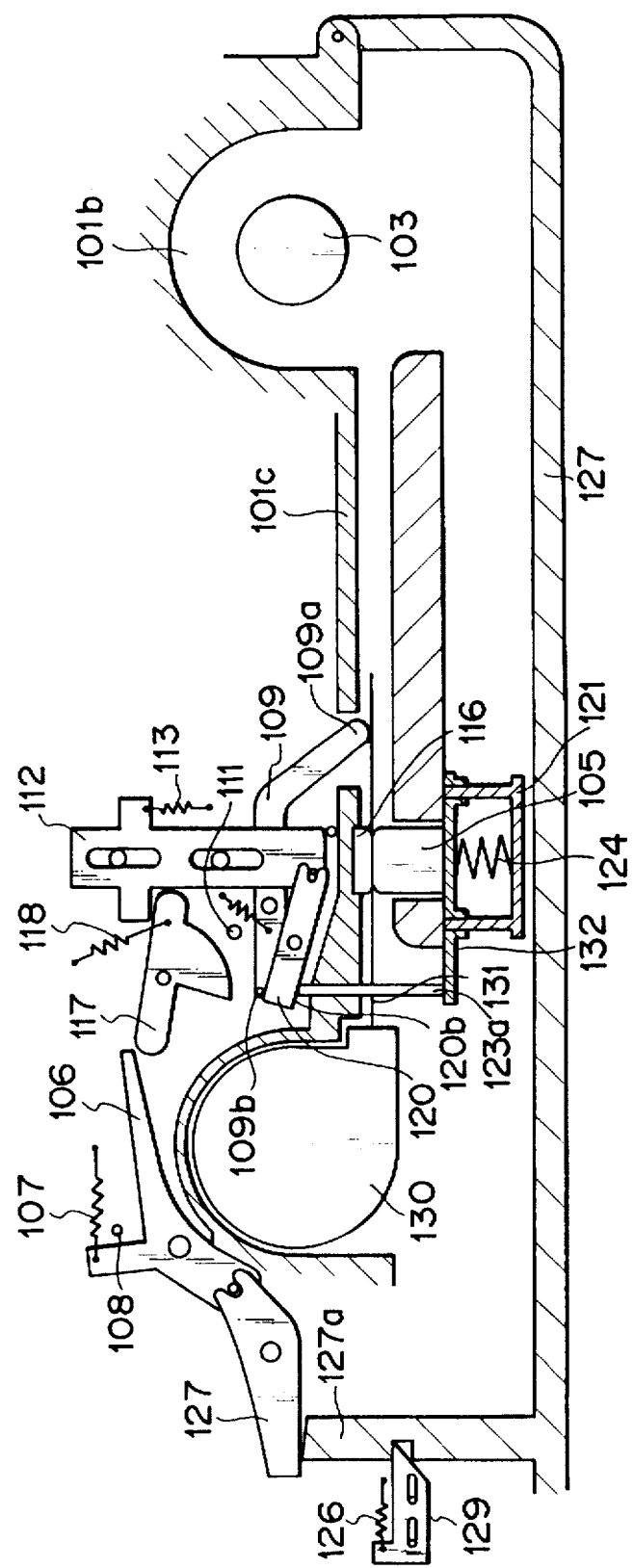
FIG. 7 is a cross-sectional view of the camera in a state wherein the film is fed out from the film cartridge and auto-loading is started.
Figure 8:
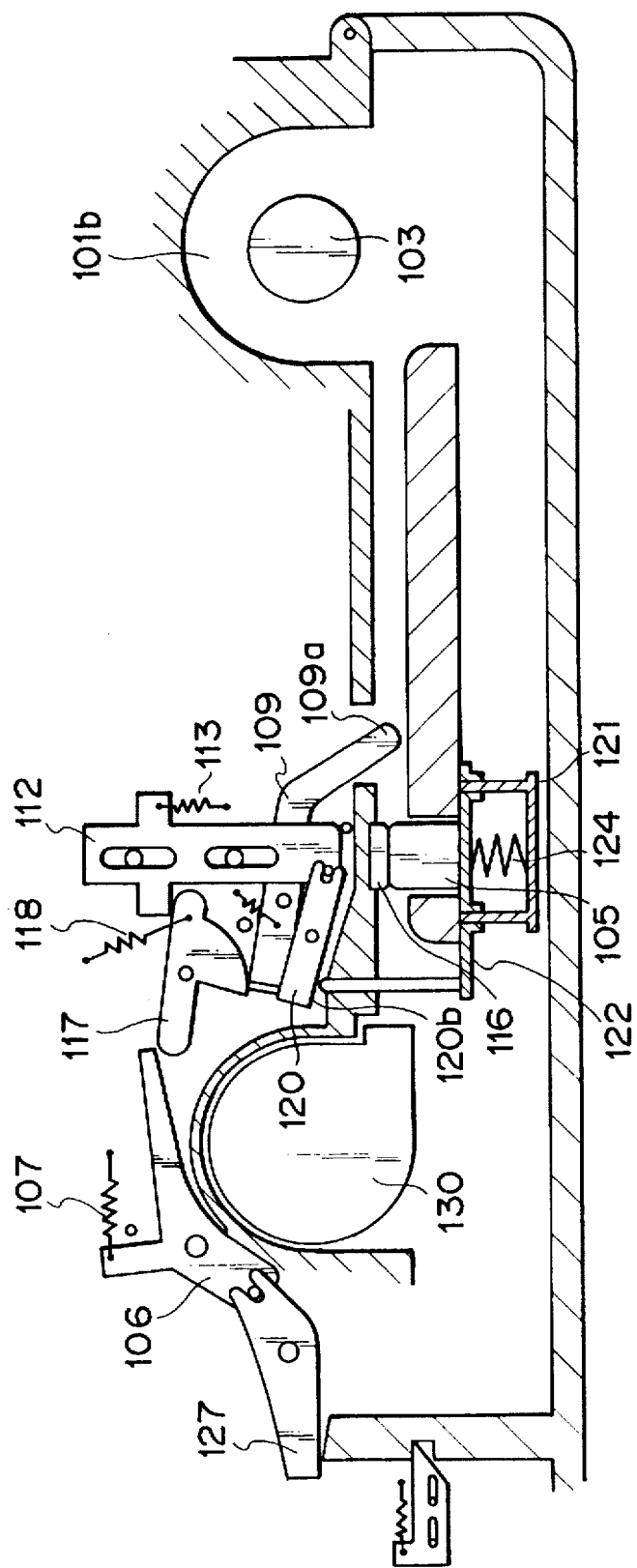
FIG. 8 is a cross-sectional view of the camera in a state wherein the film is rewound in the film cartridge upon completion of a photographic operation.

FIG. 5 is a sectional view of a camera in a state wherein a rear lid is not closed, FIG. 6 is a sectional view of the camera in a state wherein a film cartridge is loaded in the camera and the rear lid is closed, FIG. 7 is a sectional view of the camera in a state wherein a film is fed from the film cartridge and auto-loading is started, and FIG. 8 is a sectional view of the camera in a state wherein the film is rewound into the film cartridge upon completion of a photographic operation.

Referring to FIGS. 5 to 8, a camera body 101 has a cartridge chamber 101a and a film take-up spool chamber 101b. A fork 102 is engaged with a film spool (not shown) of a film cartridge 130. A film take-up spool 103 and the fork 102 are operated by a known film feed mechanism disclosed for example in Japanese Laid-Open Patent Application Nos. 2-67535 and 2-67536. A film platen 104 is mounted on the camera body 101 while maintaining a predetermined distance with a film rail 101c to cause a film 131 in the camera body 101 to pass therethrough. A magnetic head 105 writes information in a magnetic storage portion (not shown) on the film 131 or reads it therefrom. A rear lid detection lever 106 is pivotally mounted on the camera body 101. One end of a spring 107 for the rear lid detection lever 106 is mounted on an arm portion 106a of the rear lid detection lever 106. The other end of the spring 107 is mounted on the camera body 101. The spring 107 provides a clockwise biasing force to the rear lid detection lever 106. A rear lid detection interlocking lever 128 is pivotally mounted on the camera body 101. A groove portion 128a of the rear lid detection interlocking lever 128 is slidably fitted on a pin 106c of the rear lid detection lever 106, so that the rear lid detection interlocking lever 128 is interlocked and moved with the rear lid detection lever 106. A stopper 108 is mounted on the camera body 101 to define the clockwise limit position of the rear lid detection lever 106.

A film detection lever 109 is pivotally mounted on the camera body 101 so that the arm portion 109a can enter into or can be retracted from a path, i.e., a traveling path of the film 131, between the film platen 104 and the film rail surface 101c. One end of a spring 110 for the film detection lever 109 is mounted on the camera body 101, and the other end of the spring 110 is mounted on the film detection lever 109. The spring 110 applies a clockwise biasing force to the film detection lever 109. A stopper 111 defines a clockwise limit position of the film detection lever 109. Shafts 114 and 115 extending on the camera body 101 are slidably fitted in elongated holes 112a and 112b of a press lever 112, so that the press lever 112 can be moved in a direction indicated by an arrow A or in an opposite direction. One end of a spring 113 for the press lever 112 is mounted on the press lever 112, and the other end of the spring 113 is mounted on the camera body 101. The spring 113 biases the press lever 112 in the direction indicated by the arrow A. A pad 116 is fixed to the camera body 101 to support the film 131 from a side opposite the magnetic head 105 toward a side on which the magnetic head 105 urges the film 131. The pad 116 assists in obtaining proper tight contact between the film 131 and the magnetic head 105. A release lever 117 is pivotally mounted on the camera body 101. One end of a spring 118 for the release lever 117 is mounted on the release lever 117, and the other end of the spring 118 is mounted on the camera body 101. The spring 118 applies a counterclockwise biasing force to the release lever 117. A stopper 119 is mounted on the camera body 101 to define the limit position of the press lever 12 in the direction of the arrow A.

A rotary lever 120 is pivotally mounted on the camera body 101. A pin 112d extending on the press lever 112 is slidably fitted in a groove 120a of the rotary lever 120. The rotary lever 120 is rotated upon movement of the press lever 112. A head support table 121 is fixed to the film platen 104 and has shafts 121a and 121b. The magnetic head 105 is mounted on a mounting plate 122, and the mounting plate 122 has sleeves 122a and 122b. The sleeves 122a and 122b are fitted on the shafts 121a and 121b to be slidable in a direction perpendicular to the film surface. One end of a holding rod 123 is fixed to the mounting plate 122. A distal end portion 123a of the holding rod 123 is located at a position to be brought into contact with an arm portion 120b of the rotary lever 120. The distal end portion 123a is urged against the arm portion 120b of the rotary lever 120 by a biasing force of a compression spring 124 (to be described below). This compression spring 124 is interposed between the mounting plate 122 and the head support table 121 to bias the magnetic head 105 and the mounting plate 122 toward the surface of the film 131.

A rear lid 127 is pivotally mounted on a protruding portion 101d of the camera body 101. When the rear lid 127 is closed, a projecting portion 127a of the rear lid 127 abuts against an arm portion 128b of the rear lid detection interlocking lever 128, so that the rear lid detection lever 106 is rotated clockwise. Pins 125a and 125b of the camera body 101 are slidably fitted in elongated holes 129a and 129b of a rear lid locking ratchet 129, respectively. One end of a spring 126 for the rear lid locking ratchet 129 is fixed to the camera body 101, and the other end of the spring 126 is fixed to the rear lid locking ratchet 129. The spring 126 applies a biasing force to the rear lid locking ratchet 129 in a direction of an arrow C.

With the above structure, in order to close the rear lid 127, the rear lid 127 is rotated clockwise. The projecting portion 127a of the rear lid 127 is brought into contact with an inclined surface 129c of the rear lid locking ratchet 129. The rear lid locking ratchet 129 is moved in the direction opposite to that of the arrow C against the biasing force of the spring 126. A ratchet portion 129d of the rear lid locking ratchet 129 is fitted in a recessed portion 127b of the rear lid 127 to lock the rear lid 127 in a closed state. In order to open the rear lid 127, the rear lid locking ratchet 129 is manually moved in the direction opposite to that of the arrow C against the biasing force of the spring 126. The recessed portion 127b is disengaged from the ratchet portion 129d to open the rear lid 127.

In an open state of the rear lid, an arm portion 106b of the rear lid detection lever 106 is in contact with an arm portion 117a of the release lever 117, an arm portion 117b is kept engaged with a bent portion 109b of the film detection lever 109, and an arm portion 117c is kept in contact with an arm portion 112c of the press lever 112, as shown in FIG. 5.

In this positional relationship, if a force of the spring 107 acting on the release lever 117, a force of the spring 118 acting on the release lever 117, a force of the spring 113 acting on the release lever 117, and a force of the spring 124 acting on the release lever 117 are defined as F12, F22, F32, and F42, respectively, the biasing forces of the springs are determined to satisfy the following conditions:

$$F12+F22>F32+F42$$

and $$F22<(F32+F42)$$

According to this relationship of the biasing forces, when the rear lid 127 is not closed, the magnetic head 105 is retracted outside the travel path of the film 131, as shown in FIG. 5.

When the film cartridge 130 is loaded in the cartridge chamber 101a and the rear lid 127 is closed, the projecting portion 127a of the rear lid 127 abuts against the arm portion 128b of the rear lid detection interlocking lever 128 to rotate the rear lid detection interlocking lever 128 and the rear lid detection lever 106 clockwise and counterclockwise, respectively, against the biasing force of the spring 107, as shown in FIG. 6. In accordance with the above relationship of the biasing forces, the press lever 112 tends to rotate in the direction of the arrow A and the release lever 117 tends to rotate clockwise against the biasing force of the spring 118 by means of the biasing force of the spring 113. However, since the arm portion 117b of the release lever 117 is engaged with the bent portion 109b of the film detection lever 109, movements of the press lever 112 and the release lever 117 are stopped, and the magnetic head 105 will not enter into the travel path of the film 131.

The film 131 is fed from the cartridge 130 by a mechanism described in Japanese Laid-Open Patent Application Nos. 2-67535 and 2-67536. In this case, since the magnetic head 105 is located outside the film travel path, the leading end of the film 131 is not caught by the magnetic head 105, and the film 131 can be smoothly fed.

When the leading end of the film 131 passes by the magnetic head 105, the leading end is brought into contact with the arm portion 109a of the film detection lever 109. The spring 110 for the film detection lever 109 is arranged to maintain engagement between the arm portion 117b of the release lever 117 and the bent portion 109b of the film detection lever 109. The biasing force applied from the spring 110 to the film detection lever 109 is very weak. For this reason, the leading end of the film 131 can easily rotate the film detection lever 109 counterclockwise against the biasing force of the spring 110. In this manner, when the film detection lever 109 is rotated counterclockwise, the arm portion 117b is disengaged from the bent portion 109b. The press lever 112, the rotary lever 120, the mounting plate 122, the magnetic head 105, and the like rotate the release lever 117 clockwise against the biasing force of the spring 118 by means of the biasing forces of the spring 113 for the press lever 112 and the spring 124. At the same time, the press lever 112 is moved in the direction of the arrow A. The magnetic head 105 is urged against the film 131 by the biasing force of the spring 124, as shown in FIG. 7, so that stable information read/write access can be performed. In this case, the press lever 112 is stopped by the stopper 119. Thereafter, the film 131 is further fed and is wound around the film take-up spool 103 by a known means such as a rubber roller or a gripper, and normal photography or the like is performed.

Upon completion of the photographic operation, when the film 131 is stored in the film cartridge 130, the bent portion 109b of the film detection lever 109 is brought into contact with a circumferential portion 117d of the release lever 117, as shown in FIG. 8. When the rear lid 127 is opened and the projecting portion 127a is released from the rear lid detection interlocking lever 128, the initial state shown in FIG. 5 is restored.

Figure 9:
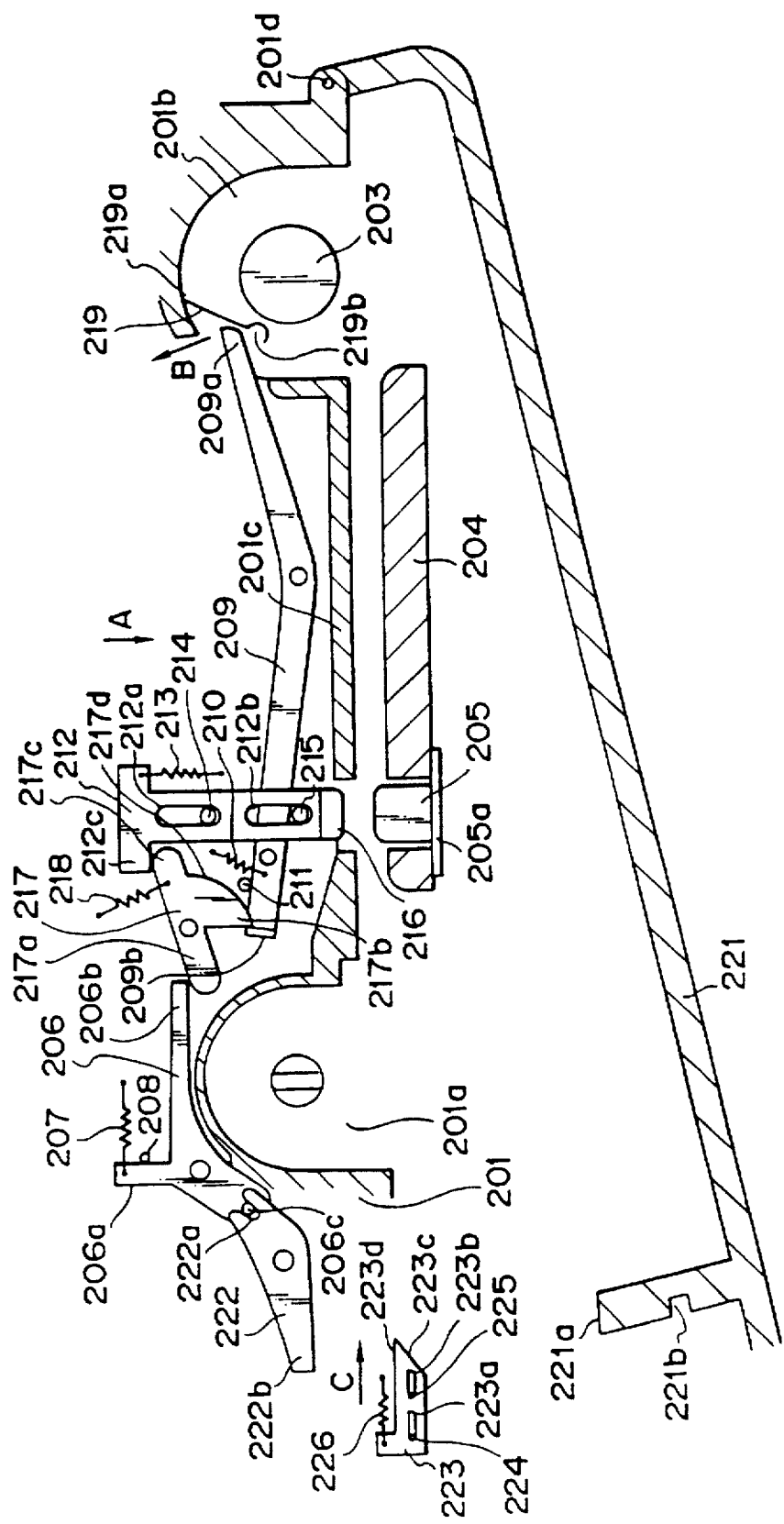
FIG. 9 is a cross-sectional view of a camera in a state wherein a film cartridge is loaded and a rear lid is not closed according to the third embodiment of the present invention.
Figure 10:
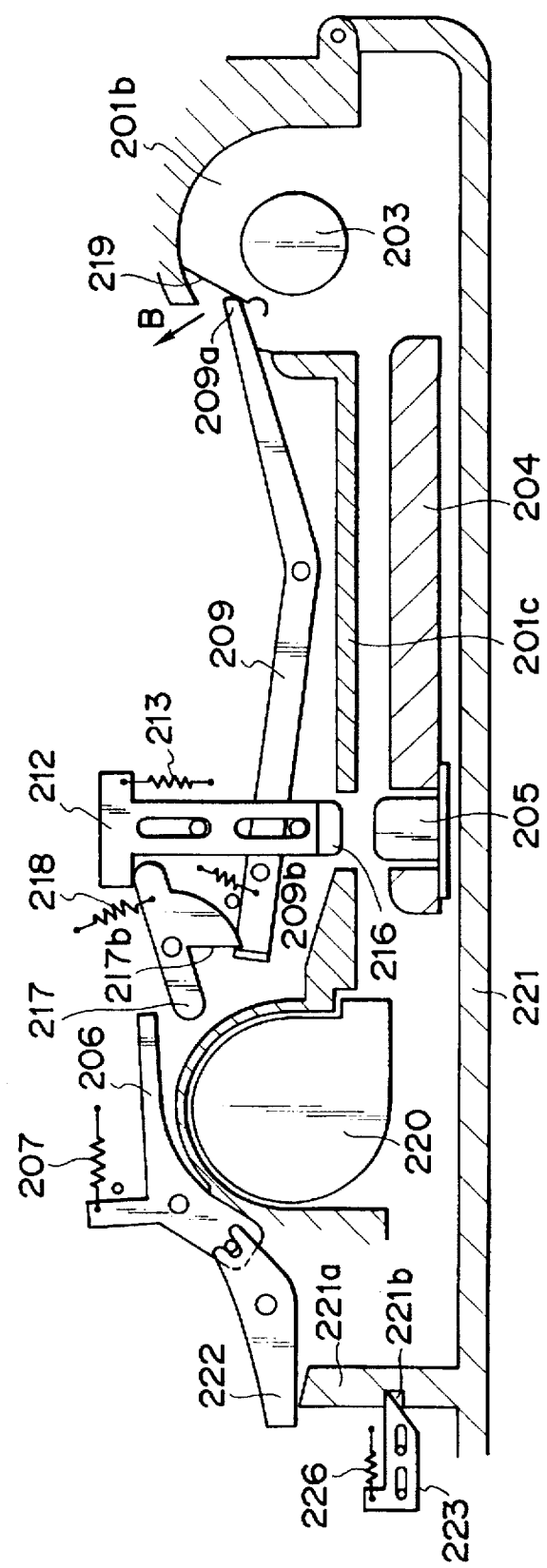
FIG. 10 is a cross-sectional view of the camera in state wherein the film cartridge is loaded and the rear lid is closed according to the third embodiment of the present invention.
Figure 11:
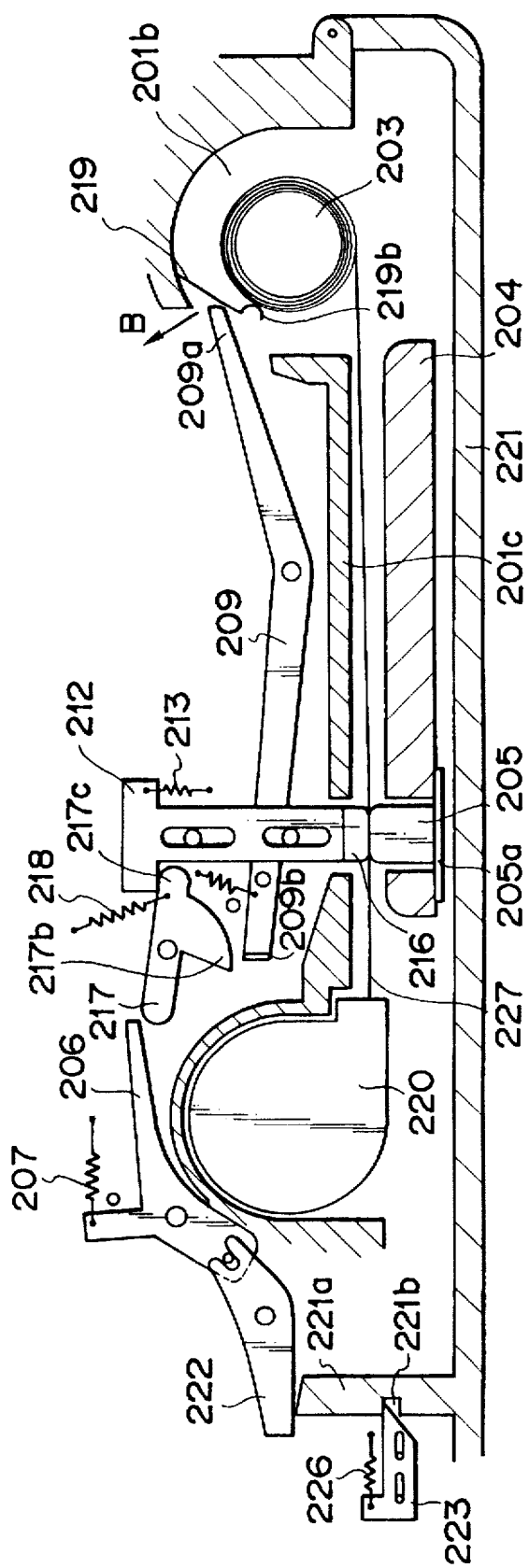
FIG. 11 is a cross-sectional view of the camera in a state wherein the film is fed out from the film cartridge and auto-loading is started.
Figure 12:
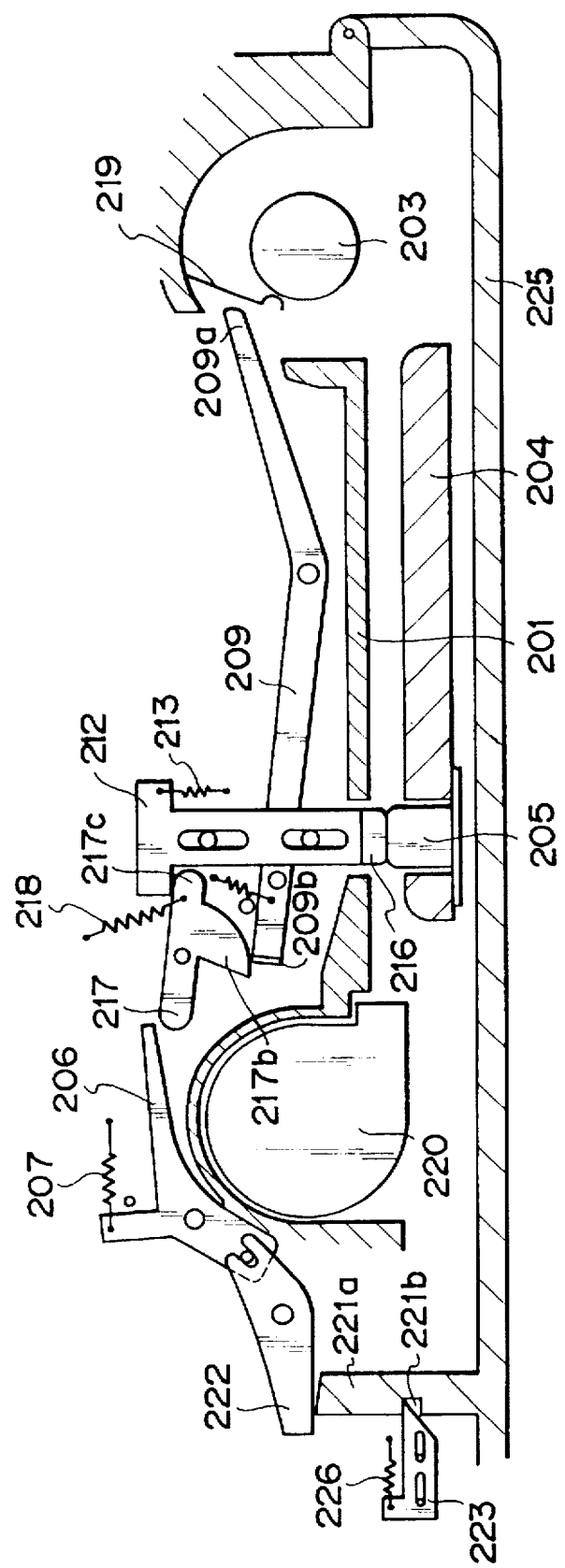
FIG. 12 is a cross-sectional view of the camera in a state wherein the film is rewound in the film cartridge upon completion of a photographic operation.
Figure 13:
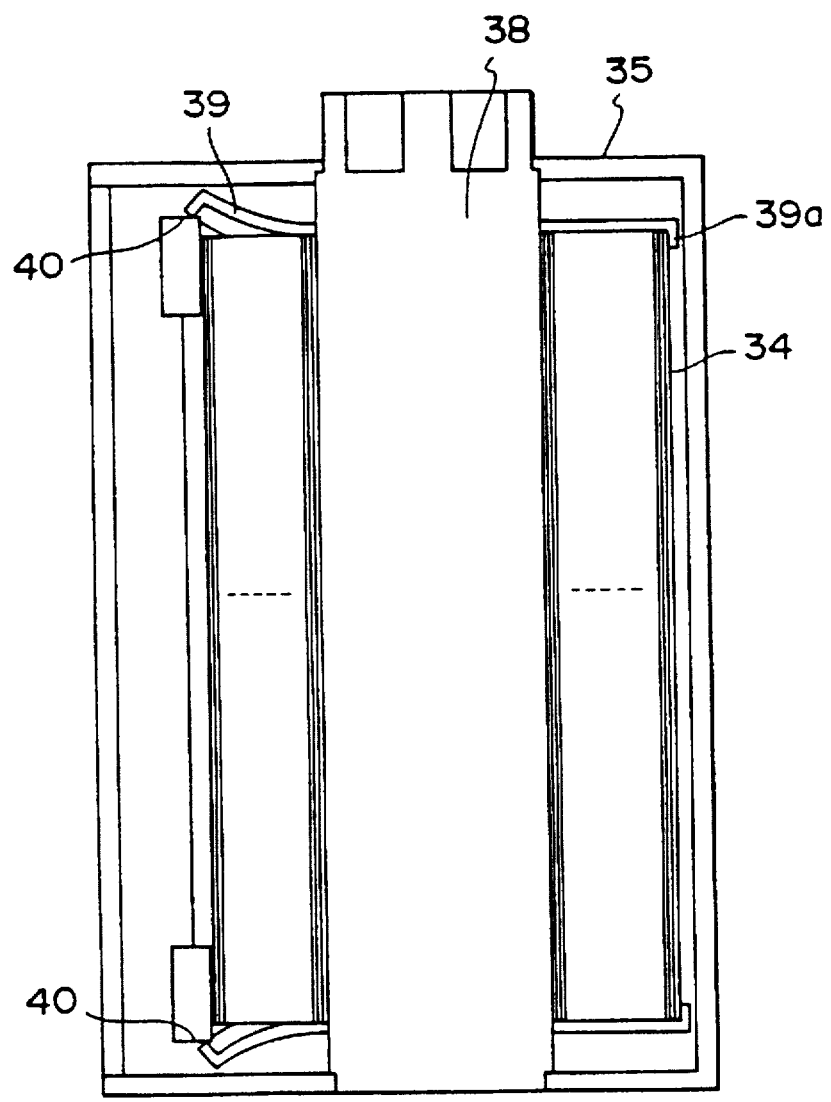
FIG. 13 is a longitudinal sectional view of a thrust type film cartridge used in this embodiment.
Figure 14:
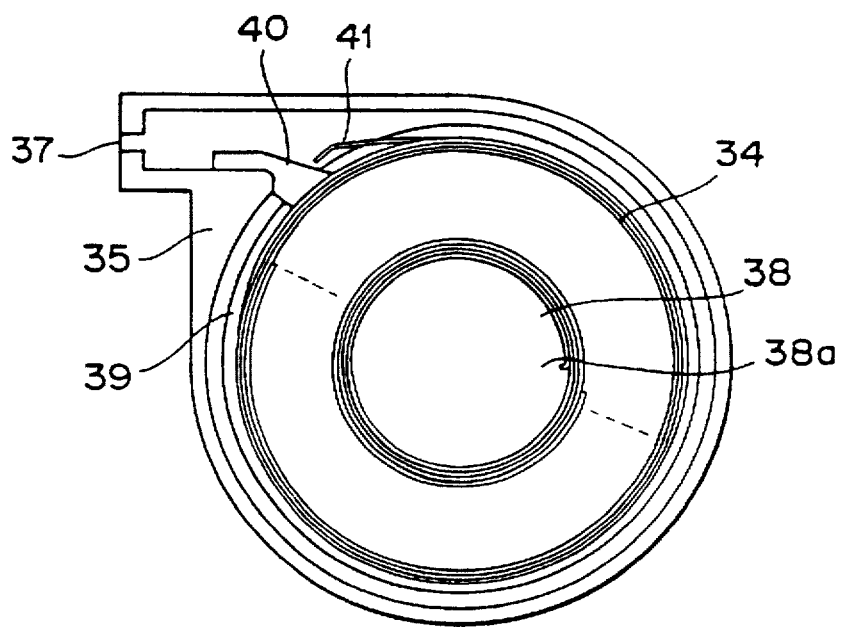
FIG. 14 is a cross-sectional view of the thrust film cartridge shown in FIG. 13.
Figure 15:
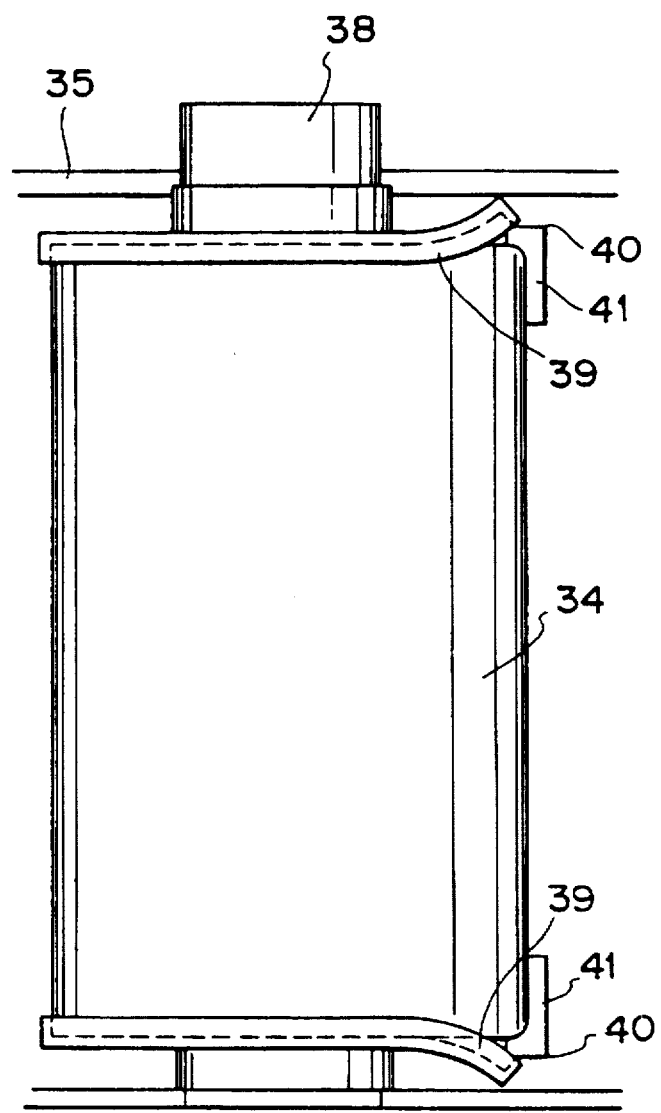
FIG. 15 is a side view showing the main part of the thrust film cartridge shown in FIG. 13.

FIGS. 9 to 12 show the third embodiment of the present invention, in which FIG. 9 is a sectional view of a camera in a state wherein a rear lid is not closed, FIG. 10 is a sectional view of the camera in a state in which a film cartridge is loaded in the camera and the rear lid is closed, FIG. 11 is a sectional view of the camera in a state wherein the film is fed out from the film cartridge and auto-loading is started, and FIG. 12 is a sectional view of the camera in a state wherein the film is rewound in the film cartridge upon completion of a photographic operation.

Referring to FIGS. 9 to 12, a camera body 201 has a cartridge chamber 201a and a film take-up spool chamber 201b. A fork 202 is engaged with a film spool (not shown) of a film cartridge 219 to drive it. A film take-up spool 203 and the fork 202 are operated by a known film feed mechanism disclosed in Japanese Laid-Open Patent Application Nos. 2-67535 and 2-67536. A film platen 204 is mounted on the camera body 201 while maintaining a predetermined distance with a film rail 201c to cause a film 227 in the camera body 201 to pass therethrough. A magnetic head 205 writes information in a magnetic storage portion (not shown) of the film 227 or reads it therefrom. The magnetic head 205 is fixed on the film platen 204 by a mounting plate 205a. A rear lid detection lever 206 is pivotally mounted on the camera body 201. One end of a spring 207 for the rear lid detection lever 206 is mounted on an arm portion 206a of the rear lid detection lever 206. The other end of the spring 207 is mounted on the camera body 201. The spring 207 applies a clockwise biasing force to the rear lid detection lever 206. A stopper 208 is mounted on the camera body 201 to define the clockwise limit position of the rear lid detection lever 206.

One end of a film detection leaf spring 219 is fixed on the inner wall of the spool chamber 201b of the camera body 201, and the other end of the film detection leaf spring 219 is rounded and contacts with the spool 203, and is biased to be deformable in a direction of an arrow B. A film detection lever 209 is pivotally mounted on the camera body 201, and the arm portion 209a is located on the rear surface of a free end 219b of the film detection spring 219. One end of a spring 210 for the film detection lever 209 is mounted on the camera body 201, and the other end of the spring 210 is mounted on the film detection lever 209. The spring 210 applies a clockwise biasing force to the film detection lever 209. A stopper 211 defines a clockwise limit position of the film detection lever 209. Shafts 214 and 215 extending on the camera body 201 are slidably fitted in elongated holes 212a and 212b of a press lever 212, so that the press lever 212 can be moved in a direction indicated by an arrow A or in an opposite direction. One end of a spring 213 for the press lever 212 is mounted on the press lever 212, and the other end of the spring 213 is mounted on the camera body 201. The spring 213 biases the press lever 212 in the direction indicated by the arrow A. A pad 216 is mounted on the press lever 212 to urge the film 227 to bring the magnetic storage portion of the film 227 into contact with the magnetic head 205. A release lever 217 is pivotally mounted on the camera body 201. One end of a spring 218 for the release lever 217 is mounted on the release lever 217, and the other end of the spring 218 is mounted on the camera body 201. The spring 218 applies a counterclockwise biasing force to the release lever 217.

A rear lid 221 is pivotally mounted on a protruding portion 201d of the camera body 201. A projecting portion 221a of the rear lid 221 is brought into contact with an arm 222b of a rear lid detection interlocking lever 222 (to be described in detail later) when the rear lid 221 is closed, so that the rear lid detection interlocking lever 222 can be rotated clockwise. The rear lid detection interlocking lever 222 is pivotally mounted on the camera body 201, and its groove portion 222a is slidably fitted on a pin 206c of the rear lid detection lever 206 and is interlocked with the rear lid detection lever 206. Pins 224 and 225 of the camera body 201 are respectively slidably fitted in elongated holes 223a and 223b of a rear lid lock ratchet 223. One end of a spring 226 for the rear lid lock ratchet 223 is fixed to the main body 201, and the other end of the spring 226 is fixed to the rear lid lock ratchet 223. The spring 226 applies a biasing force to the rear lid lock ratchet 223 in a direction indicated by an arrow C (FIG. 9).

With the above structure, the rear lid 221 is rotated clockwise to close the rear lid 221. The projecting portion 221a of the rear lid 221 abuts against an inclined surface 223c of the rear lid lock ratchet 223. The rear lid lock ratchet 223 is moved against the biasing force of the spring 226 in a direction opposite to that indicated by the arrow C. A ratchet portion 223d of the rear lid lock ratchet 223 is fitted in a recessed portion 221b by the biasing force of the spring 226, thereby locking the rear lid 221 in a closed state. In order to open the rear lid 221, the rear lid lock ratchet 223 is manually moved against the biasing force of the spring 226 in a direction opposite to that indicated by the arrow C. The recessed portion 221b is disengaged from the ratchet portion 223d, thereby opening the rear lid 221.

When the rear lid is kept open (FIG. 9), an arm portion 206b of the rear lid detection lever 206 is kept in contact with an arm portion 217a of the release lever 217. An arm portion 217b of the release lever 217 is kept engaged with a bent portion 209b of the film detection lever 209. The arm portion 217c is kept in contact with an arm portion 212c of the press lever 212.

In this positional relationship, when a force of the spring 207 acting on the release lever 217, a force of the spring 218 acting on the release lever 217, and a force of the spring 213 acting on the release lever 217 are defined as F13, F23, and F33, respectively, the biasing forces of the springs are determined to satisfy the following conditions:

$$F13 + F23 > F33$$

and $$F23 < F33$$

According to this relationship among the biasing forces, when the rear lid 221 is not kept closed, the pad 216 is retracted from a travel path of the film.

In this embodiment, the film 227 is wound around the film take-up spool 203. When the film winding operation is completed, photography is performed for every frame while the film 227 is rewound into the film cartridge 220 with frame indexing. That is, this embodiment assumes a so-called "prewind" type camera.

When a film cartridge 220 is loaded in the cartridge chamber 201a and the rear lid 221 is closed, the projecting portion 221a of the rear lid 221 abuts against the arm portion 222b of the rear lid detection interlocking lever 222, as shown in FIG. 10. The rear lid detection interlocking lever 222 and the rear lid detection lever 206 are rotated clockwise and counterclockwise, respectively, against the biasing force of the spring 207. Judging from the condition "F23<F33", the press lever 212 tends to rotate in the direction of the arrow A against the biasing force of the spring 218 by means of the biasing force of the spring 213, and the release lever 217 tends to rotate clockwise. However, since the arm portion 217b of the release lever 217 is engaged with the bent portion 209b of the film detection lever 209, the press lever 212 and the release lever 217 are kept stopped. Therefore, the pad 216 does not enter into the travel path of the film 227.

The film 227 is gradually fed out from the film cartridge 219 by the mechanism described in Japanese Laid-Open Patent Application Nos. 2-67535 and 2-67536. However, since the pad 216 is located outside the film travel path, as described above, the leading end of the film is not caught by the pad, and the film can be smoothly fed.

When the leading end of the film 227 passes by the position of the magnetic head 205, the film 227 is wound around the spool 203 by a known means such as a rubber roller formed on the film take-up spool 203 or a gripper formed on the spool 203. At this time, the film detection leaf spring 219 urges the film 227 against the spool 203, thereby assisting loading of the film 227.

When the film 227 is gradually wound around the film take-up spool 203, the film detection leaf spring 219 is deformed in the direction of the arrow B, abuts against an arm portion 209a of the film detection lever 209, and further moves the film detection lever 209 upward, as shown in FIG. 11. The spring 210 for the film detection lever 209 is arranged to maintain engagement between the arm portion 217b of the release lever 217 and the bent portion 209b of the film detection lever 209. The biasing force of the spring 210 which acts on the film detection lever 209 is very weak. For this reason, the film detection leaf spring 210 easily rotates the film detection lever 209 counterclockwise against the biasing force of the spring 210. In this manner, when the film detection lever 209 is rotated counterclockwise, the arm portion 217b is disengaged from the bent portion 209b. The press lever 212 rotates the release lever 217 clockwise against the biasing force of the spring 218 by means of the biasing force of the spring 213. At the same time, the press lever 212 is moved in the direction of the arrow A. The film 227 is urged against the magnetic head 205 by the pad 216 mounted at the distal end of the press lever 212, so that stable information read/write access can be performed.

When the film 227 is completely wound, frame indexing is performed to take each picture while the film 227 is rewound into the film cartridge 220. At this time, the magnetic head 205 writes information in the magnetic storage portion of the film 227 or reading it therefrom. When the remaining amount of film wound around the spool 203 is reduced and the film detection leaf spring 219 is deformed in a direction opposite to that of the arrow B, i.e., during return to the initial position, the film detection lever 209 is rotated clockwise. As shown in FIG. 12, the bent portion 209b of the film detection lever 209 abuts against a circumferential portion 217d of the release lever 217. The rear lid 221 is opened and the projecting portion 221a of the rear lid 221 is disengaged from the rear lid detection interlocking lever 222, the initial state shown in FIG. 9 is restored.

According to each embodiment described above, when the rear lid is not closed, the pad or magnetic head is retracted outside the film travel path. When the leading end of the film is fed out from the film cartridge and passes by the position of the magnetic head, the pad or magnetic head is urged against the film surface. During auto-loading, the leading end of the film is not caught by the magnetic head or pad, and the film can be smoothly and continuously fed.

A special drive source such as an expensive motor need not be used to retract the magnetic head or pad from the film travel path, thereby providing a low-cost camera.

Figure 16:
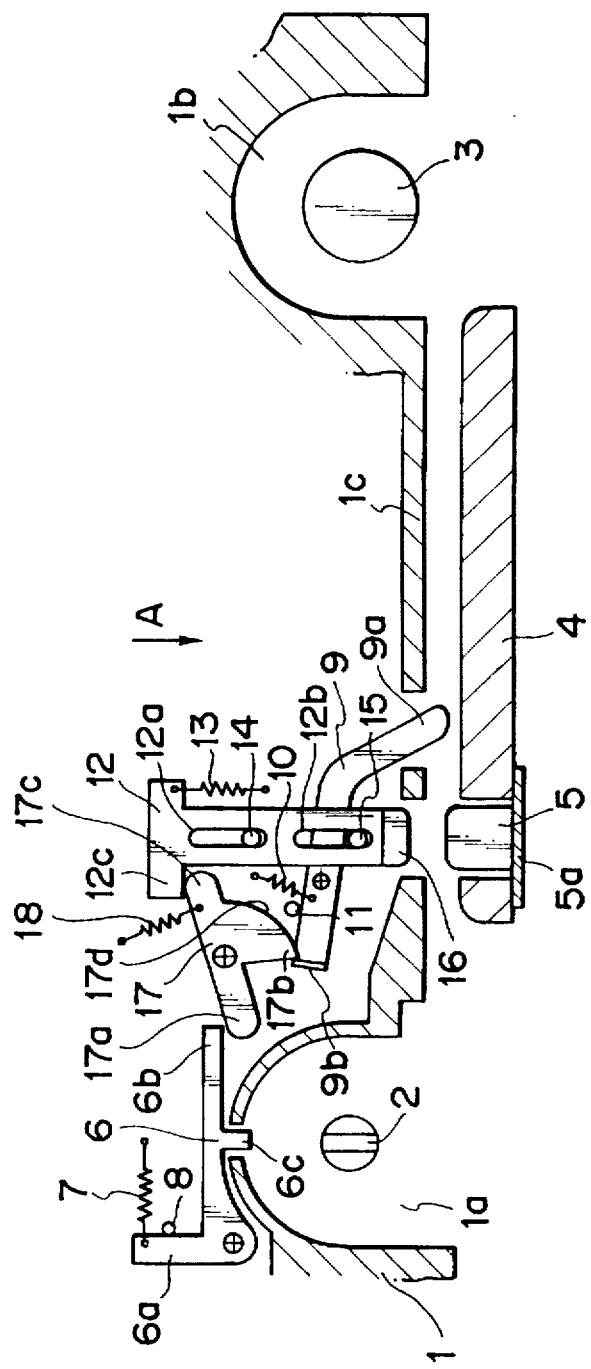
FIG. 16 is a cross-sectional view of a camera in a state wherein a film cartridge is not loaded according to the fourth embodiment of the present invention.
Figure 17:
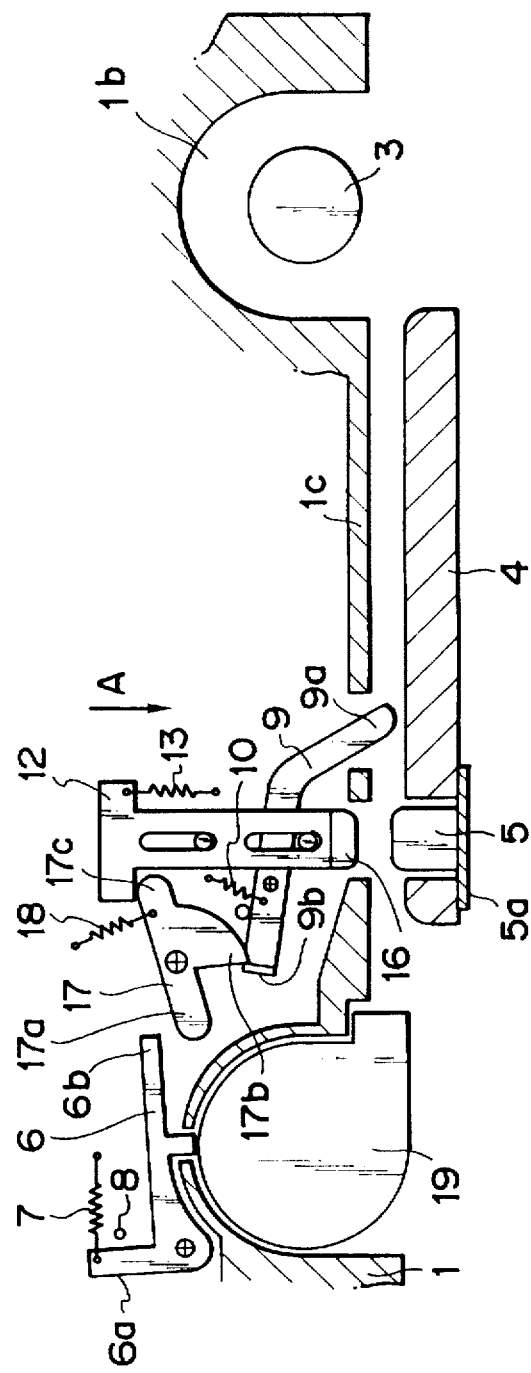
FIG. 17 is a cross-sectional view of the camera in a state wherein the film cartridge is loaded.
Figure 18:
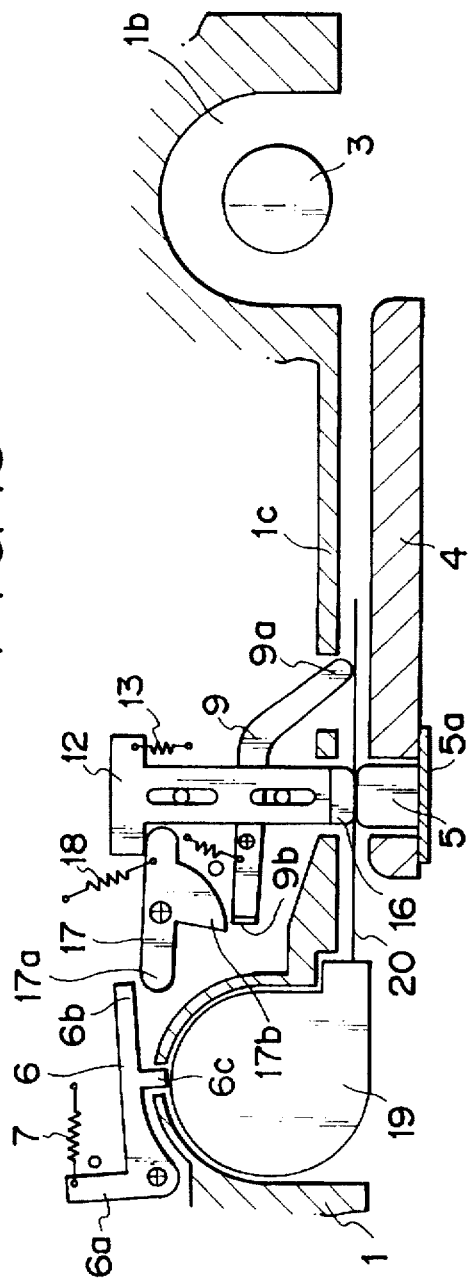
FIG. 18 is a cross-sectional view of the camera in a state wherein the film is fed out from the film cartridge and auto-loading is started.
Figure 19:
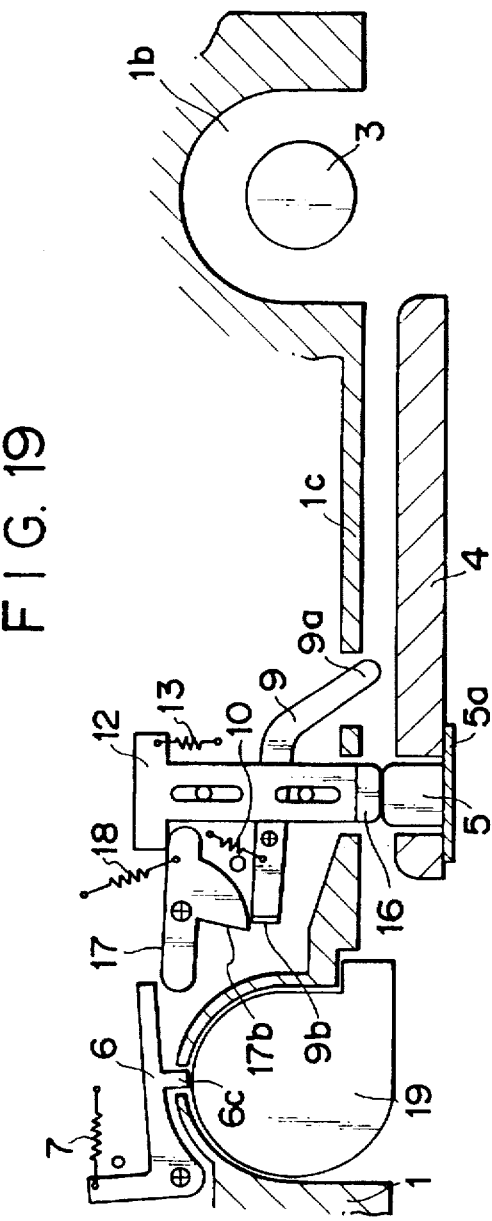
FIG. 19 is a cross-sectional view of the camera in a state wherein the film is rewound in the film cartridge upon completion of a photographic operation.

FIGS. 16 to 19 show the fourth embodiment of the present invention, in which FIG. 16 is a sectional view of a camera in a state wherein a film cartridge is not loaded in the camera, FIG. 17 is a sectional view of the camera in a state in which the film cartridge is loaded in the camera, FIG. 18 is a sectional view of the camera in a state wherein the film is fed out from the film cartridge and auto-loading is started, and FIG. 19 is a sectional view of the camera in a state wherein the film is rewound in the film cartridge upon completion of a photographic operation.

Referring to FIGS. 16 to 19, a camera body 1 has a cartridge chamber 1a and a film take-up spool chamber 1b. A fork 2 is engaged with a film spool (not shown) of a film cartridge 19 to drive it. A film take-up spool 3 and the fork 2 are operated by a known film feed mechanism disclosed in Japanese Laid-Open Patent Application Nos. 2-67535 and 2-67536. A film platen 4 is mounted on the camera body 1 while maintaining a predetermined distance with a film rail 1c to cause a film 20 in the camera body 1 to pass therethrough. A magnetic head 5 writes information in a magnetic storage portion (not shown) of the film 20 or reads it therefrom. The magnetic head 5 is fixed on the film platen 4 by a mounting plate 5a. A cartridge detection lever 6 is pivotally mounted on the camera body 1. One end of a spring 7 for the cartridge detection lever 6 is mounted on an arm portion 6a of the cartridge detection lever 6. The other end of the spring 7 is mounted on the camera body 1. The spring 7 applies a clockwise biasing force to the cartridge detection lever 6. A stopper 8 is mounted on the camera body 1 to define the clockwise limit position of the cartridge detection lever 6.

A film detection lever 9 is pivotally mounted on the camera body 1 so that the arm portion 9a can enter into or can be retracted from a path, i.e., a traveling path of the film 20, between the film press plate 4 and the film rail surface 1c. One end of a spring 10 for the film detection lever 9 is mounted on the camera body 1, and the other end of the spring 10 is mounted on the film detection lever 9. The spring 10 applies a clockwise biasing force to the film detection lever 9. A stopper 11 defines a clockwise limit position of the film detection lever 9. Shafts 14 and 15 extending on the camera body 1 are slidably fitted in elongated holes 12a and 12b of a press lever 12, so that the press lever 12 can be moved in a direction indicated by an arrow A or in an opposite direction. One end of a spring 13 for the press lever 12 is mounted on the press lever 12, and the other end of the spring 13 is mounted on the camera body 1. The spring 13 biases the press lever 12 in the direction indicated by the arrow A. A pad 16 is mounted on the press lever 12 to urge the film 20 to bring the magnetic storage portion of the film 20 into contact with the magnetic head 5. A release lever 17 serving as a position variable member is pivotally mounted on the camera body 1. One end of a spring 18 for the release lever 17 is mounted on the release lever 17, and the other end of the spring 18 is mounted on the camera body 1. The spring 18 applies a counterclockwise biasing force to the release lever 17.

When the film cartridge 19 is not loaded (FIG. 16), an arm portion 6b of the cartridge detection lever 6 is kept in contact with an arm portion 17a of the release lever 17. An arm portion 17b of the release lever 17 is located at a position where it is engageable with a bent portion 9b of the film detection lever 9. The arm portion 17c is kept in contact with an arm portion 12c of the press lever 12.

In this positional relationship, when a force of the spring 7 acting on the release lever 17, a force of the spring 18 acting on the release lever 17, and a force of the spring 13 acting on the release lever 17 are defined as F1, F2, and F3, respectively the biasing forces of the springs are determined to satisfy the following conditions:

$$F1+F2>F3$$

and $$F2<F3$$

According to this relationship among the biasing forces, when the film cartridge 19 is not loaded, the pad 16 is retracted from a travel path of the film, as shown in FIG. 16.

When the film cartridge 19 is loaded in the cartridge chamber 1a, the film cartridge 19 abuts against a projecting portion 6c of the cartridge detection lever 6, and the cartridge detection lever 6 is rotated counterclockwise against the biasing force of the spring 7, as shown in FIG. 17. Judging from the condition "F2<F3", the press lever 12 tends to rotate in the direction of the arrow A against the biasing force of the spring 18 by means of the biasing force of the spring 13, and the release lever 17 tends to rotate clockwise. However, since the arm portion 17b of the release lever 17 is engaged with the bent portion 9b of the film detection lever 9, the press lever 12 and the release lever 17 are kept stopped. Therefore, the pad 16 does not enter into the travel path of the film 20.

The film 20 is gradually fed out from the film cartridge 19 by the mechanism described in Japanese Laid-Open Patent Application Nos. 2-67535 and 2-67536. However, since the pad 16 is located outside the film travel path, as described above, the leading end of the film is not caught by the pad, and the film can be smoothly fed.

When the leading end of the film 20 passes by the position of the magnetic head 5, the leading end is brought into contact with the arm portion 9a of the film detection lever 9, as shown in FIG. 18. The spring 10 for the film detection lever 9 is arranged to maintain engagement between the arm portion 17b of the release lever 17 and the bent portion 9b of the film detection lever 9. The biasing force of the spring 10 which acts on the film detection lever 9 is very weak. For this reason, the leading end of the film 20 can easily rotate the film detection lever 9 counterclockwise against the biasing force of the spring 10. In this manner, when the film detection lever 9 is rotated counterclockwise, the arm portion 17b is disengaged from the bent portion 9b. The press lever 12 rotates the release lever 17 clockwise against the biasing force of the spring 18 by means of the biasing force of the spring 13. At the same time, the press lever 12 is moved in the direction of the arrow A. The film 20 is urged against the magnetic head 5 by the pad 16 mounted at the distal end of the press lever 12, so that stable information read/write access can be performed. Thereafter, the film 20 is further fed and is wound around the film take-up spool 3 by a known means such as a rubber roller or a gripper, and normal photography or the like is performed.

Upon completion of the photographic operation, when the film 20 is stored in the film cartridge 19, the bent portion 9b of the film detection lever 9 is brought into contact with a circumferential portion 17d of the release lever 17, as shown in FIG. 19. When the film cartridge 19 is unloaded from the cartridge chamber 1b, the initial state shown in FIG. 16 is restored.

Figure 20:
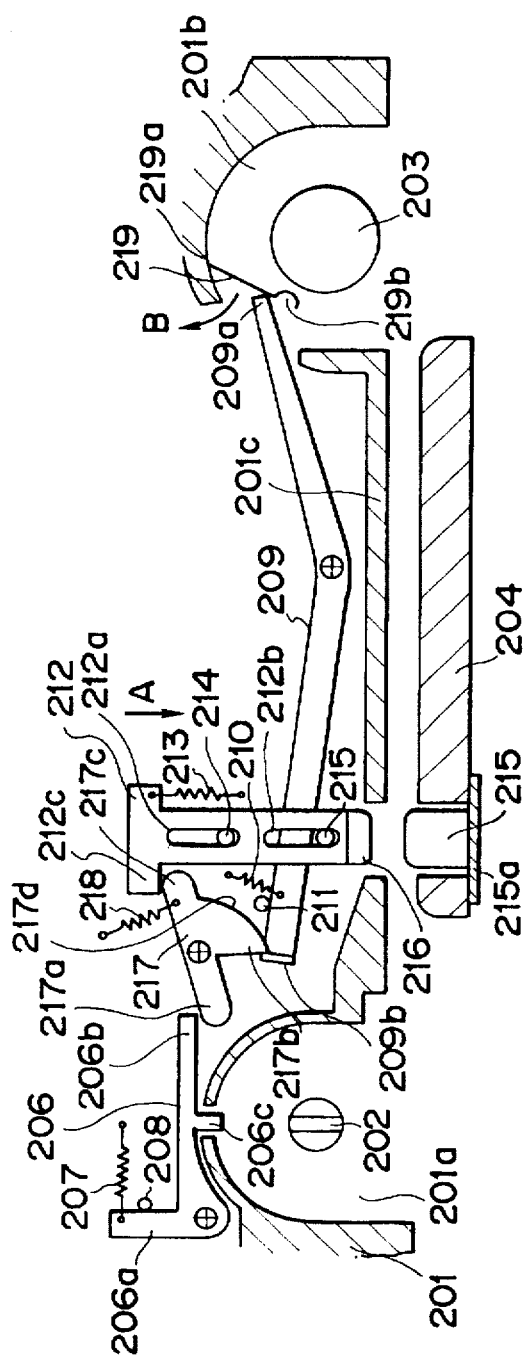
FIG. 20 is a cross-sectional view of a camera in a state wherein a film cartridge is not loaded according to the fifth embodiment of the present invention.
Figure 21:
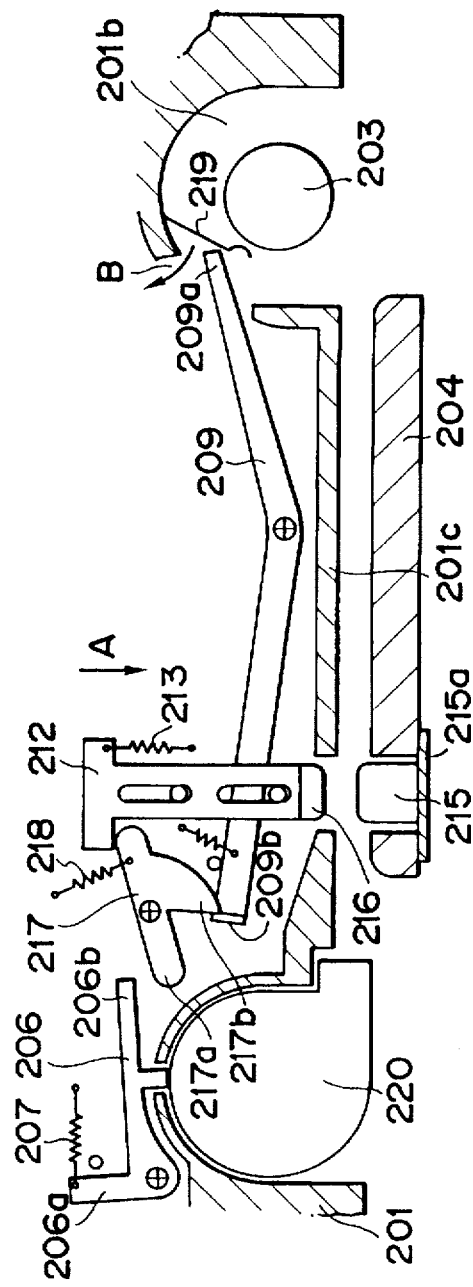
FIG. 21 is a cross-sectional view of the camera in a state wherein the film cartridge is loaded.
Figure 22:
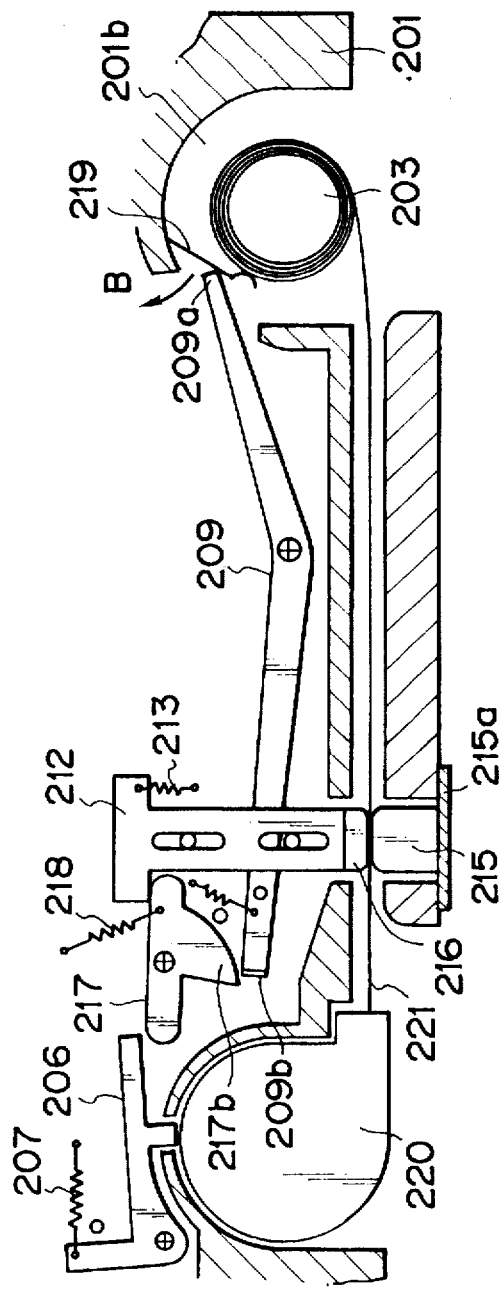
FIG. 22 is a cross-sectional view of the camera in a state wherein the film is fed out from the film cartridge and auto-loading is started.
Figure 23:
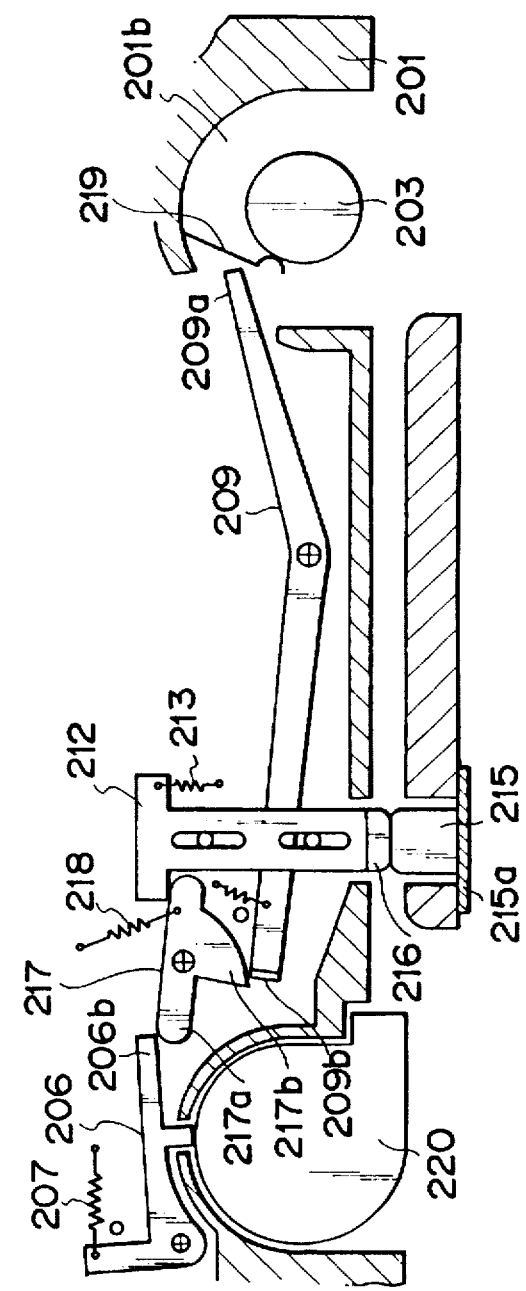
FIG. 23 is a cross-sectional view of the camera in a state wherein the film is rewound in the film cartridge upon completion of a photographic operation.

FIGS. 20 to 23 show the fifth embodiment of the present invention, in which FIG. 20 is a sectional view of a camera in a state wherein a film cartridge is not loaded in the camera, FIG. 21 is a sectional view of the camera in a state in which the film cartridge is loaded in the camera, FIG. 22 is a sectional view of the camera in a state wherein the film is fed out from the film cartridge and auto-loading is started, and FIG. 23 is a sectional view of the camera in a state wherein the film is rewound in the film cartridge upon completion of a photographic operation.

Referring to FIGS. 20 to 23, a camera body 201 has a cartridge chamber 201a and a film take-up spool chamber 201b. A fork 202 is engaged with a film spool (not shown) of a film cartridge 219 to drive it. A film take-up spool 203 and the fork 202 are operated by a known film feed mechanism disclosed in Japanese Laid-Open Patent Application Nos. 2-67535 and 2-67536. A film platen 204 is mounted on the camera body 201 while maintaining a predetermined distance with a film rail 201c to cause a film 221 in the camera body 201 to pass therethrough. A magnetic head 205 writes information in a magnetic storage portion (not shown) of the film 221 or reads it therefrom. The magnetic head 205 is fixed on the film platen 204 by a mounting plate 215a. A cartridge detection lever 206 is pivotally mounted on the camera body 201. One end of a spring 207 for the cartridge detection lever 206 is mounted on an arm portion 206a of the cartridge detection lever 206. The other end of the spring 207 is mounted on the camera body 201. The spring 207 applies a clockwise biasing force to the cartridge detection lever 206. A stopper 208 is mounted on the camera body 201 to define the clockwise limit position of the cartridge detection lever 206.

One end of a film detection leaf spring 219 is fixed on the inner wall of the spool chamber 201b of the camera body 201, and the other end of the film detection leaf spring 219 is rounded and in contact with the spool 203, and is biased to be deformable in a direction of an arrow B. A film detection lever 209 is pivotally mounted on the camera body 201, and the arm portion 209a is located on the rear surface of a free end 219b of the film detection spring 219. One end of a spring 210 for the film detection lever 209 is mounted on the camera body 201, and the other end of the spring 210 is mounted on the film detection lever 209. The spring 210 applies a clockwise biasing force to the film detection lever 209. A stopper 211 defines a clockwise limit position of the film detection lever 209. Shafts 214 and 215 extending on the camera body 201 are slidably fitted in elongated holes 212a and 212b of a press lever 212, so that the press lever 212 can be moved in a direction indicated by an arrow A or in an opposite direction. One end of a spring 213 for the press lever 212 is mounted on the press lever 212, and the other end of the spring 213 is mounted on the camera body 201. The spring 213 biases the press lever 212 in the direction indicated by the arrow A. A pad 216 is mounted on the press lever 212 to urge the film 221 to bring the magnetic storage portion of the film 221 into contact with the magnetic head 205. A release lever 217 serving as a position variable member is pivotally mounted on the camera body 201. One end of a spring 218 for the release lever 217 is mounted on the release lever 217, and the other end of the spring 218 is mounted on the camera body 201. The spring 218 applies a counterclockwise biasing force to the release lever 217.

When the film cartridge 220 is not loaded (FIG. 20), an arm portion 206b of the cartridge detection lever 206 is kept in contact with an arm portion 217a of the release lever 217. An arm portion 217b of the release lever 217 is kept engaged with a bent portion 209b of the film detection lever 209. The arm portion 217c is kept in contact with an arm portion 212c of the press lever 212.

In this positional relationship, when a force of the spring 207 acting on the release lever 217, a force of the spring 218 acting on the release lever 217, and a force of the spring 213 acting on the release lever 217 are defined as F13, F23, and F33, respectively, the biasing forces of the springs are determined to satisfy the following conditions:

$$F13+F23>F33$$

and $$F23<F33$$

According to this relationship among the biasing forces, when the film cartridge 220 is not loaded, the pad 216 is retracted from a travel path of the film, as shown in FIG. 20.

In this embodiment, the film 221 is wound around the film take-up spool 203. When a film winding operation is completed, photography is performed for every frame while the film 221 is rewound into the film cartridge 220 with frame indexing. That is, this embodiment assumes a so-called "prewind" type camera.

When the film cartridge 220 is loaded in the cartridge chamber 201a, the film cartridge 220 abuts against a projecting portion 206c of the film cartridge detection lever 206, and the film cartridge detection lever is rotated counterclockwise against the biasing force of the spring 207. Judging from the condition "F23<F33", the press lever 212 tends to rotate in the direction of the arrow A against the biasing force of the spring 218 by means of the biasing force of the spring 213, and the release lever 217 tends to rotate clockwise. However, since the arm portion 217b of the release lever 217 is engaged with the bent portion 209b of the film detection lever 209, the press lever 212 and the release lever 217 are kept stopped. Therefore, the pad 216 does not enter into the travel path of the film 221.

The film 221 is gradually fed out from the film cartridge 219 by the mechanism described in Japanese Laid-Open Patent Application Nos. 2-67535 and 2-67536. However, since the pad 216 is located outside the film travel path, as described above, the leading end of the film is not caught by the pad, and the film can be smoothly fed.

When the leading end of the film 221 passes by the position of the magnetic head 205, the film 221 is wound around the spool 203 by a known means such as a rubber roller formed on the film take-up spool 203 or a gripper formed on the spool 203. At this time, the film detection leaf spring 219 urges the film 221 against the spool 203, thereby assisting loading of the film 221.

When the film 221 is gradually wound around the film take-up spool 203, the film detection leaf spring 219 is deformed in the direction of the arrow B, abuts against an arm portion 209a of the film detection lever 209, and further moves the film detection lever 209 upward, as shown in FIG. 22. The spring 210 for the film detection lever 209 is arranged to maintain engagement between the arm portion 217b of the release lever 217 and the bent portion 209b of the film detection lever 209. The biasing force of the spring 210 which acts on the film detection lever 209 is very weak. For this reason, the film detection leaf spring 210 easily rotates the film detection lever 209 counterclockwise against the biasing force of the spring 210. In this manner, when the film detection lever 209 is rotated counterclockwise, the arm portion 217b is disengaged from the bent portion 209b. The press lever 212 rotates the release lever 217 clockwise against the biasing force of the spring 218 by means of the biasing force of the spring 213. At the same time, the press lever 212 is moved in the direction of the arrow A. The film 221 is urged against the magnetic head 205 by the pad 216 mounted at the distal end of the press lever 212, so that stable information read/write access can be performed.

When the film 221 is completely wound, frame indexing is performed to take each picture while the film 221 is rewound into the film cartridge 220. At this time, the magnetic head 205 writes information in the magnetic storage portion of the film 221 or reading it therefrom. When the remaining amount of film wound around the spool 203 is reduced and the film detection leaf spring 219 is deformed in a direction opposite to that of the arrow B, i.e., during return to the initial position, the film detection lever 209 is rotated clockwise. As shown in FIG. 23, the bent portion 209b of the film detection lever 209 abuts against a circumferential portion 217d of the release lever 217. The rear lid 225 is opened and the projecting portion 221a of the rear lid 221 is disengaged from the rear lid detection interlocking lever 222, the initial state shown in FIG. 20 is restored.

According to each embodiment described above, when the rear lid is not closed, the pad is retracted outside the film travel path. When the leading end of the film is fed out from the film cartridge and passes by the position of the magnetic head, the pad is urged against the film surface. During auto-loading, the leading end of the film is not caught by the magnetic head or pad, and the film can be smoothly and continuously fed.

Since the pad is movable, the magnetic head can be fixed to the film press plate, and the position of the magnetic head relative to the film press plate can be accurately determined. This structure can be suitably used in the camera illustrated in Japanese Laid-Open Patent Application No. 1-344801.

Figure 24:
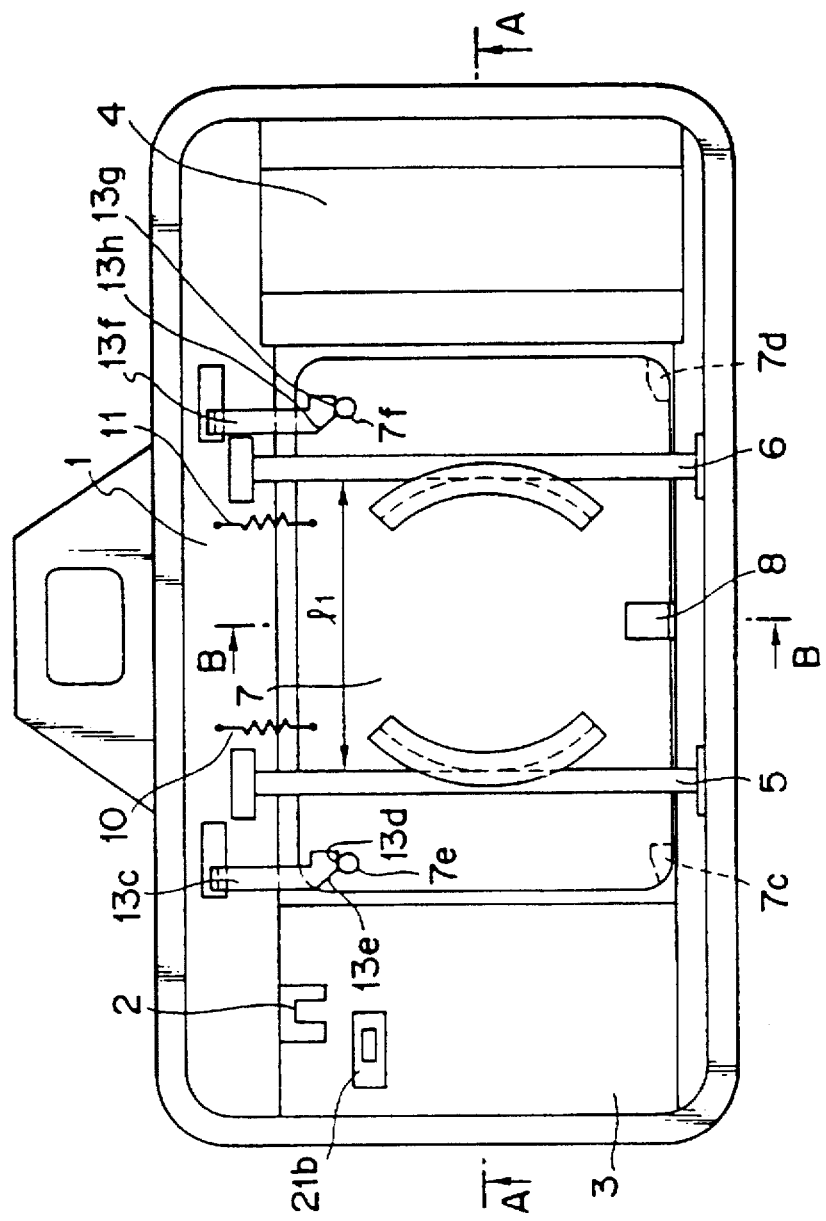
FIGS. 24, 27, and 29 are rear views of a camera from which a rear lid is removed according to the sixth embodiment of the present invention.
Figure 25:
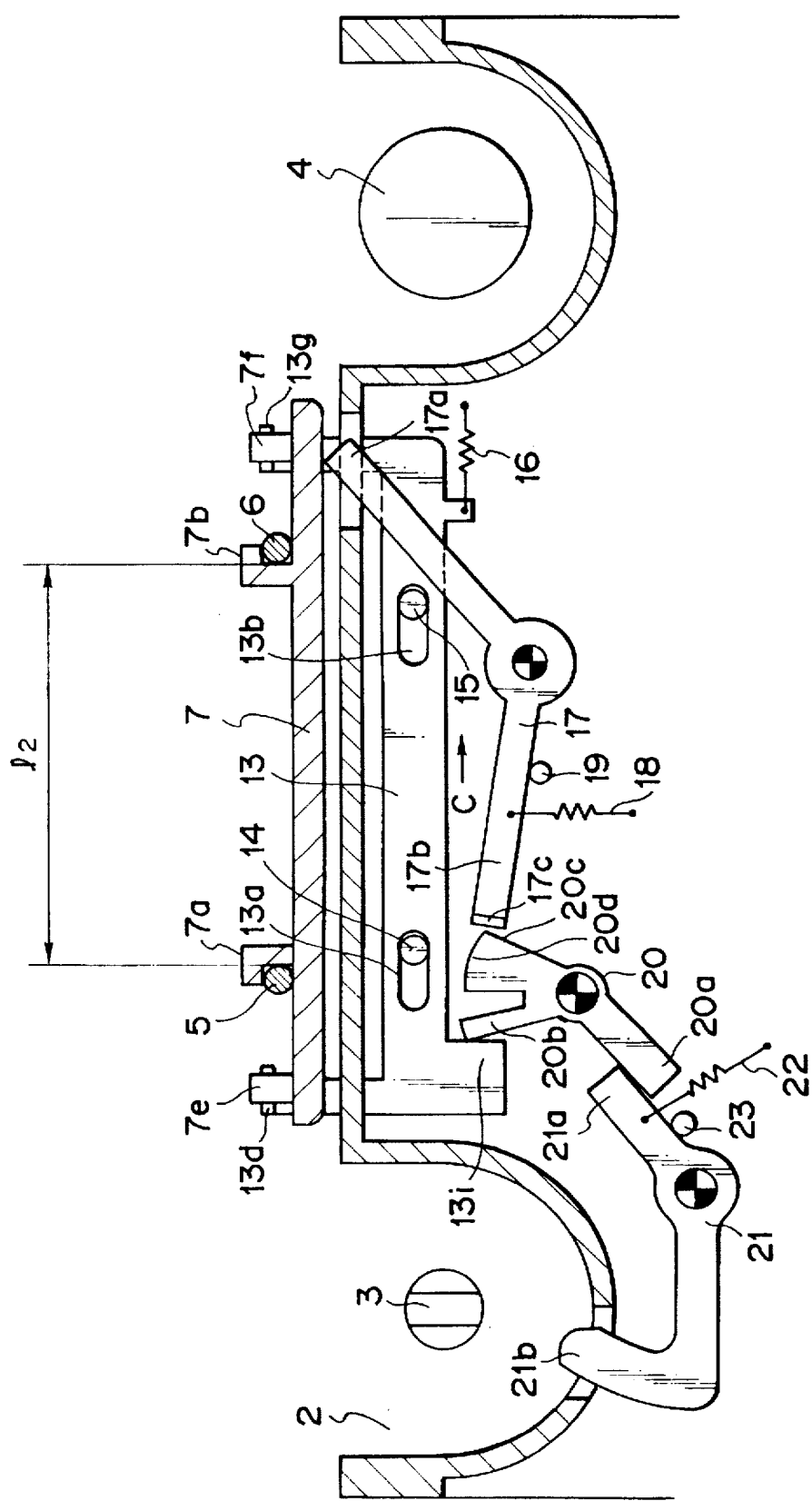
FIG. 25 is a sectional view thereof along the line A—A in FIG. 24.
Figure 26:
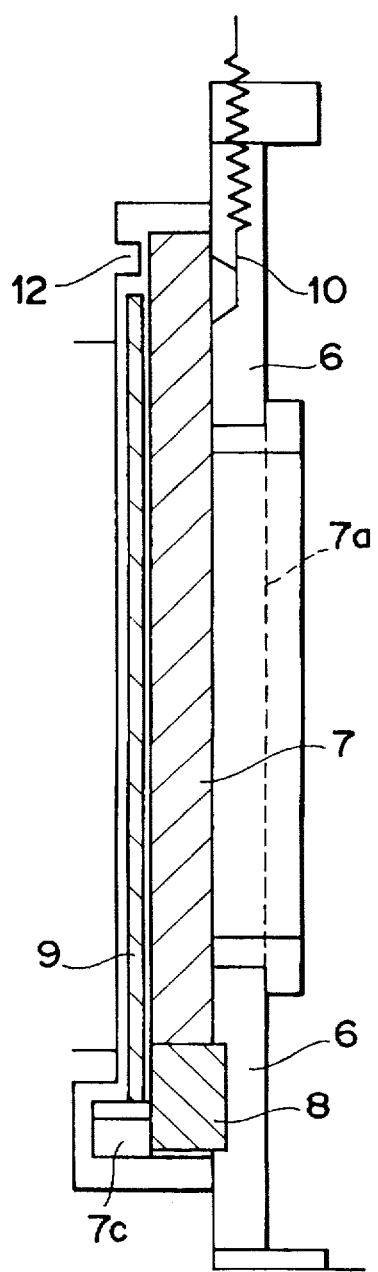
FIG. 26 is a sectional view thereof along the line B—B in FIG. 24.
Figure 27:
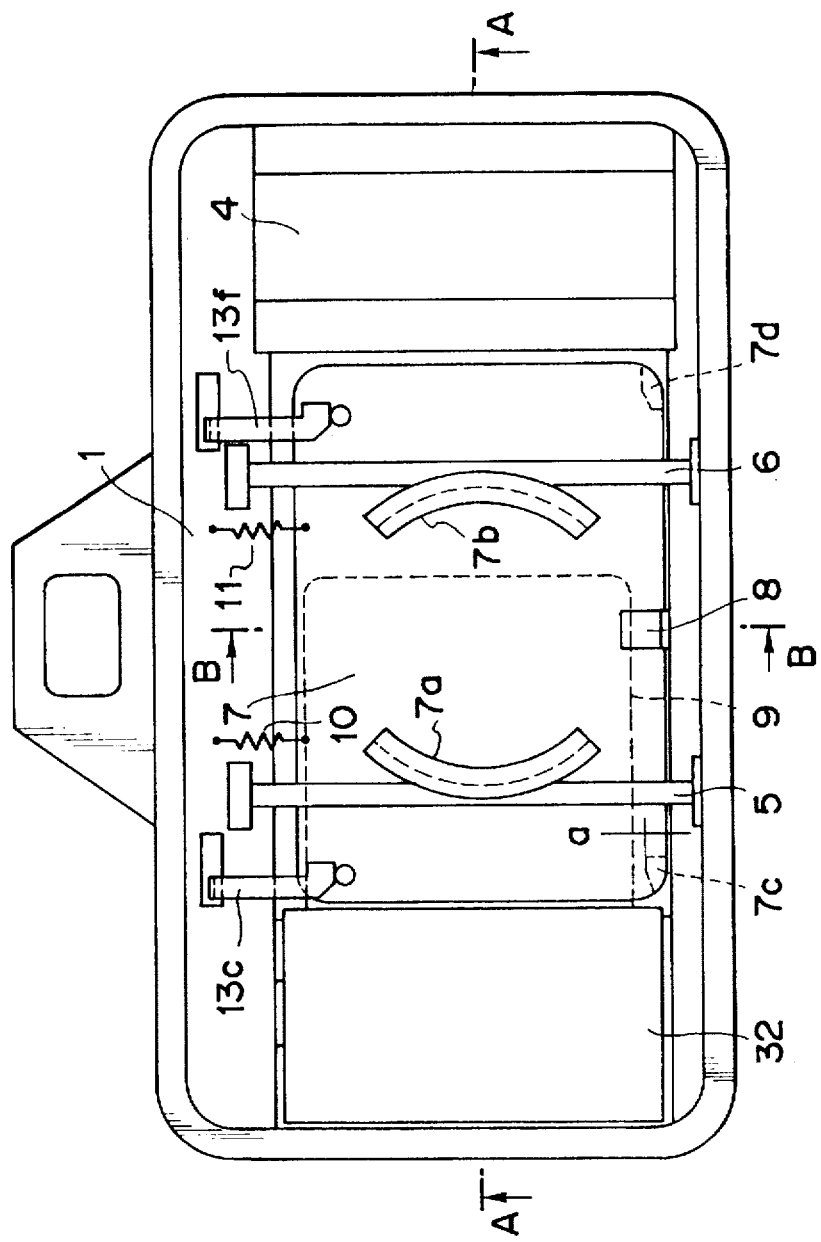
Figure 28:
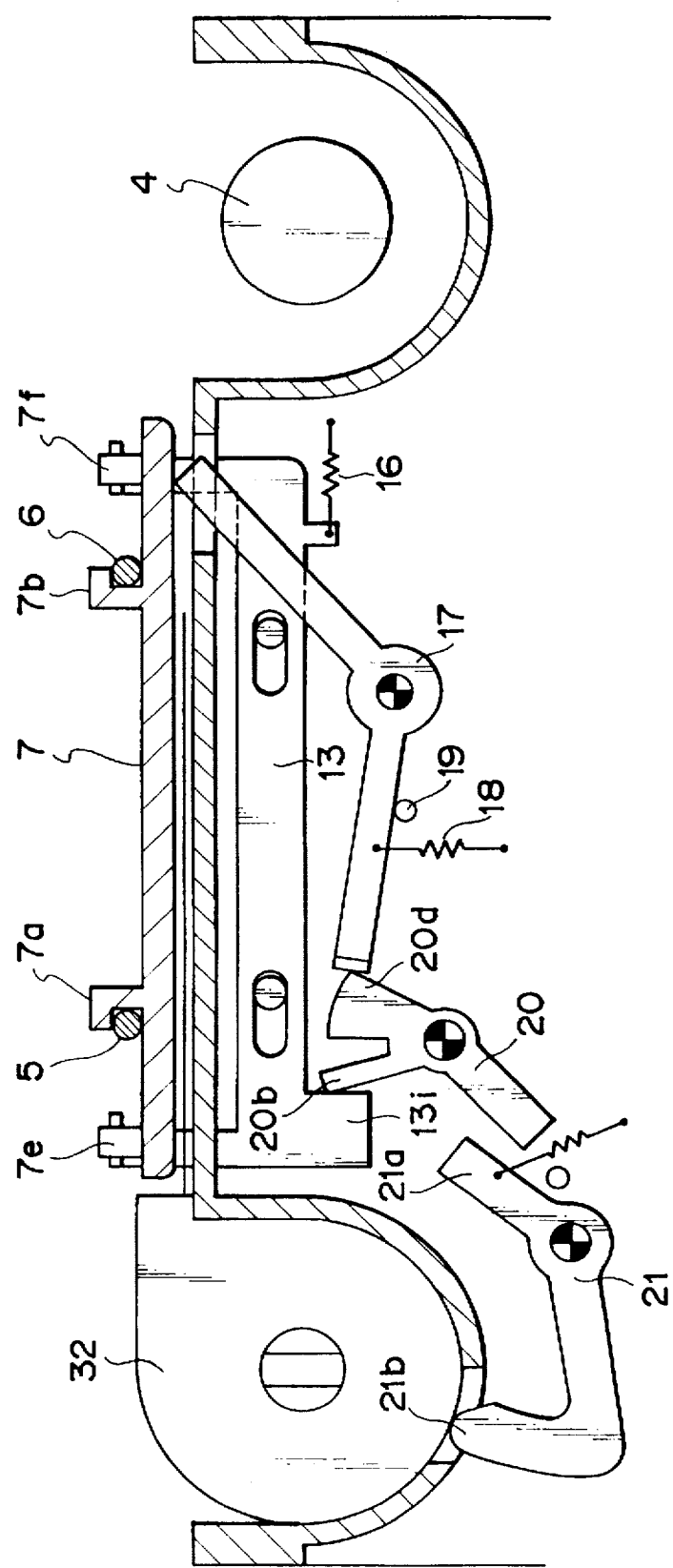
FIG. 28 is a sectional view thereof along the line A—A in FIG. 27.
Figure 29:
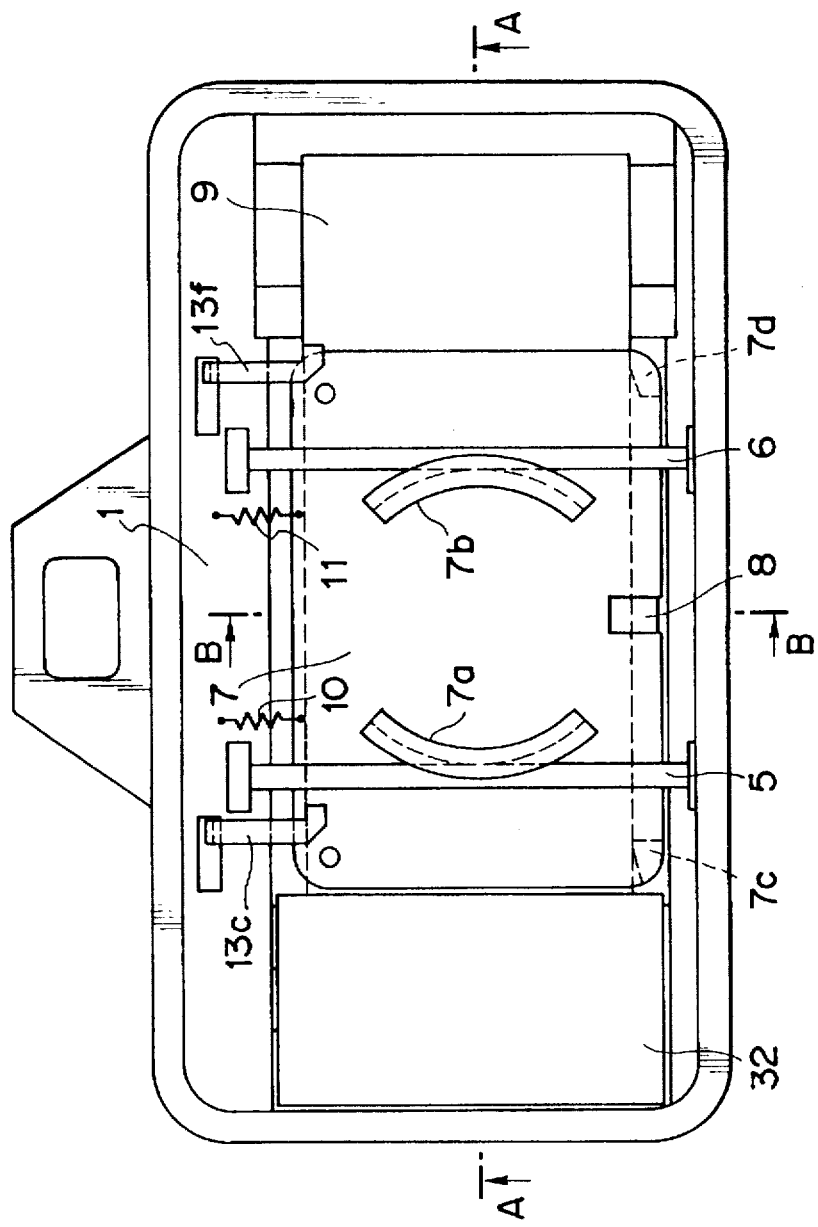
Figure 30:
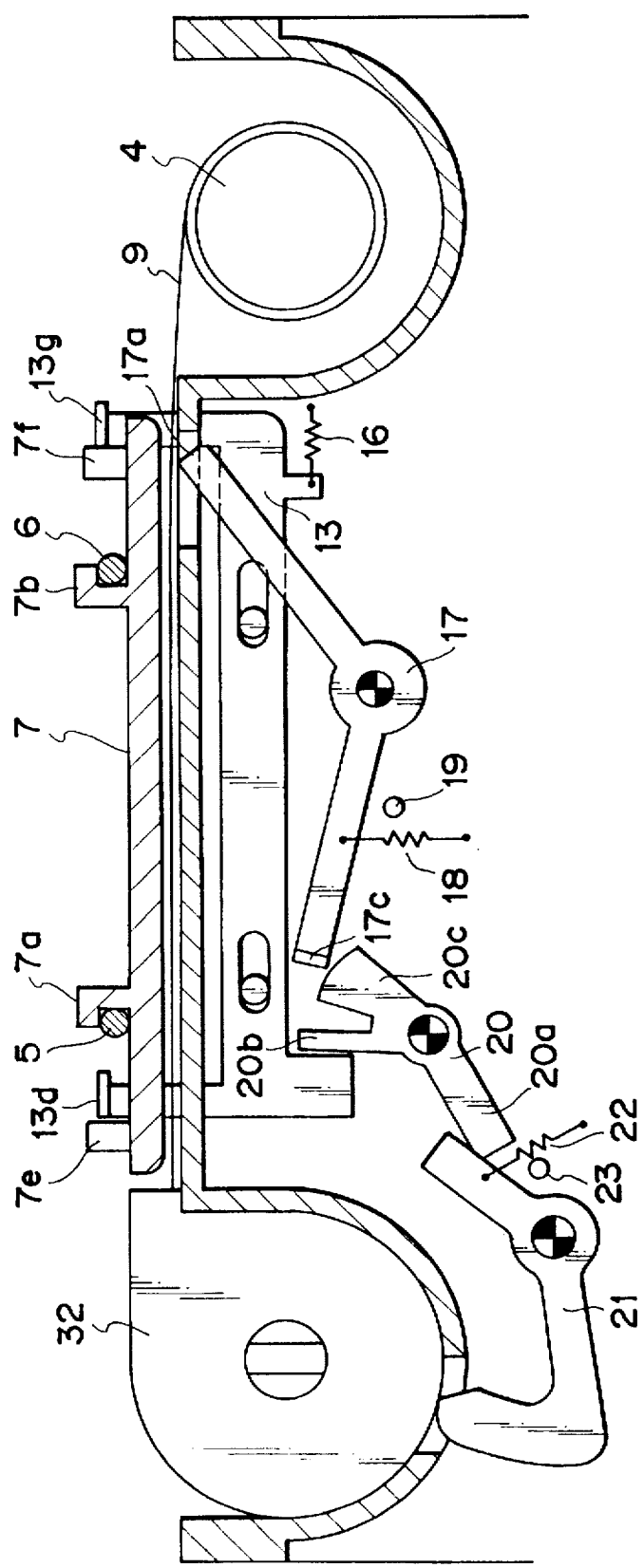
FIG. 30 is a sectional view thereof along the line A—A in FIG. 29.

FIGS. 24 to 30 show the sixth embodiment of the present invention, in which FIGS. 24, 27 and 29 are rear views of a camera from which a rear lid is omitted, FIG. 25 is a sectional view thereof along the line A—A in FIG. 24, FIG. 26 is a sectional view thereof along the line B—B in FIG. 24, FIG. 28 is a sectional view thereof along the line A—A in FIG. 27, and FIG. 30 is a sectional view thereof along the line A—A in FIG. 29.

Referring to FIGS. 24 to 30, the camera has a camera body 1. A cartridge chamber 2 stores a film cartridge 32 (to be described in detail later). A film feed fork 3 is engaged with a shaft (not shown) of the film cartridge 32. A film spool 4 takes up a film 9. Both ends of each of support shafts 5 and 6 are fixed at proper positions on the camera body 1. The shafts 5 and 6 are parallel to each other and extend in a direction perpendicular to the travel direction of the film 9. Note that the support shafts 5 and 6 are a columnar shape, as shown in FIG. 25.

A pair of lock portions 7a and 7b are formed on the upper surface (i.e., a surface opposite to the surface contacting the film 9) of a film platen 7, as shown in FIG. 25. Each of the lock portions 7a and 7b comprises a vertical portion perpendicular to the film platen 7 and a horizontal portion bent outward at a right angle from the vertical portion. The lock portions 7a and 7b thus comprise L-shaped members, respectively, and extend toward the optical axis as a whole. The lock portions 7a and 7b are located at symmetrical positions around almost the central portion of the film platen 7 so as to form an arcuated shape.

A distance $l_2$ (FIG. 25) between the outer surfaces of the vertical portions of the lock portions 7a and 7b is slightly smaller than a distance $l_1$ (FIG. 24) between the inner sides of the support shafts 5 and 6. The support shafts 5 and 6 are located within a recessed space defined by the vertical and horizontal portions of the lock portions 7a and 7b and the film platen 7. The film platen 7 is vertically (i.e., the direction perpendicular to the travel direction of the film 9 in FIG. 24) movable with respect to the support shafts 5 and 6. At the same time, the film platen 7 is pivotal about almost the central portion of the film platen 7. The horizontal portions of the lock portions 7a and 7b interpose the support shafts 5 and 6 to regulate the position of the film platen 7 in the direction of the optical axis, as shown in FIG. 25.

Lower end guide members 7c and 7d are integrally formed on the lower surface of the film platen 7, as shown in FIG. 24. A magnetic head 8 is fixed at a lower position on the lower surface of the film platen 7, as shown in FIG. 26. A magnetic gap of the magnetic head 8 is formed in a direction perpendicular to the film travel direction.

Springs 10 and 11, serving as biasing means, are disposed in the cartridge chamber 2 and the film spool 4, respectively, so as to interpose the center of rotation of the film platen 7 therebetween. One end of each of the springs 10 and 11 is fixed to the camera body 1, and the other end is fixed to the film platen 7 to bias the film platen 7 in the upper direction of FIG. 27. Guide members 7c and 7d formed on the film platen 7 are brought into tight contact with end faces of the film 9, so that the position of the film platen 7 relative to the film 9 is predetermined. A horizontal magnetic storage portion (not shown) is formed, along the longitudinal direction of the film 9, on the surface of the film 9 which faces the film platen 7. Various pieces of information associated with photography can be written in (or read from) the magnetic storage portion by means of the magnetic head 8. An outer rail 12 (FIG. 26) defines the film not to move upward thereover.

A release lever 13 has elongated holes 13a and 13b which are respectively slidably fitted on dimples 14 and 15 of the camera body 1. In the state of FIG. 24, dimples 7e and 7f of the film platen 7 are locked by flat portions 13d and 13g of arm portions 13c and 13f of the release lever 13, and the film platen 7 is pressed to a lower position. One end of a spring 16 is fixed to the release lever 13, and the other end of the spring 16 is fixed to the camera body 1. The spring 16 biases the release lever 13 in a direction indicated by an arrow C in FIG. 25.

A film detection lever 17 serving as a leading end detecting means is pivotally mounted on the camera body 1. An arm portion 17a of the film detection lever 17 can partially enter into or can be partially retracted from a film travel path.

One end of a spring 18 is fixed to the film detection lever 17, and the other end of the spring 18 is fixed to the camera body 1. The spring 18 applies a counterclockwise biasing force to the film detection lever 17. A stopper 19 is formed on the camera body 1 and regulates the counterclockwise angular position of the film detection lever 17. A control lever 20 is pivotally mounted on the camera body 1. An arm portion 20b of the control lever 20 is engageable with an arm portion 13i of the release lever 13. An arm portion 20c of the control lever 20 is engageable with a bent portion 17c of the film detection lever 17.

A cartridge detection lever 21 is pivotally mounted on the camera body 1. One end 21a of the cartridge detection lever 21 is engageable with an arm portion 20a of the control lever 20. An arm portion 21b of the cartridge detection lever 21 is reciprocally moved in or out from the cartridge chamber 2. One end of a spring 22 is mounted on the cartridge detection lever 21, and the other end of the spring 22 is mounted on the camera body 1. The spring 22 applies a clockwise biasing force to the cartridge detection lever 21. A stopper 23 is mounted on the camera body 1 to regulate a clockwise angular position of the cartridge detection lever 21.

The biasing force of the spring 22 is sufficiently larger than that of the spring 16 acting on the control lever 20.

With the above structure, a photographer or user opens a rear lid (not shown) and loads the thrust type film cartridge 32 in the cartridge chamber 2. An example of this film cartridge 32 is described in Japanese Patent Application No. 63-220049. The entire film including a film leader portion is stored in the cartridge 32 when it is not used. When the cartridge 32 is loaded in the camera body 1 and a rear lid 27 is closed, a drive force is transmitted from the film feed fork 3, and the film 9 is fed out from the cartridge 32.

When the film cartridge 32 is loaded in the cartridge chamber 2 and a rear lid (not shown) is closed, the cartridge 32 is brought into contact with the arm portion 21b of the cartridge detection lever 21. The cartridge detection lever 21 is rotated counterclockwise against the biasing force of the spring 22, as shown in FIG. 28. The arm portion 20a of the control lever 20 is disengaged from one end 21a of the cartridge detection lever 21, and the control lever 20 tends to rotate clockwise by the biasing force of the spring 16. However, since the arm portion 20c of the control lever 20 is engaged with the bent portion 17c of the film detection lever 17, clockwise rotation of the control lever 20 is stopped. In this case, since the release lever 13 is slightly moved in the direction of the arrow C, the flat portions 13d and 13g of the release lever 13 are kept in contact with the dimples 7e and 7f of the film platen 7. The film platen 7 is kept pressed to the lower position (i.e., the state in FIG. 24).

In this state, when the film feed fork 3 is rotated clockwise (FIG. 25) by a motor (not shown), a shaft (not shown) of the film cartridge 32 which is engaged with the fork 3 is rotated in the same direction. The film 9 is fed out from the film cartridge 32, and the leader portion of the film 9 enters into a gap between the film platen 7 and the camera body 1. At this time, a gap a is present between the film edge and the guide portions 7c and 7d, so that the film can be smoothly fed. This state is shown in FIGS. 27 and 28.

When the film 9 is moved to the right in FIG. 27 and the leading end portion of the film 9 passes by the guide portion 7d, the leading end portion of the film 9 abuts against the arm portion 17a of the film detection lever 17. The film detection lever 17 is then rotated clockwise against by the biasing force of the spring 18, so that the bent portion 17c is disengaged from the arm portion 20c of the control lever (FIG. 30). In this case, since the spring 18 is arranged to maintain engagement between the bent portion 17c and the arm portion 20c, the spring 18 has only a weak biasing force. Therefore, a small load is required for the distal end portion of the film 9 to rotate the film detection lever 17 clockwise.

When the bent portion 17c of the film detection lever 17 is disengaged from the arm portion 20c of the control lever 20, the release lever 13 is moved in the direction of the arrow C by the biasing force of the spring 16. The flat portions 13d and 13g are disengaged from the dimples 7e and 7f, as shown in FIG. 30. The film platen 7 is biased upward (FIG. 29) by the springs 10 and 11 so that the guide members 7c and 7d urge the film edge, thus achieving positioning in the direction of the film plane between the magnetic head 8 and the film. Therefore, information can be written in or read from a predetermined position of the magnetic storage portion by the magnetic head 8.

The film 9 is further fed and is wound around the film spool 4 by a known means such as a rubber roller or gripper, and a normal photographic operation or the like is performed. Upon completion of the photographic operation, when the film 9 is stored in the film cartridge 31, the bent portion 17c of the film detection lever 17 abuts against a circumferential portion 20d of the control lever 20.

When the film cartridge 32 is unloaded from the cartridge chamber 2, the cartridge detection lever 21 is rotated clockwise, the control lever 20 is rotated counterclockwise, and the release lever 13 is moved to the left against the biasing force of the spring 16 by means of the biasing force of the spring 22. At this time, inclined portions 13e and 13f of the arm portions 13c and 13f of the release lever 13 are engaged with the dimples 7e and 7f of the press plate 7. The film platen 7 is moved downward against the biasing forces of the springs 10 and 11. The flat portions 13d and 13g abut against the dimples 7e and 7f, so that the film. platen 7 is kept at the lower position, thus restoring the initial state shown in FIG. 24.

Figure 31:
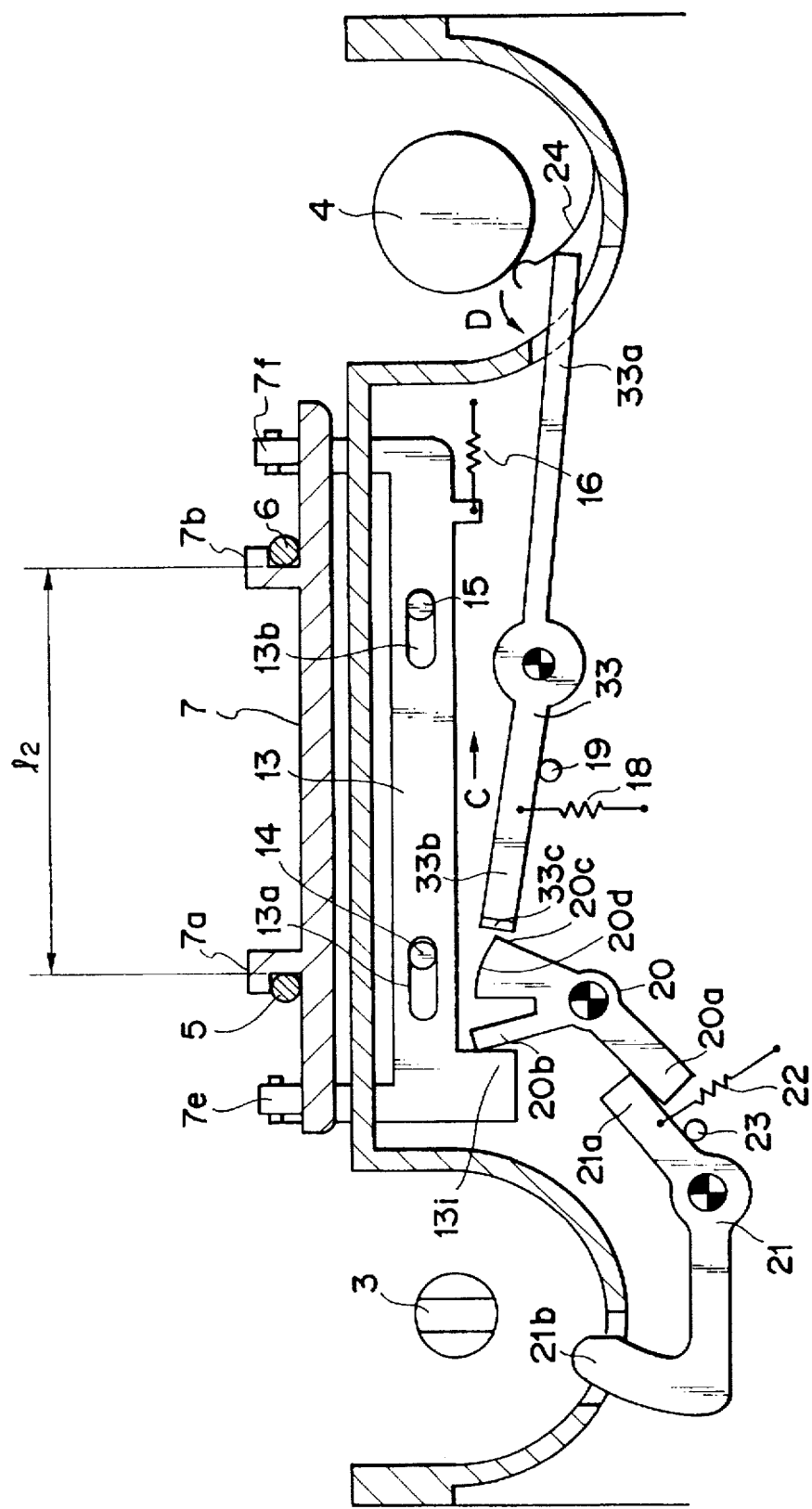
FIG. 31 is a cross-sectional view of a camera according to the seventh embodiment of the present invention.

FIG. 31 shows the seventh embodiment of the present invention. The same reference numerals as in FIGS. 24 to 30 denote the same parts in FIG. 31.

Referring to FIG. 31, one end of a leaf spring 24 is fixed to a camera body 1 to urge a film (not shown in FIG. 31) against a film spool 4, thereby assisting film loading. A film detection lever 33 serves as a film leading end detecting means and is pivotally mounted on the camera body 1. An arm portion 33a of the film detection lever 33 can be brought into contact with the leaf spring 24. When the film is gradually wound around the film spool 4 and the leaf spring 24 is deformed in a direction indicated by an arrow D, the film detection lever 33 is rotated clockwise.

With the above structure, when the film is wound around the film spool 4, the film detection lever 33 is rotated clockwise, and guide members 7c and 7d shown in FIG. 24 (but not shown in FIG. 31) urge a film edge. The leading end of the film will not be caught by the guide members 7c and 7d during film feeding.

In this embodiment, the film is wound around the film spool 4. When a film winding operation is completed, every frame photography is performed while the film is rewound into the film cartridge with frame indexing. That is, this embodiment assumes a so-called "prewind" type camera.

Figure 32:
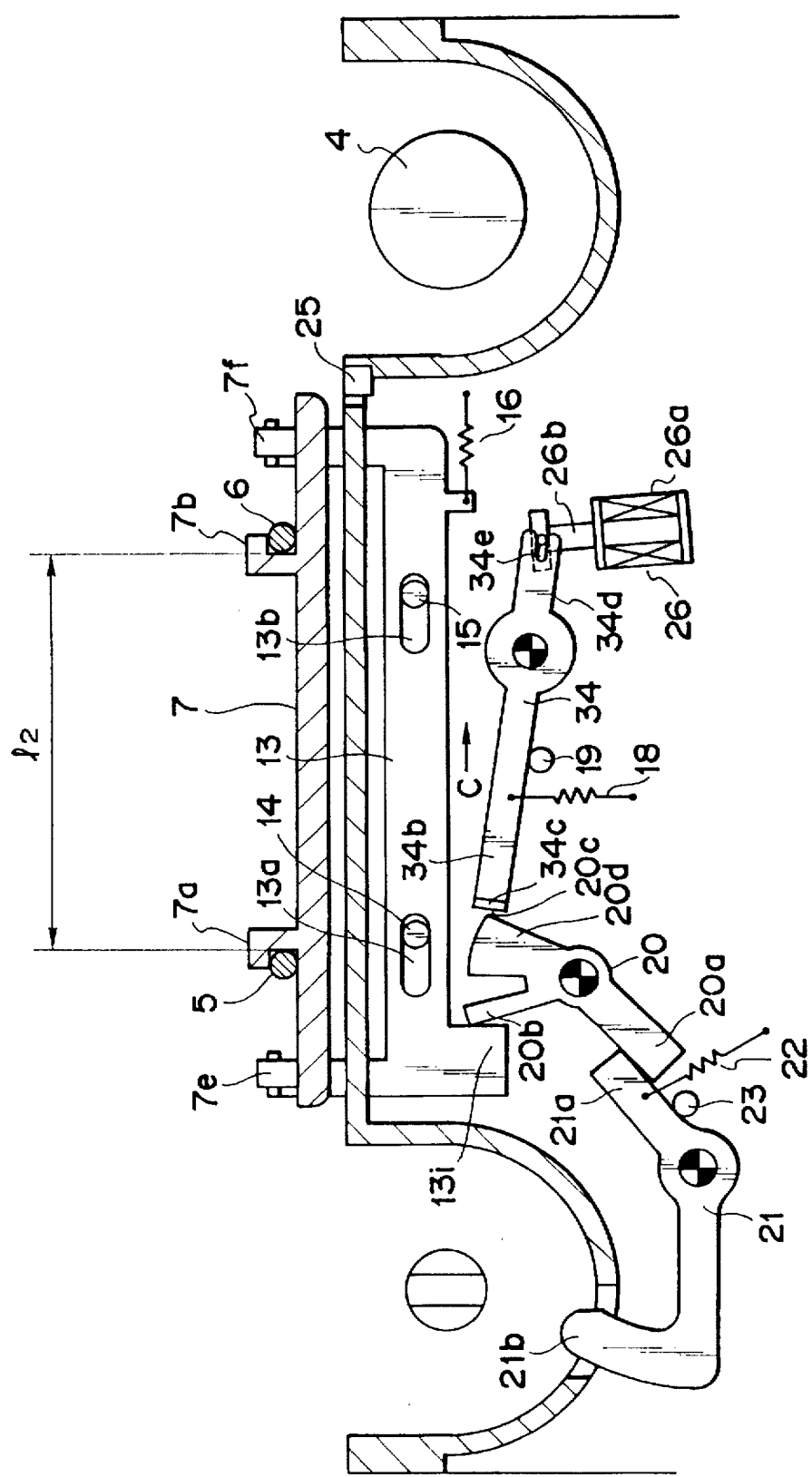
FIG. 32 is a cross-sectional view of a camera according to the eighth embodiment of the present invention.

FIG. 32 shows the eighth embodiment of the present invention. The same reference numerals as in FIGS. 24 to 32 denote the same parts in FIG. 32.

Referring to FIG. 32, a photointerrupter 25 detects the leading end of a film. A known plunger unit 26 comprises a coil 26a and a movable core 26b. When the coil 26a is energized, the movable core 26b is attracted into the coil 26a. A film detection lever 34 serving as a film leading end detecting means is pivotally mounted on a camera body 1. A pin 26c formed on the movable core 26b is slidably fitted in a groove 34e formed in an arm portion 34b of the film detection lever 34. The film detection lever 34 is interlocked with the movable core 26.

When the leading end of the film is detected by the photointerrupter 25, energization of the coil 26a is started from an electrical control circuit (not shown), and the movable core 26b is attracted into the coil 26a. The film detection lever 34 is then rotated clockwise, and guide members 7c and 7d (not shown in FIG. 31 but shown in FIG. 24) formed on a film platen 7 urge the film edge. The leading end of the film will not be caught by the guide members 7c and 7d during film feeding.

As described above, the leading end of the film may be optically detected. Release of a control lever 20, i.e., the tight contact of the guide members 7c and 7d of the film platen 7 on the film end face may be started using a drive source such as a plunger unit.

In each of the above embodiments, when a film cartridge is not loaded in the camera, the guide members are retracted outside the film travel path. When the film cartridge is loaded and the leading end of the film passes a predetermined position (e.g., a position at which the guide members are located), the guide members are urged against the film edge film in the widthwise direction. Therefore, the leading end of the film will not be caught by the guide portions, and the film can be smoothly fed during film feeding (initial feeding for frame indexing).

Figure 33:
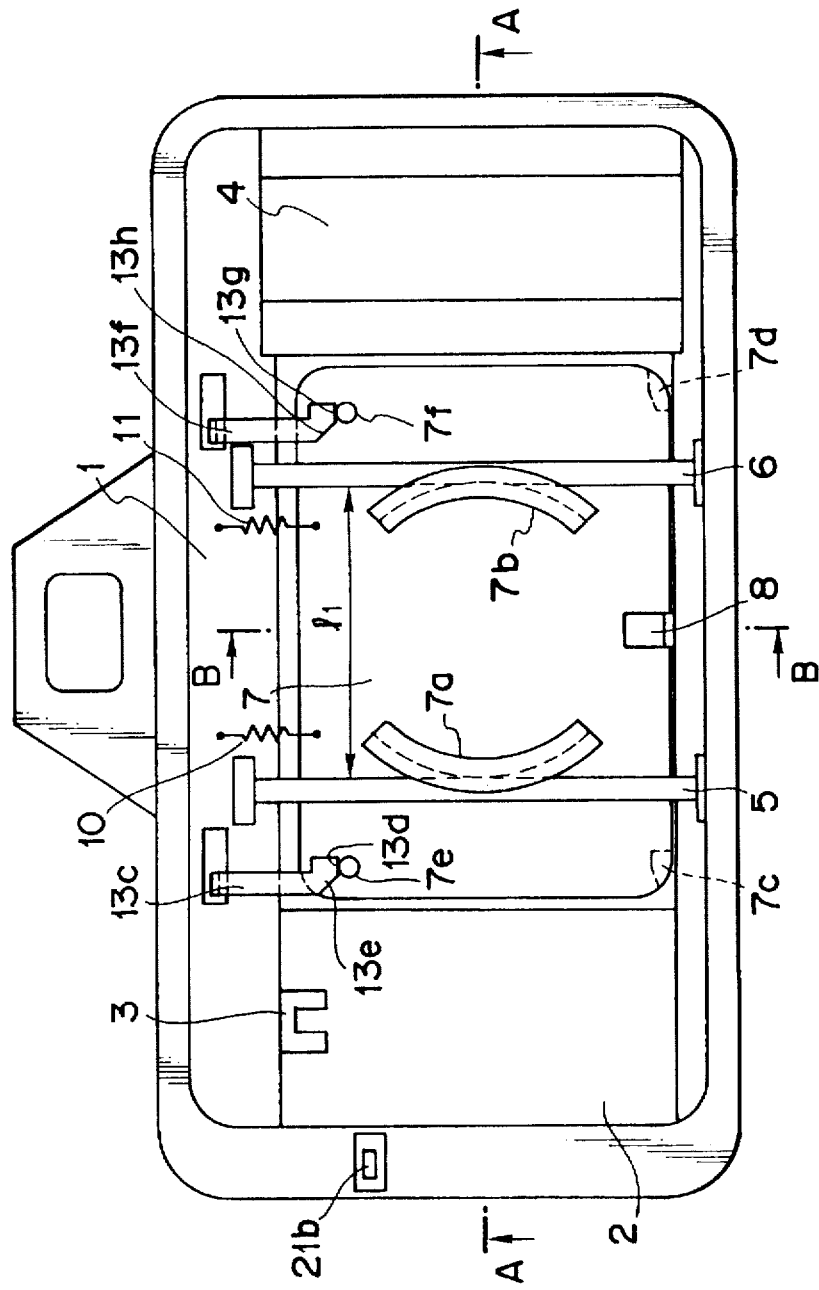
FIGS. 33, 36, and 38 are rear views of a camera from which a rear lid is omitted according to the ninth embodiment of the present invention.
Figure 34:
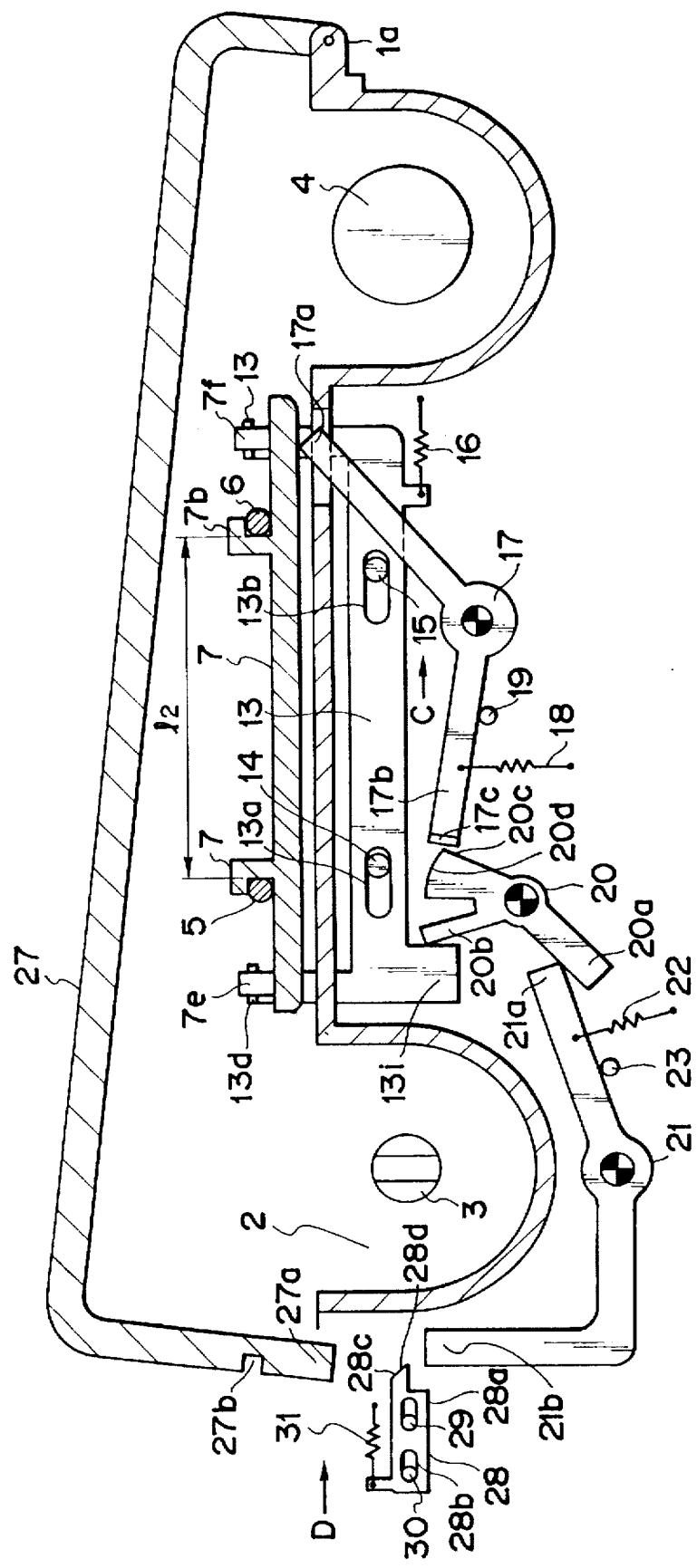
FIG. 34 is a sectional view of the camera including the rear lid along the line A—A in FIG. 33.
Figure 35:
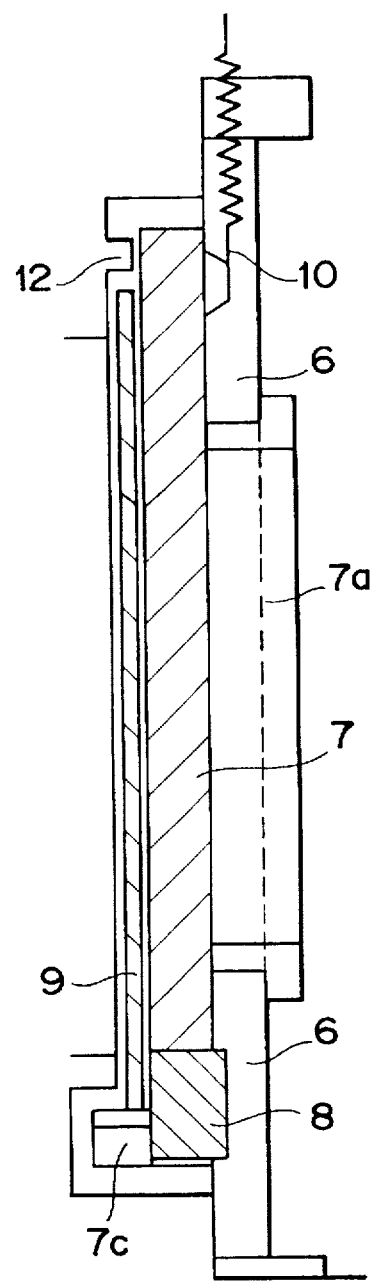
FIG. 35 is a sectional view along the line B—B in FIG. 33.
Figure 36:
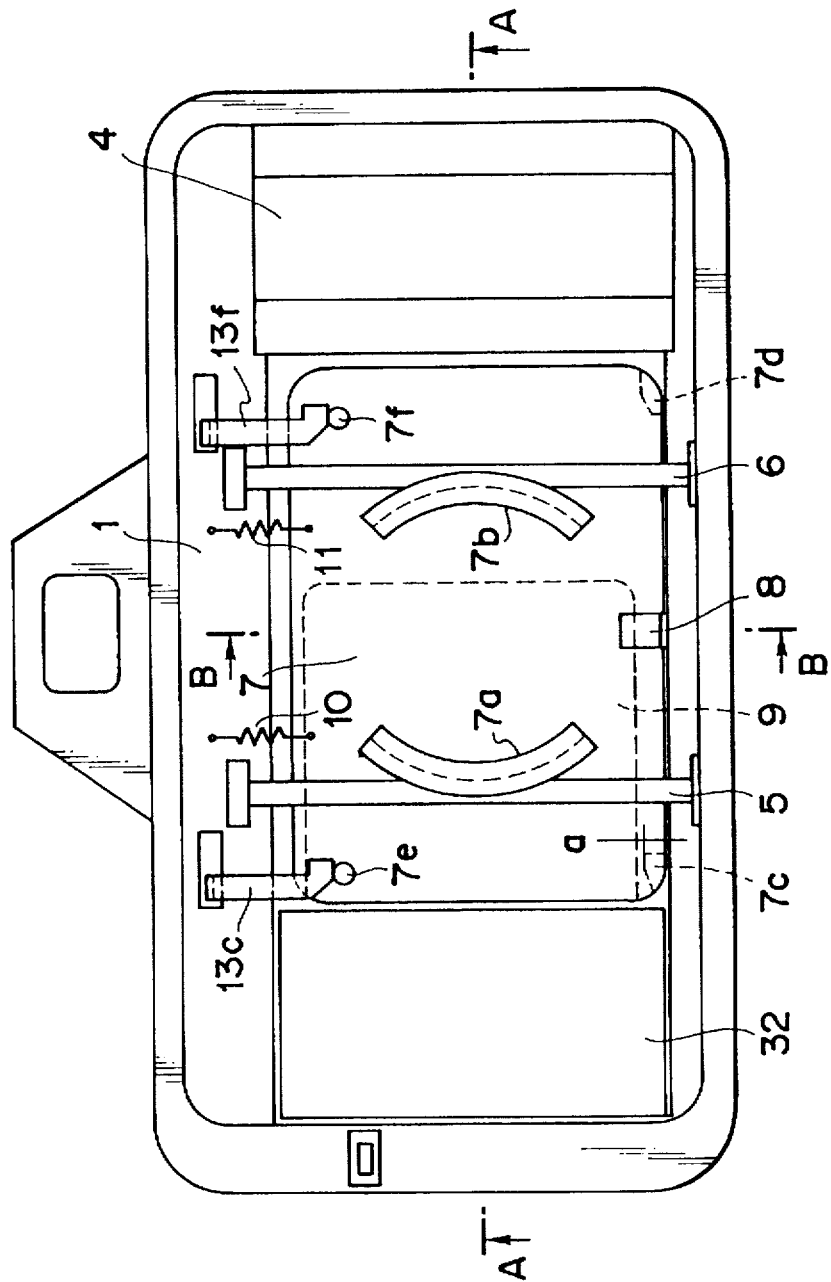
Figure 37:
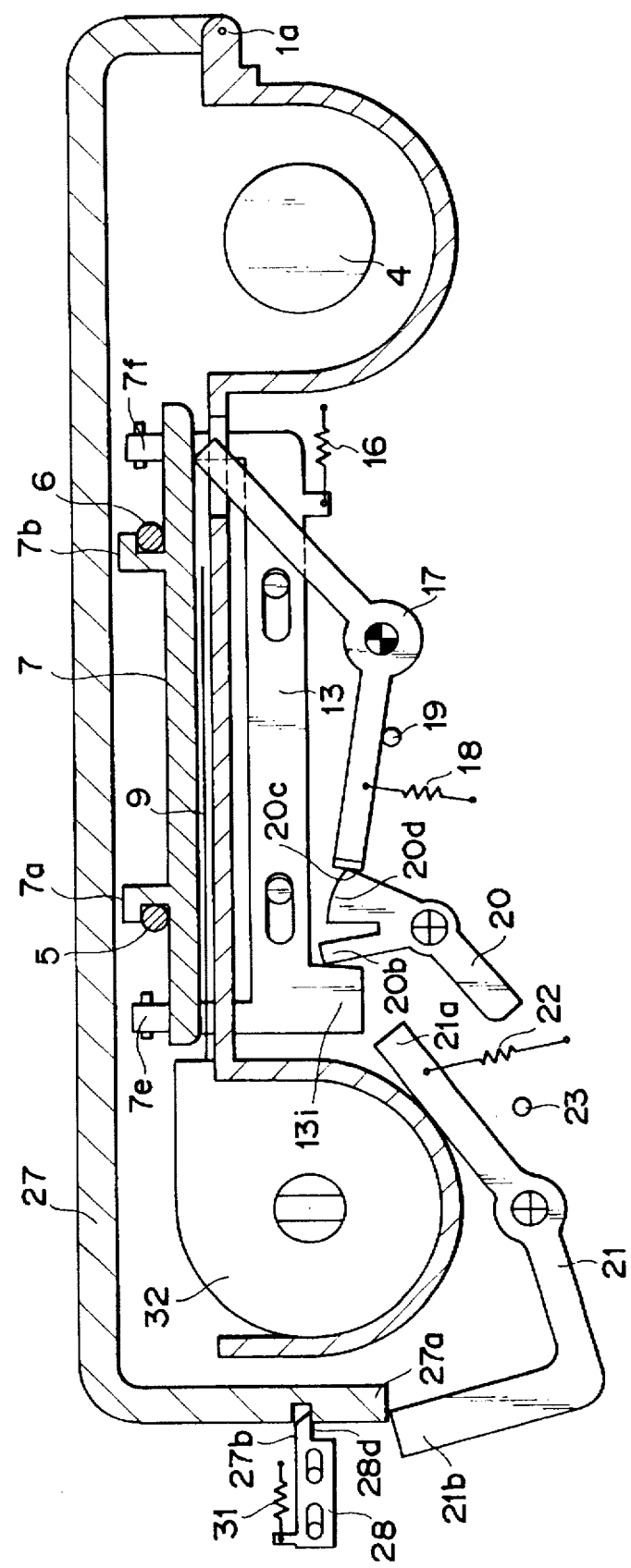
FIG. 37 is a sectional view of the camera including the rear lid along the line A—A in FIG. 36.
Figure 38:
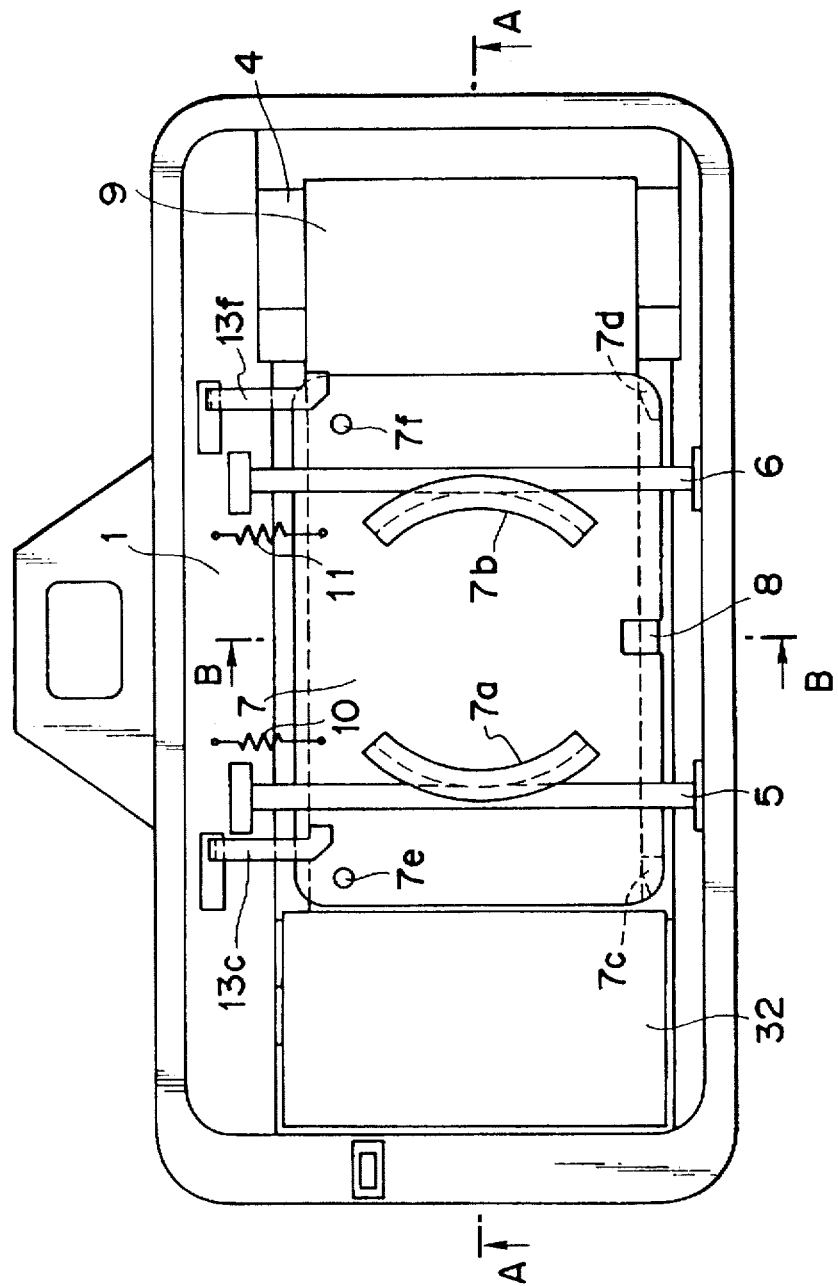
Figure 39:
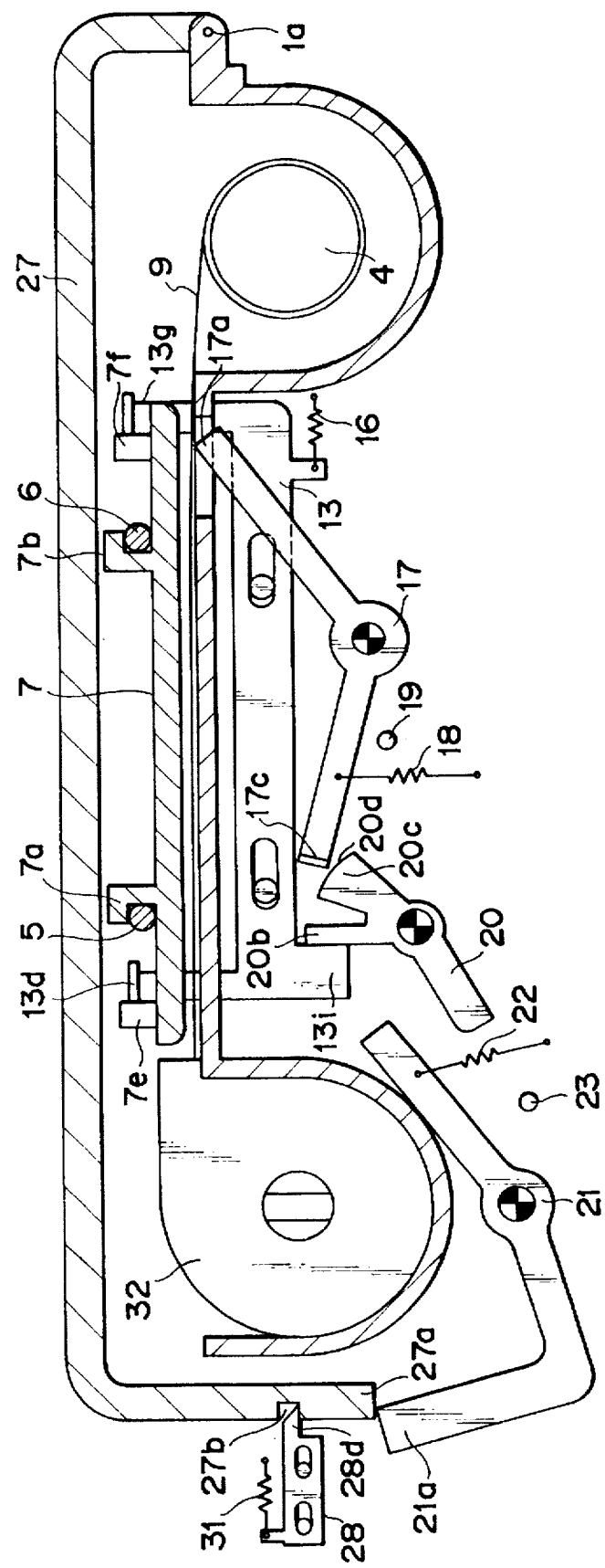
FIG. 39 is a sectional view of the camera including the rear lid along the line A—A in FIG. 38.

FIGS. 33 to 39 show the ninth embodiment of the present invention, in which FIGS. 33, 36 and 38 are rear views of a camera from which a rear lid is omitted, FIG. 34 is a sectional view of the camera including the rear lid along the line A—A in FIG. 33, FIG. 35 is a sectional view thereof along the line B—B in FIG. 33, FIG. 37 is a sectional view of the camera including the rear lid along the line A—A in FIG. 36, and FIG. 39 is a sectional view of the camera including the rear lid along the line A—A in FIG. 38.

Referring to FIGS. 33 to 39, the camera has a camera body 1. A cartridge chamber 2 stores a film cartridge 32 (to be described in detail later). A film feed fork 3 is engaged with a shaft (not shown) of the film cartridge 32. A film spool 4 takes up a film 9. Both ends of each of support shafts 5 and 6 are fixed at proper positions on the camera body 1. The shafts 5 and 6 are parallel to each other and extend in a direction perpendicular to the travel direction of the film 9. Note that the support shafts 5 and 6 are a columnar shape, as shown in FIG. 34.

A pair of lock portions 7a and 7b are formed on the upper surface (i.e., a surface opposite to the surface contacting the film 9) of a film platen 7, as shown in FIG. 34. Each of the lock portions 7a and 7b comprises a vertical portion perpendicular to the film platen 7 and a horizontal portion bent outward at a right angle from the vertical portion. The lock portions 7a and 7b thus comprise L-shaped members, respectively, and extend toward the optical axis as a whole. The lock portions 7a and 7b are located at symmetrical positions around almost the central portion of the film platen 7 so as to form an arcuated shape.

A distance $l_2$ (FIG. 34) between the outer surfaces of the vertical portions of the lock portions 7a and 7b is slightly smaller than a distance $l_1$ (FIG. 33) between the inner sides of the support shafts 5 and 6. The support shafts 5 and 6 are located within a recessed space defined by the vertical and horizontal portions of the lock portions 7a and 7b and the film platen 7. The film platen 7 is vertically (i.e., the direction perpendicular to the travel direction of the film 9 in FIG. 33) movable with respect to the support shafts 5 and 6. At the same time, the film platen 7 is pivotal about almost the central portion of the film platen 7. The horizontal portions of the lock portions 7a and 7b interpose the support shafts 5 and 6 to regulate the back-and-forth position of the film platen 7 in the direction of the optical axis, as shown in FIG. 34.

Lower end guide members 7c and 7d are integrally formed on the lower surface of the film platen 7, as shown in FIG. 33. A magnetic head 8 is fixed at a lower position on the lower surface of the film platen 7, as shown in FIG. 35. A magnetic gap of the magnetic head 8 is formed in a direction perpendicular to the film travel direction.

Springs 10 and 11, serving as biasing means, are disposed in the cartridge chamber 2 and the film spool 4, respectively, so as to interpose the center of rotation of the film platen 7 therebetween. One end of each of the springs 10 and 11 is fixed to the camera body 1, and the other end is fixed to the film platen 7 to bias the film platen 7 in the upper direction of FIG. 36. Guide members 7c and 7d formed on the film platen 7 are brought into tight contact with end faces of the film 9, so that the position of the film platen 7 relative to the film 9 is predetermined. A horizontal magnetic storage portion (not shown) is formed, along the longitudinal direction of the film 9, on the surface of the film 9 which faces the film platen 7. Various pieces of information associated with photography can be written in (or read from) the magnetic storage portion by means of the magnetic head 8. An outer rail 12 (FIG. 35) defines the upper position of the film 9.

A release lever 13 has elongated holes 13a and 13b which are respectively slidably fitted on dimples 14 and 15 of the camera body 1. In the state of FIG. 33, dimples 7e and 7f of the film platen 7 are locked by flat portions 13d and 13g of arm portions 13c and 13f of the release lever 13, and the film platen 7 is pressed to a lower position. One end of a spring 16 is fixed to the release lever 13, and the other end of the spring 16 is fixed to the camera body 1. The spring 16 biases the release lever 13 in a direction indicated by an arrow C in FIG. 34.

A film detection lever 17 serving as a leading end detecting means is pivotally mounted on the camera body 1. An arm portion 17a of the film detection lever 17 can partially enter into or can be partially retracted from a film travel path. One end of a spring 18 is fixed to the film detection lever 17, and the other end of the spring 18 is fixed to the camera body 1. The spring 18 applies a counterclockwise biasing force to the film detection lever 17. A stopper 19 is formed on the camera body 1 and regulates the counterclockwise angular position of the film detection lever 17. A control lever 20 is pivotally mounted on the camera body 1. An arm portion 20b of the control lever 20 is engageable with an arm portion 13i of the release lever 13. An arm portion 20c of the control lever 20 is engageable with a bent portion 17c of the film detection lever 17.

A rear lid detection lever 21 is pivotally mounted on the camera body 1. One end 21a of the rear lid detection lever 21 is engageable with an arm portion 20a of the control lever 20. One end of a spring 22 is mounted on the rear lid detection lever 21, and the other end of the spring 22 is mounted on the camera body 1. The spring 22 applies a clockwise biasing force to the rear lid detection lever 21. A stopper 23 is mounted on the camera body 1 to regulate a clockwise angular position of the rear lid detection lever 21.

The biasing force of the spring 22 is sufficiently larger than that of the spring 16 acting on the control lever 20.

A rear lid 27 is pivotally mounted at a portion 1a of the camera body 1. When the rear lid 27 is closed, its arm portion 27a is brought into contact with an arm portion 21b of the rear lid detection lever 21, and the rear lid detection lever 21 is rotated counterclockwise. Pins 29 and 30 extending on the camera body 1 are slidably fitted in elongated holes 28a and 28b of a rear lid lock ratchet 28. One end of a lock spring 31 is fixed to the camera body 1, and the other end of the lock spring 31 is fixed to the rear lid lock ratchet. The lock spring 31 applies a biasing force to the rear lid lock ratchet 28 in a direction indicated by an arrow D.

With the above structure, when the rear lid 27 is to be closed, the rear lid 27 is rotated counterclockwise. The arm portion 27a abuts against an inclined surface 28c of the rear lid lock ratchet 28. The rear lid lock ratchet 28 is moved in a direction opposite to that indicated by the arrow D against the biasing force of the lock spring 31. A ratchet portion 28d of the rear lid lock ratchet 28 is fitted in a recessed portion 27b of the rear lid 27 by the biasing force of the lock spring 31. Therefore, the rear lid 27 is kept closed.

In order to open the rear lid 27, the rear lid lock ratchet 28 is manually moved in the direction opposite to that of the arrow D against the biasing force of the lock spring 31. The recessed portion 27b is disengaged from the ratchet portion 28d, so that the rear lid 27 can be opened.

A photographer or user opens the rear lid 27 and loads the thrust type film cartridge 32 in the cartridge chamber 2. An example of this film cartridge 32 is described in Japanese Patent Application No. 63-220049. The entire film including a film leader portion is stored in the cartridge 32 when it is not used. When the cartridge 32 is loaded in the camera body 1 and a rear lid 27 is closed, a drive force is transmitted from the film feed fork 3, and the film 9 is fed out from the cartridge 32.

When the film cartridge 32 is loaded in the cartridge chamber 2 and the rear lid 27 is closed, the arm portion 27a of the rear lid 27 abuts against the arm portion 21b of the rear lid detection lever 21, and the rear lid detection lever 21 is pivoted counterclockwise against the biasing force of the spring, as shown in FIG. 37. The arm portion 20a of the control lever 20 is disengaged from one end 21a of the rear lid detection lever 21, and the control lever 20 tends to rotate clockwise by the biasing force of the spring 16. However, since the arm portion 20c of the control lever 20 is engaged with the bent portion 17c of the film detection lever 17, clockwise rotation of the control lever 20 is stopped. In this case, since the release lever 13 is slightly moved in the direction of the arrow C, the flat portions 13d and 13g of the release lever 13 are kept in contact with the dimples 7e and 7f of the film platen 7. The film platen 7 is kept pressed to the lower position (i.e., the state in FIG. 33).

In this state, when the film feed fork 3 is rotated clockwise (FIG. 34) by a motor (not shown), a shaft (not shown) of the film cartridge 32 which is engaged with the fork 3 is rotated in the same direction. The film 9 is fed out from the film cartridge 32, and the leader portion of the film 9 enters into a gap between the film platen 7 and the camera body 1. At this time, a gap a is present between the film edge and the guide portions 7c and 7d, so that the film can be smoothly fed. This state is shown in FIGS. 36 and 37.

When the film 9 is moved to the right in FIG. 36 and the leading end portion of the film 9 passes by the guide portion 7d, the leading end portion of the film 9 abuts against the arm portion 17a of the film detection lever 17. The film detection lever 17 is then rotated clockwise by the biasing force of the spring 18, so that the bent portion 17c is disengaged from the arm portion 20c of the control lever (FIG. 39). In this case, since the spring 18 is arranged to maintain engagement between the bent portion 17c and the arm portion 20c, the spring 18 has only a weak biasing force. Therefore, a small load is required for the distal end portion of the film 9 to rotate the film detection lever 17 clockwise.

When the bent portion 17c of the film detection lever 17 is disengaged from the arm portion 20c of the control lever 20, the release lever 13 is moved in the direction of the arrow C by the biasing force of the spring 16. The flat portions 13d and 13g are disengaged from the dimples 7e and 7f, as shown in FIG. 39. The film platen 7 is biased upward (FIG. 38) by the springs 10 and 11 so that the guide members 7c and 7d urge the film edge, thus achieving positioning between the magnetic head 8 and the film. Therefore, information can be written in or read from a predetermined position of the magnetic storage portion by the magnetic head 8.

The film 9 is further fed and is wound around the film spool 4 by a known means such as a rubber roller or gripper, and a normal photographic operation or the like is performed. Upon completion of the photographic operation, when the film 9 is stored in the film cartridge 31, the bent portion 17c of the film detection lever 17 abuts against a circumferential portion 20d of the control lever 20.

When the rear lid 27 is opened and its arm portion 27b is disengaged from the rear lid detection lever 21, the rear lid detection lever 21 is rotated clockwise, the control lever 20 is rotated counterclockwise, and the release lever 13 is moved to the left against the biasing force of the spring 16 by means of the biasing force of the spring 22. At this time, inclined surface portions 13e and 13f of the arm portions 13c and 13f of the release lever 13 are engaged with the dimples 7e and 7f. The film platen 7 is moved downward against the biasing forces of the springs 10 and 11. The flat portions 13d and 13g are brought into contact with the dimples 7e and 7f, thereby maintaining the film platen 7 at the lower position and hence restoring the state shown in FIG. 33.

Figure 40:
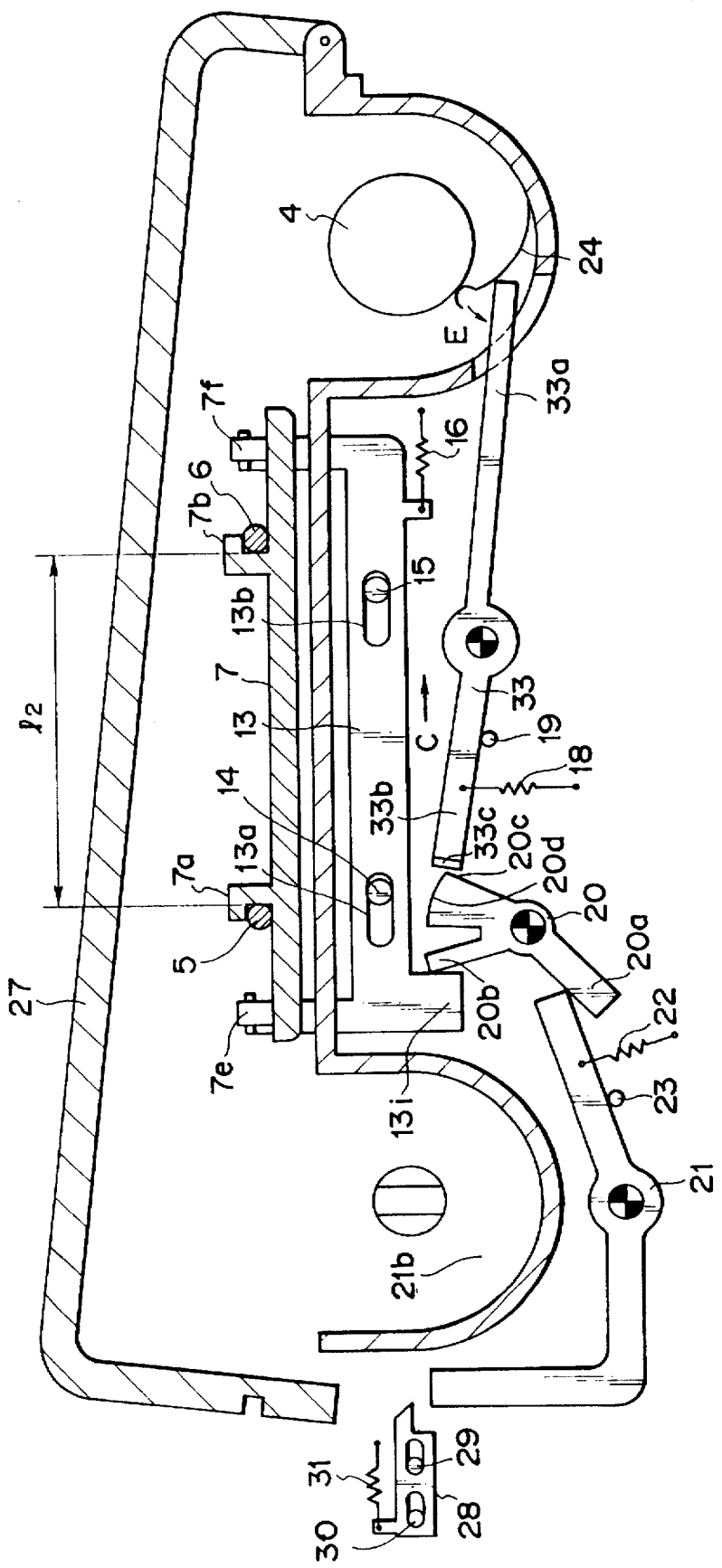
FIG. 40 is a cross-sectional view of a camera according to the tenth embodiment of the present invention.

FIG. 40 shows the tenth embodiment of the present invention. The same reference numerals as in FIGS. 33 to 39 denote the same parts in FIG. 40.

Referring to FIG. 40, one end of a leaf spring 24 is fixed to a camera body 1 to urge a film (not shown in FIG. 40) against a film spool 4, thereby assisting film loading. A film detection lever 33 serves as a film leading end detecting means and is pivotally mounted on the camera body 1. An arm portion 33a of the film detection lever 33 can be brought into contact with the leaf spring 24. When the film is gradually wound around the film spool 4 and the leaf spring 24 is deformed in a direction indicated by an arrow D, the film detection lever 33 is rotated clockwise.

With the above structure, when the film is wound around the film spool 4, the film detection lever 33 is rotated clockwise, and guide members 7c and 7d shown in FIG. 33 (but not shown in FIG. 40) urge the film lower end face. The leading end of the film will not be caught by the guide members 7c and 7d during film feeding.

In this embodiment, the film is wound around the film spool 4. When a film winding operation is completed, photography is performed for every frame while the film is rewound into the film cartridge with frame indexing. That is, this embodiment assumes a so-called "prewind" type camera.

Figure 41:
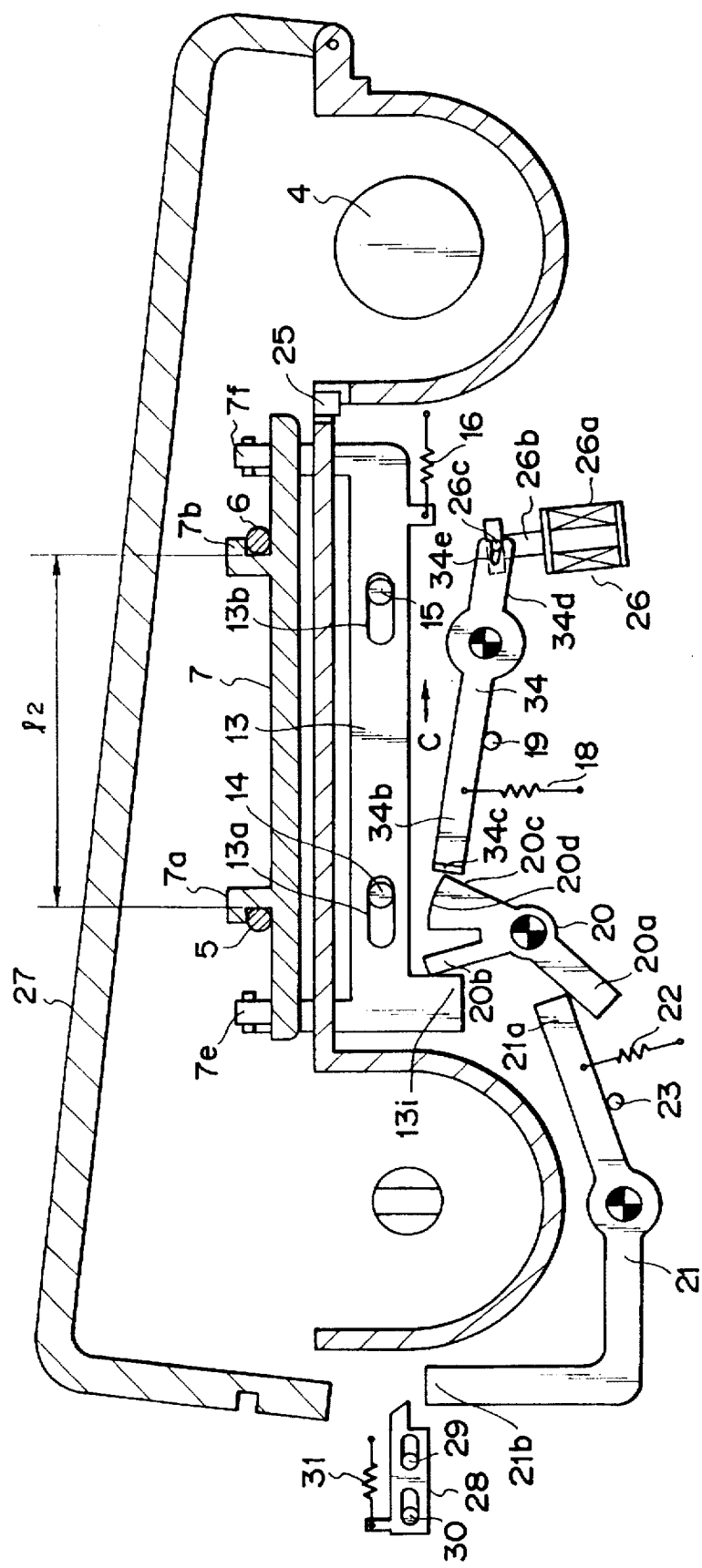
FIG. 41 is a cross-sectional view of a camera according to the eleventh embodiment of the present invention.

FIG. 41 shows the eleventh embodiment of the present invention. The same reference numerals as in FIGS. 33 to 40 denote the same parts in FIG. 41.

Referring to FIG. 41, a photointerrupter 25 detects the leading end of a film. A known plunger unit 26 comprises a coil 26a and a movable core 26b. When the coil 26a is energized, the movable core 26b is attracted into the coil 26a. A film detection lever 34 serving as a film leading end detecting means is pivotally mounted on a camera body 1. A pin 26c formed on the movable core 26b is slidably fitted in a groove 34e formed in an arm portion 34b of the film detection lever 34. The film detection lever 34 is interlocked with the movable core 26.

When the leading end of the film is detected by the photointerrupter 25, energization of the coil 26a is started from an electrical control circuit (not shown), and the movable core 26b is attracted into the coil 26a. The film detection lever 34 is then rotated, clockwise, and guide members 7c and 7d (not shown in FIG. 40 but shown in FIG. 33) formed on a film platen 7 urges the film edge. The leading end of the film will not be caught by the guide members 7c and 7d during film feeding.

As described above, the leading end of the film may be optically detected. Release of a control lever 20, i.e., the tight contact of the guide members 7c and 7d of the film platen 7 on the film edge, may be started using a drive source such as a plunger unit.

In each of the above embodiments, when the rear lid is open, the guide members are retracted outside the film travel path. When the rear lid is closed and the leading end of the film is fed from the film cartridge and passes a predetermined position (e.g., a position where the guide members are located), the guide members are urged against the film edge in the widthwise direction. During film feeding (initial feeding for frame indexing), the leading end of the film will not be caught by the guide members, and the film can be smoothly fed.

What is claimed is:

1. A camera having a film cartridge chamber, and an information processing unit for performing at least one of (i) writing information to a recording medium provided as a film, and (ii) reading information from the recording medium, said camera comprising:
   (a) a movable member movable between a first position and a second position, said movable member urging the film against the information processing unit when said movable member is located at the second position, and the information processing unit being separated from the film when said movable member is located at the first position;
   (b) a drive source for applying a drive force to said movable member to move said movable member from the first position to the second position;
   (c) holding means for applying a holding force to hold said movable member at the first position; and
   (d) allowing means for allowing said movable member to be released to move to the second position, said allowing means having a member which is directly contacted to a member provided in a door of said film cartridge chamber during a closing operation of the door of said film cartridge chamber and thereby allowing said holding means to release a holding state of said movable member to allow said movable member to move to the second position.

2. A camera according to claim 1, further comprising:
   detecting means for detecting that the film has been fed from a film cartridge to a film take-up spool side by a predetermined amount; and
   releasing means for performing a releasing operation of said holding means when said detecting means detects that the film has been fed from the film cartridge to the film take-up spool side by the predetermined amount, while said allowing means allows said movable member to be released to move to the second position.

3. A camera according to claim 2, wherein said holding means comprises first and second means for holding said movable member at the first position, said allowing means releasing a holding operation of said first means, and said releasing means releasing a holding operation of said second means.

4. A camera according to claim 1, wherein the information processing unit comprises a magnetic head and a press contact portion, and wherein the film comes into a press contact state between said magnetic head and said press contact portion, when said movable member is located at the second position.

5. A camera according to claim 4, wherein a position of said magnetic head is movable by said movable member.

6. A camera according to claim 4, wherein a position of said press contact portion is movable by said movable member.

7. A camera according to claim 1, wherein the information processing unit comprises a magnetic head unit.

8. A camera according to claim 7, further comprising:
   detecting means for detecting that the film has been fed from a film cartridge to a film take-up spool side by a predetermined amount; and
   releasing means for performing a releasing operation of said holding means when said detecting means detects that the film has been fed from the film cartridge to the film take-up spool side by the predetermined amount, while said allowing means allows said movable member to be released to move to the second position.

9. A camera according to claim 8, wherein said holding means comprises first and second means for holding said movable member at the first position, said allowing means releasing a holding operation of said first means, and said releasing means releasing a holding operation of said second means.

10. A camera according to claim 6, wherein said detecting means detects that the film has been fed from the film cartridge to a predetermined position ahead of the magnetic head unit.

11. A camera according to claim 8, wherein said detecting means detects that the film has been wound around film take-up spool by a predetermined amount.

12. A camera having a film cartridge chamber, a closable chamber door, and an information processing unit for performing at least one of (i) writing information to a magnetic medium formed in a film and (ii) reading information from the magnetic medium, said camera comprising:
   (a) a movable member movable between a first position and a second position, said movable member releasing the information processing unit from pressing the film when said movable member is located at the first position, and said movable member urging the information processing unit against the film when said movable member is located at the second position;
   (b) a drive source for applying a drive force to said movable member to move said movable member from the first position to the second position;
   (c) first and second holding members for holding said movable member at the first position;
   (d) a first releasing member for releasing the holding operation of said first holding member when the chamber door of said camera is closed; and
   (e) a second releasing member for detecting that the film has been fed from a film cartridge to a film take-up spool side by a predetermined amount, and for releasing the holding operation of said second holding member.

13. A camera according to claim 12, wherein said information processing unit has a magnetic head unit and a press contact portion, and when said movable member is located at a second position, the film enters to a press contact state between the magnetic head unit and the press contact portion, and when the movable member is located at a first position, the press contact state is released, and wherein said second releasing member performs the releasing operation when the film is fed from the film cartridge to a predetermined position ahead of the magnetic head unit.

14. A camera according to claim 12, wherein said second releasing member detects that the film has been wound around a film take-up spool by a predetermined amount, and performs the releasing operation.

15. A camera having a cartridge chamber, and an information processing unit for performing at least one of (i) writing information to a recording medium formed as a film contained in a film cartridge, and (ii) reading information from the recording medium, said camera comprising:

(a) a movable member movable between a first position and a second position, said movable member urging the film against the information processing unit when said movable member is located at the second position, and the information processing unit being separated from the film when said movable member is located at the first position;

(b) a drive source for applying a drive force to said movable member to move said movable member from the first position to the second position;

(c) holding means for applying a holding force to hold said movable member at the first position; and (d) allowing means for allowing said movable member to be released to move to the second position, said allowing means having a member which is directly contacted to the cartridge and moved thereby during a loading operation of the cartridge into the cartridge chamber thereby allowing the holding means to release holding state of said movable member to allow said movable member to move to the second position.

16. A camera according to claim 15, further comprising:
detecting means for detecting that the film has been fed from a film cartridge to a film take-up spool side by a predetermined amount; and
releasing means for performing a releasing operation of said holding means when said detecting means detects that the film has been fed from the film cartridge to the film take-up spool side by the predetermined amount, while said allowing means allows said movable member to be released to move to the second position.

17. A camera according to claim 16, wherein said holding means comprises first and second means for holding said movable member at the first position, said allowing means releasing a holding operation of said first means, and said releasing means releasing a holding operation of said second means.

18. A camera according to claim 15, wherein the information processing unit comprises a magnetic head and a press contact portion, and wherein the film comes into a press contact state between said magnetic head and said press contact portion, when said movable member is located at the second position.

19. A camera according to claim 18, wherein a portion of said press contact portion is movable by said movable member.

20. A camera according to claim 15, wherein the information processing unit comprises a magnetic head unit.

21. A camera according to claim 20, further comprising:
detecting means for detecting that the film has been fed from a film cartridge to a film take-up spool side by a predetermined amount; and
releasing means for performing a releasing operation of said holding means when said detecting means detects that the film has been fed from the film cartridge to the film take-up spool side by the predetermined amount, while said allowing means allows said movable member to be released to move to the second position.

22. A camera according to claim 21, wherein said holding means comprises first and second means for holding said movable member at the first position, said allowing means releasing a holding operation of said first means, and said releasing means releasing a holding operation of said second means.

23. A camera according to claim 21, wherein said detecting means detects that the film has been fed from the film cartridge to a predetermined position ahead of the magnetic head unit.

24. A camera according to claim 21, wherein said detecting means detects that the film has been wound around a film take-up spool by a predetermined amount.

25. A camera having a cartridge chamber, and an information processing unit for performing at least one of (i) writing information to a magnetic medium formed in a film, and (ii) reading information from the magnetic medium, said camera comprising:

(a) a movable member movable between a first position and a second position, said movable member releasing the information processing unit from pressing the film when said movable member is located at the first position, and said movable member urging the information processing unit against the film when said movable member is located at the second position;

(b) a drive source for applying a drive force to said movable member to move said movable member from the first position to the second position;

(c) first and second holding members for holding said movable member at the first position;

(d) a first releasing member for releasing the holding operation of said first holding member when a film cartridge is loaded in the cartridge chamber of said camera; and (e) a second releasing member for detecting that the film has been fed from the film cartridge to a film take-up spool side by a predetermined amount, and for releasing the holding operation of said second holding member.

26. A camera according to claim 25, wherein said information processing unit has a magnetic head unit and a press contact portion, and when said movable member is located at a second position, the film enters to a press contact state between the magnetic head unit and the press contact portion, and when the movable member is located at a first position, the press contact state is released, and wherein said second releasing member performs the releasing operation when the film is fed from the film cartridge to a predetermined position ahead of the magnetic head unit.

27. A camera according to claim 25, wherein said second releasing member detects that the film has been wound around a film take-up spool by a predetermined amount and performs the releasing operation.

28. A camera having a film cartridge chamber, and an information processing unit for performing at least one of (i)

writing information to a recording medium formed in a film, and (ii) reading information from the recording medium, said camera comprising:

(a) position regulating means, contactable to a film edge in a widthwise direction of the film, for regulating a relative position of the information processing unit with respect to the film, said position regulating means having a following member which causes said processing unit to follow the film, said following member being operable in a first state and a second state, wherein, in the first state, the film edge is in contact with the following member, wherein the processing unit follows the film, and in the second state, contact between the film edge and the following member is inhibited, wherein the processing unit is inhibited from following the film;

(b) a movable member movable between a first position, where said position regulating means does not contact the film edge, and a second position, where said position regulating means contacts the film edge;

(c) holding means for applying a holding force to hold said movable member at the first position; and (d) allowing means for allowing said movable member to be released to move to the second position, said allowing means responding to a closing operation of a door of said film cartridge chamber and for allowing said holding means to release a holding state of said movable member to allow said movable member to move to the second position.

29. A camera according to claim 28, wherein said position regulating means moves to a position where said position regulating means is not in contact with the film edge interlocking with said movable member when said movable member is located at the first position, and said position regulating means moves to a position where said position regulating means is in contact with the film edge when said movable member moves to the second position.

30. A camera according to claim 28, further comprising a drive source for applying a drive force to said movable member to move said movable member from the first position to the second position.

31. A camera according to claim 28, further comprising:

detecting means for detecting that the film has been fed from a film cartridge to a film take-up spool side by a predetermined amount; and releasing means for performing a releasing operation of said holding means when said detecting means detects that the film has been fed from the film cartridge to the film take-up spool side by the predetermined amount, while said allowing means allows said movable member to be released to move to the second position.

32. A camera according to claim 31, wherein said holding means comprises first and second means for holding said movable member at the first position, said allowing means releasing a holding operation of said first means, and said releasing means releasing a holding operation of said second means.

33. A camera according to claim 28, wherein the information processing unit comprises a magnetic head unit.

34. A camera according to claim 33, further comprising:

detecting means for detecting that the film has been fed from a film cartridge to a film take-up spool side by a predetermined amount; and releasing means for performing a releasing operation of said holding means when said detecting means detects that the film has been fed from the film cartridge to the film take-up spool side by the predetermined amount, while said allowing means allows said movable member to be released to move to the second position.

35. A camera according to claim 34, wherein said holding means comprises first and second means for holding said movable member at the first position, said allowing means releasing a holding operation of said first means, and said releasing means releasing a holding operation of said second means.

36. A camera according to claim 34, wherein said detecting means detects that the film has been fed from the film cartridge to a predetermined position ahead of the magnetic unit.

37. A camera according to claim 34, wherein said detecting means detects that the film has been wound around a film take-up spool by a predetermined amount.

38. A camera having a film cartridge chamber, a closable chamber door, and a magnetic head unit for performing at least one of (i) writing information to a magnetic medium formed in a film and (ii) reading information from the magnetic medium, said camera comprising:

(a) a position regulating means contactable to a film edge in a widthwise direction of the film;

(b) a movable member movable between a first position, where said position regulating means is not in contact with the film edge, and a second position where said position regulating means contacts the film edge;

(c) a drive source for applying a drive force to said movable member to move said movable member from the first position to the second position;

(d) first and second holding members for holding said movable member at the first position;

(e) a first releasing member for releasing the holding operation of said first holding member when the chamber door of said camera is closed; and (f) a second releasing member for detecting that the film has been fed from a film cartridge to a film take-up spool side by a predetermined amount, and for releasing the holding operation of said second holding member.

39. A camera according to claim 38, wherein said second releasing member performs the releasing operation when the film is fed from the film cartridge to a predetermined position ahead of the magnetic head unit.

40. A camera according to claim 38, wherein said second releasing member detects that the film has been wound around a film take-up spool by a predetermined amount, and performs the releasing operation.

41. A camera according to claim 38, wherein said position regulating means moves to a position where said position regulating means is not in contact with the film edge interlocking with said movable member when said movable member is located at the first position, and said position regulating means moves to a position where said position regulating means is in contact with the film edge when said movable member moves to the second position.

42. A camera having a cartridge chamber, and an information processing unit for performing at least one of (i) writing information to a recording medium formed in a film contained in a film cartridge, and (ii) reading information from the recording medium, said camera comprising:

(a) position regulating means, contactable to a film edge in a widthwise direction of the film, for regulating a relative position of the information processing unit to the film, said position regulating means having a following member which causes said processing unit to follow the film, said following member being operable in a first state and a second state, wherein, in the first state, the film edge is in contact with the following member, wherein the processing unit follows the film, and in the second state, contact between the film edge and the following member is inhibited, wherein the processing unit is inhibited from following the film;

(b) a movable member movable between a first position, where said position regulating means does not contact the film edge, and a second position, where said position regulating means contacts the film edge;

(c) holding means for applying a holding force to hold said movable member at the first position; and (d) allowing means for allowing said movable member to be released to move to the second position, said allowing means responding to a loading operation of the cartridge into the cartridge chamber and for allowing said holding means to release a holding state of said movable member to allow said movable member to move to the second position.

43. A camera according to claim 42, wherein said position regulating means moves to a position where said position regulating means is not in contact with the film edge interlocking with said movable member when said movable member is located at the first position, and said position regulating means moves to a position where said position regulating means is in contact with the film edge when said movable member moves to the second position.

44. A camera according to claim 42, further comprising a drive source for applying a drive force to said movable member to move said movable member from the first position to the second position.

45. A camera according to claim 42, further comprising:

detecting means for detecting that the film has been fed from a film cartridge to a film take-up spool side by a predetermined amount; and releasing means for performing a releasing operation of said holding means when said detecting means detects that the film has been fed from the film cartridge to the film take-up spool side by the predetermined amount, while said allowing means allows said movable member to be released to move to the second position.

46. A camera according to claim 45, wherein said holding means comprises first and second means for holding said movable member at the first position, said allowing means releasing a holding operation of said first means, and said releasing means releasing a holding operation of said second means.

47. A camera according to claim 42, wherein the information processing unit comprises a magnetic head unit.

48. A camera according to claim 47, further comprising:

detecting means for detecting that the film has been fed from a film cartridge to a film take-up spool side by a predetermined amount; and releasing means for performing a releasing operation of said holding means when said detecting means detects that the film has been fed from the film cartridge to the film take-up spool side by the predetermined amount, while said allowing means allows said movable member to be released to move to the second position.

49. A camera according to claim 48, wherein said holding means comprises first and second means for holding said movable member at the first position, said allowing means releasing a holding operation of said first means, and said releasing means releasing a holding operation of said second means.

50. A camera according to claim 48, wherein said detecting means detects that the film has been fed from the film cartridge to a predetermined position ahead of the magnetic head unit.

51. A camera according to claim 48, wherein said detecting means detects that the film has been wound around a take-up spool by a predetermined amount.

52. A camera having a cartridge chamber, and a magnetic head unit for performing at least one of (i) writing information to a magnetic medium formed in a film, and (ii) reading information from the magnetic medium, said camera comprising:

(a) a position regulating means contactable to a film edge in a widthwise direction of the film;

(b) a movable member movable between a first position, where said position regulating means is not in contact with the film edge, and a second position where said position regulating means contacts the film edge;

(c) a drive source for applying a drive force to said movable member to move said movable member from the first position to the second position;

(d) first and second holding members for holding said movable member at the first position;

(e) a first releasing member for releasing the holding operation of said first holding member when a film cartridge is loaded in the cartridge chamber of said camera; and (f) a second releasing member for detecting that the film has been fed from a film cartridge to a film take-up spool side by a predetermined amount, and for releasing the holding operation of said second holding member.

53. A camera according to claim 52, wherein said second releasing member performs the releasing operation when the film is fed from the film cartridge to a predetermined position ahead of the magnetic head unit.

54. A camera according to claim 52, wherein said second releasing member detects that the film has been wound around a film take-up spool by a predetermined amount, and performs the releasing operation.

55. A camera according to claim 52, wherein said position regulating means moves to a position where said position regulating means is not in contact with the film edge interlocking with said movable member when said movable member is located at the first position, and said position regulating means moves to a position where said position regulating means is in contact with the film edge when said movable member moves to the second position.

56. A camera having a film cartridge chamber, and an information processing unit for performing at least one of (i) writing information to a recording medium formed in a film, and (ii) reading information from the recording medium, said camera comprising:

(a) position regulating means, contactable to a film edge in a widthwise direction of the film, for regulating a relative position of the information processing unit with respect to the film, said position regulating means having a following member which causes said processing unit to follow the film, said following member being operable in a first state and a second state, wherein, in the first state, the film edge is in contact with the following member, wherein the processing unit follows the film, and in the second state, contact between the film edge and the following member is inhibited, wherein the processing unit is inhibited from following the film;

(b) a movable member movable between a first position, where said movable member causes said position regulating means to not contact the film edge, and a second position, where said movable member causes said position regulating means to contact the film edge;

(c) holding means for applying a holding force to hold said movable member at the first position; and (d) allowing means for allowing said movable member to be released to move to the second position, said allowing means responding to a closing operation of a door of said film cartridge chamber and for allowing said movable member to move to the second position.

57. A camera according to claim 56, further comprising a drive source for applying a drive force to said movable member to move said movable member from the first position to the second position.

58. A camera having a cartridge chamber, and an information processing unit for performing at least one of (i) writing information to a recording medium formed in a film contained in a film cartridge, and (ii) reading information from the recording medium, said camera comprising:

(a) position regulating means, contactable to a film edge in a widthwise direction of the film, for regulating a relative position of the information processing unit to the film, said position regulating means having a following member which causes said processing unit to follow the film, said following member being operable in a first state and a second state, wherein, in the first state, the film edge is in contact with the following member, wherein the processing unit follows the film, and in the second state, contact between the film edge and the following member is inhibited, wherein the processing unit is inhibited from following the film;

(b) a movable member movable between a first position, where said movable member causes said position regulating means to not contact the film edge, and a second position, where said movable member causes said position regulating means to contact the film edge;

(c) holding means for applying a holding force to hold said movable member at the first position; and (d) allowing means for allowing said movable member to be released to move to the second position, said allowing means responding to a loading operation of the cartridge into the cartridge chamber and for allowing said movable member to move to the second position.

59. A camera according to claim 58, further comprising a drive source for applying a drive force to said movable member to move said movable member from the first position to the second position.

* * * * *

UNITED STATES PATENT AND TRADEMARK OFFICE
CERTIFICATE OF CORRECTION

PATENT NO. : 5,742,858
DATED : April 21, 1998
INVENTOR(S) : CHIKARA AOSHIMA

It is certified that error appears in the above-identified patent and that said Letters Patent is hereby corrected as shown below:

On the title page item,

[56] References Cited

FOREIGN PATENT DOCUMENTS

"267535" should read --2-67535--.
    "267536" should read --2-67536--.
    "3202830" should read --3-202830--.

Column 26

Line 43, "film" should read --a film--. (second occurrence)
    Line 38, "claim 6," should read --claim 8,--.

Column 28

Line 64, "amount" should read --amount,--.

Column 32

Line 7, "take-up" should read --film take-up--.

Signed and Sealed this

Eighth Day of December, 1998

Attest:

Attesting Officer

BRUCE LEHMAN
Commissioner of Patents and Trademarks